United States Patent
Erickson et al.

(10) Patent No.: US 7,702,725 B2
(45) Date of Patent: Apr. 20, 2010

(54) DIGITAL OBJECT REPOSITORIES, MODELS, PROTOCOL, APPARATUS, METHODS AND SOFTWARE AND DATA STRUCTURES, RELATING THERETO

(75) Inventors: John S. Erickson, Norwich, VT (US); David Murray Banks, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1583 days.

(21) Appl. No.: 10/884,092

(22) Filed: Jul. 2, 2004

(65) Prior Publication Data

US 2006/0041661 A1    Feb. 23, 2006

(51) Int. Cl.
*G06F 15/16* (2006.01)
(52) U.S. Cl. .................. 709/203; 709/217; 709/219; 707/3; 707/10; 707/104.1
(58) Field of Classification Search .............. 709/203, 709/217, 219; 707/3, 4, 10, 104.1
See application file for complete search history.

(56) References Cited

U.S. PATENT DOCUMENTS

| | | | |
|---|---|---|---|
| 5,201,046 A * | 4/1993 | Goldberg et al. ........... 707/100 |
| 6,437,799 B1 * | 8/2002 | Shinomi ..................... 345/666 |
| 6,611,845 B1 * | 8/2003 | Dockter et al. .......... 707/103 R |
| 6,954,749 B2 * | 10/2005 | Greenblatt et al. ............. 707/4 |
| 6,985,905 B2 * | 1/2006 | Prompt et al. ............... 707/102 |
| 7,103,600 B2 * | 9/2006 | Mullins ....................... 707/10 |
| 7,353,223 B2 * | 4/2008 | Klein ........................... 707/4 |
| 2003/0061209 A1 * | 3/2003 | Raboczi et al. ................ 707/3 |
| 2003/0074352 A1 * | 4/2003 | Raboczi et al. ................ 707/4 |

* cited by examiner

*Primary Examiner*—Lashonda T Jacobs

(57) ABSTRACT

A method of providing internet access to a data object repository comprising managing data objects hosted by said repository using a generalised repository directed graph data model having object nodes and resources, said resources comprising at least one of
(i) a literal;
(ii) actual resource data; and/or
(iii) a URI directing a request for resources to an address;
wherein said object nodes comprise higher level abstractions of data objects;
wherein all object nodes and resources are named, as well as all arcs between object nodes and other object nodes or resources, said arcs modelling properties of said nodes;
wherein each said directed graph has a graph interface which represents data as a directed graph of nodes and resources; and
wherein said graph interface is capable of enabling access to data represented by said directed graph by traversal of said directed graph using http:GET.

18 Claims, 20 Drawing Sheets

| Node Property Type | Node Property Value |
|---|---|
| Title | "Castle" |
| Image | URI 2 |
| Title | "Church" |
| Image | URI 4 |
| Title | "Thatched Cottage" |
| Image | URI 6 |

200 → Title "Castle"
202 → Image URI 2
204 → Title "Church"
206 → Image URI 4
208 → Title "Thatched Cottage"
210 → Image URI 6 property of node (type-value pair)

*Fig. 2B*

| Existing technology | Underlying data model |
|---|---|
| Relational Database | Tables |
| XML Database | Sets (of documents) |
| Object Database | Graphs (of objects) |
| RDF Triple Store | Sets (of RDF statements) |
| CRM System (Customer Relationship Management) | Graphs (of objects) |
| CM System (Content Management) | Graphs (of objects) |
| DAM System (Digital Asset Management) | Graphs (of objects) |
| File Systems | Trees (of directories/files) |
| WebDAV | Trees (of collections/resources) |
| JSR-170 | Trees (of nodes/properties) |

*Fig. 9*

DIGITAL OBJECT REPOSITORIES, MODELS, PROTOCOL, APPARATUS, METHODS AND SOFTWARE AND DATA STRUCTURES, RELATING THERETO

FIELD OF THE INVENTION

This invention relates to digital object repositories, and to a models, protocol, apparatus, methods, software, and data structures relating to digital object repositories.

BACKGROUND OF THE INVENTION

There exists a desire to access, for read or write operations, content repositories via the Internet, or via a network of some sort. There exist already very many content repositories (data sources with a content management system) which manage/represent data unilaterally within themselves. Purely as an example, Hewlett Packard have created the "Arkive" system which is a collection of video/audio/text/photographs/pictures relating to endangered species of animals. This was collected from a wide range of sources, such as the BBC, University Research, books, Natural History Museums, etc. This data has been gathered together on a content management system comprising a memory store and a processor managing metadata relating to the content stored in the memory, and allowing content to be retrieved.

However, in the existing world, each content management system has its own underlying data structure which organises and manages/represents its data, and its own customised directory exposing that data to the outside world, and its own software devoted to managing the content on its content server(s).

Accessing an existing data repository, for example the Arkive system, requires a client server with the appropriate client application software running on it to enable meaningful interaction with the directory of the repository hosting the data structure, and the client server also running appropriate, bespoke, API software to use the right protocol to interface with the repository content management system. For a user/client to access some other third party content repository, with its own, different, underlying data structure, and its own, different, content management system, requires the client server to have the appropriate client-side read/write interaction software, and appropriate API software to liase with whatever software is managing the data on the other, different, content repository.

No client software exists which can talk to all "exposed" protocol/format requirements of all existing content repositories that may be accessed over a network—for example over the Internet. It is not as simple as selecting a large group of API software and installing the group on the client server. The need to understand the underlying data structure of each repository, in order to understand how to interact with it properly, goes deeper than that.

For example, relational databases, object databases, file system and XML databases will have their own different ways of interacting with the outside world and interacting with their own data store—their own, directory/content management system software. Examples of existing data management systems include ARTISA, DOCUMENTUM, and FILENET.

Content management systems (CMS) typically perform the following functions:—
ways to access their data content;
ways to index the content;
ways to search the content;
ways to publish the content;
(this list is not exhaustive, and not all CMS will perform all functions from the list).

CMS manage their data in proprietary ways. Interaction with core data has to go through the CMS, or at least use the appropriate interface language. CMS, and their command languages are bespoke to each vendor. The CMS software is layered onto a particular content model and imposes, for each proprietary CMS, common rules on things that subscribe/match/fit with that model. CMS databases specify the workload/processes that go on in reading or writing information. Any content model has work flow rules, for example specifying how data is added or deleted. How addition or deletion of items, for example, to the resources is performed is defined by the CMS software, and the client-side software needs to comply with the rules of the specific CMS. Often a remote user does not know the rules for interacting with the data, via the CMS. There is a diversity in existing CMS systems, which cannot be used together easily.

PRIOR ART

Prior art in the field of data/content management systems is plentiful. Any selection from it uses hindsight. Existing repository platforms include: FEDORA, DSPACE, BUCKETS.

Each of these is based upon its own bespoke data model, and each provides proprietary interfaces that are not shared by others. Protocols such as OAI—PMH exist for harvesting metadata in the repositories, and standards exist, e.g. METS, for transporting archival records in bulk between repositories based on FEDORA, DSPACE or BUCKETS.

WEBDAV and JSR-170 are repository platforms that are based upon their own rudimentary graph models, as is RDF. HANDLE is another project in the digital object repository area.

Each repository does what it does/supports whatever functionality it does, and a client machine can either access it or it cannot, depending upon whether it is running an appropriate proprietary client application and has an appropriate API.

SUMMARY OF THE INVENTION

According to an aspect of the invention there is provided a method of providing internet access to a data object repository comprising managing data objects hosted by said repository using a generalised repository directed graph data model having object nodes and resources, said resources comprising at least one of:
(i) a literal;
(ii) actual resource data;
(iii) a URI directing a request for resources to an address;
wherein said object nodes comprise higher level abstractions of data objects;
wherein all object nodes and resources are named, as well as all arcs between object nodes and other object nodes or resources, said arcs modelling properties of said nodes;
wherein each said directed graph has a graph interface which represents data as a directed graph of nodes and resources; and
wherein said graph interface is capable of enabling access to data represented by said directed graph traversal of said directed graph using http:GET.

Thus the data structure comprising the directed graph is accessible for read operations via the internet using a conventional web browser. Operations at the repository relating to locating a particular node for reading are bound to http GET for interaction with the world outside. The graph interface may in many embodiments be a communications pathway through which read commands from outside of the repository are directed/managed.

By saying that all nodes, arcs and resources are named in the method, we do not wish to exclude from protection an arrangement where a repository has a directed graph structure capable of performing the method of the invention but also has some unnamed nodes, arcs, or resources. All nodes that are entities (arcs, nodes, resources) that comprise the graph are named.

Said graph interface may also support a http:POST operation for mutation of said graph. This write capability is provide to a user via the internet, again typically using a commonly available tool (e.g. a web browser).

Said directed graph may span data hosted in a plurality of repositories, there being at least one object node and/or resource of said directed graph stored in a first data object repository and at least one object node and/or resource of said directed graph stored in a second, different, data object repository.

In this way, we can provide a distributed, virtual, repository. This allows single manifestations of resources, as well as sub-graphs, to be included in multiple repositories. Access to, and organisation of, a large amount of data from several, or many, physical repositories is provided. This may reduce the need to copy data from one repository to another so as to make it part of more than one repository. Instead, it can be accessed by more than one repository.

Said directed graph model organisation of said data objects may be the native data organisation model of said repository, or at least of one of said repositories.

Alternatively, or additionally, in a network where said repository, or at least one of said repositories has a native data organisation model that is not a directed graph model capable of being traversed by http:GET in accordance with the first aspect of the invention, said method may comprise wrapping said native data organisation model in an API which does expose a directed graph data structure in accordance with the first aspect of the invention, thereby providing web browser access to data hosted by said repository or said at least one repository.

A thin layer API may be interposed between the native data organisational model and the overlaid directed graph model.

Furthermore, additionally or alternatively, in a network where said repository, or at least one of said repositories has a native data organisation model that is not a directed graph model capable of being traversed by http:GET in accordance with the first aspect of the invention, the method may comprise providing said repository with an additional data model, in addition to said native data organisational model, said additional data model comprising a directed graph data model in accordance with the first aspect of the invention, thereby providing an alternative, additional, method of querying data in said repository, or in said at least one repository.

In this way we provide an alternative route to reading data in the repository. That alternative route could be a common route for a plurality of repositories. This may provide interoperability.

It is preferred to define the interaction of said graph interface with GET or POST requests using on-the-wire protocols, rather than using a language-specific API. This helps to minimise dependence of the approach to any particular CMS (Content Management System) or API (Application Program Interface).

A suitable protocol is http/1.1, which can be used to make a GET or POST request to a target node. In more detail, a [RFC2616]—compliant request string may be used to make the request of said target node, the request including the nodal operation to perform, and the arguments of the nodal operation.

The method may further comprise:
managing said directed graph model using a first computer entity, and storing said data objects represented by said directed graph in at least one of:—
(i) memory of said first computer entity;
(ii) memory of second computer entity, distinct from said first computer entity;
(iii) a distributed memory, at least one node representing a digital object held in memory of one computer entity, and at least a second node representing a digital object held in memory of a second computer entity;
(iv) a distributed memory according to (iii) above, and wherein said one computer entity comprises said first computer entity.

According to another aspect of the invention, there is provided a method of providing network access to digital objects stored on a plurality of digital object repositories comprising, in addition to whatever native data structure each repository may have for its hosted digital objects, providing each repository with a common parallel data structure comprising a directed graph of nodes and resources, and ensuring that said parallel directed graph data structures support simple http GET requests, or other on-the-wire protocol, to provide traversal of said directed graph data structures for read operations, thereby providing a user with access to said plurality of repositories via a web browser.

Said common parallel data structure directed graph may comprise resource nodes and object nodes, said resource nodes comprising bit stream data representing a resource, or a URI; and said object nodes comprising higher level abstractions of data objects; said nodes being typed, and all said nodes being named, and all arcs between nodes being named, said arcs representing properties of node type—node value pairs; and wherein said repository which hosts data objects nodes and resource nodes of said directed graph has a repository interface, said repository interface responding to a http: GetCabilities( ) request, or other equivalent request, by returning details of the capabilities of said repository, including details of which data-model-specific interfaces are implemented by said repository and their bindings.

Thus the repository interface responds to a simple http request (made by a human or automatically, or triggered, by a machine) with the capabilities of the repository. This enables this information to be taken into account in future actions of the human or machine (e.g. computer or control processor).

Content of a node may be viewed using a http GET query expression, and/or may be altered using a http POST expression. Thus, traversal and/or mutation of the graph is achieved using a common transport protocol as a mediator. This means that the content of the repository can be accessed by a large number of machines: those that can use that protocol.

It will be appreciated that by "on-the-wire protocol" is meant a protocol relevant to how data, or packets of data, is transmitted, transported, and received, rather than how it is processed (eg. by an API) post-receipt, downstream of being received by a receiving machine. In many embodiments the "on-the-wire protocol" will be an internet, or web, transport protocol. "On-the-wire" does not mean that there are wires: the term applies to both wired networks and wireless networks. "Data-transport-associated protocol" may be another term which we may use in place of "on-the-wire protocol".

Sometimes people use "wire protocol" instead, usually the "on-the-wire protocol" will be a transport protocol, but it could be the next layer up (eg. SOAP). It may be a distributed object protocol such as SOAP, CORBA or RMI. The wire protocol/on-the-wire protocol may be layer 1 or layer 2, next data link layer such as Ethernet or ATM.

Nodes of said directed graph model may be distributed over a plurality of repositories. this may reduce the number of occurrences of the same content in different memories of different physical repositories.

The method may be performed upon a data object repository having a pre-existing data structure and content management system that is not organised in accordance with the first aspect of the invention (e.g. a JSR 170 model), said method further comprising creating an additional alternative data structure and associated digital object management structure that is in accordance with the first aspect of the invention, whereby providing an alternative, additional, way of querying or interacting with said data objects.

Thus, the data objects may or may not still be accessible using the original native CMS data structure, responsive to original CMS API, but irrespective of that, it is accessible via the internet using an on-the-wire protocol and the directed graph model data structure organisation. This is a way of looking at some embodiments of the invention.

The method may be performed upon a plurality of data object repositories so as to enable said plurality of repositories to be read/write accessible using a common protocol, thereby providing interoperability for a user.

For example, several repositories with different, mutually incompatible native data structures, which require different respective input commands from a user for read/write operations may each be augmented by the same, commonly accessed interface, directed graph data structure. Their data may be modelled twice: once using their existing CMS and once using a common, internet-accessible, CMS that has its internal operations bound to an on-the-wire protocol.

According to another aspect of the invention, there is provided a virtual, or distributed, data object repository spanning a plurality of physical data repositories, comprising a first memory unit in a first repository, a second memory unit in a second repository, and a first control processor associated with the first repository, and a second control processor associated with a second repository; said first repository being capable of providing access to said first and second data memory units; said first processor managing data objects stored in said virtual repository according to a directed graph model of said data objects, said directed graph having resource, leaf, nodes comprising at least one of; (i) bit stream data streams; (ii) literals; (iii) a URI directing a query to one of (i) or (ii), and object nodes comprising aggregations representing a higher level abstraction of data objects; and wherein properties of object nodes are represented by arcs connecting the object nodes to other object nodes or to leaf nodes; and wherein said directed graph has nodes hosted by said first repository and at least one node hosted by said second repository, said first control processor, managing said directed graph, being adapted to cause queries relating to nodes hosted on said first repository to be directed to such nodes on the first repository, and to cause queries relating to the node or nodes hosted on said second repository to be directed to said second repository node(s).

Virtual data object repositories have some useful advantages stemming from (a) the ability to combine a number of physical repositories into a larger scale repository, and also (b) from the ability to combine selected specific aspects (or nodes) of individual repositories into a single virtual repository, including resources and sub-graphs into new virtual repositories. Feature (a) is akin to creating a super library. Feature (b) is more like creating a customised library—picking and choosing things to be included in the directed graph structure depending upon the semantic of the collector/librarian.

It will also be seen that, in fact, a computer entity that manages the directed graph may, or may not, have nodes (object and/or leaf) to which said directed graph directs user queries or interactions: the computer memory containing the nodes of the graph does not have to be part of the graph-managing computer entity (usually at least some nodes will be stored in memory of the graph-managing computer entity, but not necessarily).

Indeed, whilst it is envisaged that a single computer entity will usually host the directed graph, we can also envisage a scenario in which the directed graph itself, or at least some of it, is stored on memory that is remote from a computer processor/entity that manages the graph.

Said first and second control processors may be adapted to expose data objects hosted on them to the Internet via respective directed graph interfaces which can be
(i) traversed using simple http:GET; and/or
(ii) mutated using simple http:POST.

Said directed graph interfaces may be defined using on-the-wire protocols, as opposed to language-specific API's.

According to another aspect of the invention, there is provided a network comprising:
  a first digital object repository having a first control processor, first memory for storing digital objects, and first digital object management software accessible by said first control processor, said first digital object management software being adapted to represent digital objects stored in said first memory to establish a first native structure for organising and managing read and write access to said first digital objects;
  a second digital object repository having a second control processor, second memory for storing digital objects, and second digital object management software accessible by said second control processor, said second digital object management software being adapted to represent digital objects stored in said second memory to establish a second native data structure for organising and managing read and write access to said second digital objects;
  said first and second repositories being accessible by a network-connected user;
  said first digital object management software being of a different kind to said second digital object management software and representing said first digital objects in a different native data structure to the way that said second digital object management software represents said second digital objects in said second data structure, said first digital object management software requiring a first, different, read and/or write interaction instruction from said user to perform read and/or write operations than a second read and/or write interaction instruction required by said second digital object management software; and wherein
  said first control processor has first mapping software runable on it, said first mapping software mapping said first digital objects to a first directed graph data structure and being adapted to create first directed graph metadata and to provide read out/or write access to said first digital objects via traversal and/or mutation of said first directed graph data structure using an on-the-wire protocol request language such that network communication relating to first digital objects outside of said first repository is effectible using said first directed graph data structure and said on-the-wire protocol; and wherein said second control processor has second mapping software runable on it, said second mapping software mapping said second digital objects to a second directed graph data structure and being adapted to create second directed graph metadata and to provide read and/or write access to said second digital objects via traversal and/or mutation of said second directed graph data structure using the same said on-the-wire protocol request language as is interactable with said first directed graph data structure, such that network communication relating to said second digital objects outside of said second repository is effectible using said on-the-wire protocol;

thereby enabling said user to read and/or write in relation to said first and second digital objects provided that they have the capability of using said on-the-wire protocol.

Said on-the-wire protocol may be from the group:
(i) http;
(ii) ftp;
(iii) another protocol.

In many embodiments said first and second digital object mapping software support http GET operations relating to nodes or resources managed by the first and second directed graph data structures and/or support http POST operations relating to nodes or resources managed by the first and second directed graph data structures.

At least one data object or resource hosted in said first repository may be associated with a node or resource of said second directed graph; said second directed graph representing nodes that are distributed over said first and second repositories.

Said first native data structure and said different said second native data structure may be accessible for read and/or write operations of digital objects hosted by said first and second repositories using said, different, first and second interaction instructions respectively, there being two pathways to interact with said first and second digital objects: a first pathway via the first and second native data structures and a second pathway via the first and second directed graph data structures. At least one of said first native data structure and said second native data structure may comprise a said first and/or second directed graph data structure accessible via said on-the-wire protocol.

Said first and second digital object management mapping software may have a function which responds to an http GetCapabilities (node) request, or equivalent request, by returning the capabilities of the requested node.

Said first and second digital object management mapping software may react to an unspecified http GetCapabilities( ) request, or equivalent request, by returning the capabilities of the first and second repositories, as represented by as the first and second directed graphs.

A repository may host one directed graph, or a plurality of directed graphs.

According to another aspect of the invention, there is provided software, optionally encoded upon a data carrier, which when run on a control processor of a digital object repository having a directed graph data structure is adapted to permit traversal and/or mutation of the data structure using an on-the-wire protocol.

According to another aspect of the invention, there is provided software, optionally encoded upon a data carrier, which when run on a control processor of a digital object repository having a directed graph data structure is adapted to permit traversal and/or mutation of the data structure using http protocol.

The software may support http GET functionality in relation to the directed graph data structure.

According to another aspect of the invention there is provided software which when run on a control processor of a digital object repository having digital objects is adapted to represent said digital objects as a directed graph of named nodes and arcs, and said software enabling access to said digital objects via traversal and/or mutation of said directed graph via an on-the-wire protocol.

According to another aspect of the invention there is provided client-side software which is run on a processor of a client computer enables traversal and/or mutation of directed graph data structures via an on-the-wire-protocol.

According to another aspect of the invention, there is provided Directed Graph Digital Object Management Software which, when run on a control processor of a digital objected repository, is adapted to provide for the organisation of digital objects as a directed graph of nodes and resources and to enable traversal and/or mutation of said nodes and resources by a user connected to said repository using an on-the-wire protocol from the group:—
(i) http;
(ii) ftp;
(iii) another on-the-wire protocol.

According to another aspect of the invention, there is provided a method of providing network access to a plurality of digital object repositories comprising organising the digital objects of the repositories in a directed graph data structure and providing a digital object management system which supports access for read of said digital objects via a web browser by interacting with said digital object management system via one of:—
(i) a transport protocol;
(ii) http GET requests.

According to another aspect of the invention, there is provided a virtual digital object repository distributed over a plurality of physical digital object repositories each having a repository control processor and repository memory, said virtual repository comprising a directed graph data structure of nodes and resources representing digital objects contained in said virtual repository, said directed graph data structure being hosted and managed by a managing control processor, said nodes and resources being distributed over the memory of a plurality of physical repositories.

The managing control processor may comprise a repository control processor. Alternatively, in an extreme, the managing control processor may not be part of a physical repository that stores in memory data objects: it may just manage the data structure of the virtual repository.

According to another aspect of the invention, there is provided a data structure comprising a directed graph of nodes and resources representing data, and an interface to said directed graph, said interface mapping at least one of traversal and mutation of nodes and resources to at least one of: (i) http GET and/or http POST; (ii) another on-the-wire protocol.

According to another aspect of the invention, there is provided a method of producing an interoperable network of digital object repositories comprising:
decomposing existing data models, or data, of existing digital object repositories into directed graphs; and
providing interfaces to said directed graphs that are mapped onto http GET and POST methods (or other on-the-wire protocol methods) in order to provide for traversal and mutation of said directed graphs.

This approach provides independence from particular data model languages.

According to another aspect of the invention, there is provided use of directed graphs to provide internet accessibility to, and interoperability with, a plurality of different underlying data structures of data repositories by consistently abstracting said underlying data structures as directed graphs, and by providing said directed graphs with an interface that supports at least one of:—
(i) http GET
(ii) http POST
(iii) another on-the-wire protocol in order to traverse and/or mutate the directed graphs.

According to another aspect of the invention, there is provided a digital object repository having a control processor and associated accessible memory, and digital object management software runable on said control processor;

said digital object management software being adapted to organise digital objects in said repository as a directed graph of nodes and resources, and being adapted to provide traversal and/or mutation of said graph by a remote user via simple on-the-wire protocol requests, said digital object management software providing an interface to communicate with said directed graph at two levels of operation: (i) repository level operations, and (ii) node level operations, said node level operations interacting with specific identified nodes, and said repo level operations relating to higher level operations applicable to more than an identified node and/or to repository metadata.

Having a number of levels of interface gives the ability to have different functionality associated with different interfaces: different operations may be executable via different interfaces. For example, a graph-level interface may permit graph-level mutation such as creating new nodes, whereas a node level interface may not support that capability but may support the input of data to fill out existing nodes.

According to another aspect of the invention, there is provided a method of querying a digital object repository managing a plurality of resources, comprising bit stream data, via a digital object management system, the digital object management system using a directed graph to organise said resources and metadata relating to said resources as reference, leaf nodes, and object nodes, with properties of nodes represented by arcs between object nodes and either object nodes or reference nodes; said method comprising providing a binding of a query expression to an internet transport protocol in order to traverse said directed graph.

According to another aspect of the invention, there is provided the use of an internet transport protocol to mediate in the binding between a read and/or write request either:
(i) made by a client machine, or
(ii) received by digital object management systems of a resource repository; in order to provide interoperability of repositories.

According to another aspect of the invention, there is provided client machine software adapted, when run on a control processor of a client machine, to bind (i) a read and/or write query expression intended for receipt by, or response by, a repository having a data structure managed by a digital object management system which represents a data structure as a direct graph of named nodes and arcs, to (ii) an internet transport protocol so as to enable said protocol to mediate interactions with said directed graph data structure to enable traversal of said directed graph structure.

Thus, despite there being very varied client software, so long as its data operations can be reduced to traversing and mutating directed graphs, it can talk to substantially any repository through our repository interface.

According to another aspect of the invention, there is provided a method of providing API language-independent interoperability with digital object repositories comprising using a directed graph data model to represent resources and metadata managed by said repositories, and providing traversal and/or mutation of directed graphs using query expressions bound to an internet transport protocol.

We may typically use unextended http.

According to another aspect of the invention, there is provided client machine software adapted, when run on a control processor of a client machine to convert client instructions/commands into equivalent instructions/commands operable to traverse and/or mutate a directed graph data structure so as to enable said client machine to interact with a digital object repository which has a directed graph data structure and digital object management system.

According to another aspect of the invention, there is provided a method of providing interoperability of existing digital object repositories having diverse Content Management Systems (CMS) requirements comprising providing them with a common digital object management system comprising a directed graph data model data structure which exposes nodal interfaces that are accessible using an on-the-wire protocol.

The common digital object management system may be:
(i) provided in parallel with an existing diverse CMS of the repositories; and/or
(ii) provided as a wrapper covering the existing diverse CMS so as to respond to queries via the common digital object management system, directed graph, data structure.

According to another aspect of the invention, there is provided software, optionally encoded upon a data carrier, which when running upon a control processor of a digital object repository, having a Content Management System (CMS) runable upon said control processor, said Content Management System organising and managing said digital objects to create a data structure, is arranged so as to construct an alternative, directed graph, data structure with said digital objects comprising object nodes or reference nodes of said directed graph data structure, and said software also creating an alternative associated digital object management system to provide read/write access to said digital objects via said directed graph data structure and said associated digital object management system;

said software also providing an interface to said directed graph data structure which is capable of interacting with said directed graph data structure and/or said nodes and of being accessed using an on-the-wire protocol.

According to another aspect of the invention, there is provided software which provides an interface capable of interacting with:
(i) specific nodes; and or
(ii) collections of nodes;
(iii) said directed graph management system at a repository level.

In one example, the software is sent electronically to a repository (e.g. over a network) and is installed by the control processor of the repository, and creates an alternative data structure and interface to enable interoperability.

According to another aspect of the invention, there is provided a digital object repository comprising:
processing means;
memory means; and directed graph interface means;

said processor means having access to directed graph digital object management software runable on said processor means, and access to digital objects stored in said memory means, said directed graph digital object management software being adapted, when run on said processor means, to represent digital objects as a directed graph data structure of named nodes and arcs; and wherein said directed graph interface comprises means for receiving internet transport protocol commands and for converting such commands into instructions for traversing said directed graph data structure to enable internet access to said digital objects.

According to another aspect of the invention, there is provided a method of creating a distributed digital object repository comprising, in a first digital object repository having a first control processor and digital objects stored in first memory of said first digital object repository with said first digital objects being represented as nodes of a directed graph data structure managed by a directed graph managing control processor which either comprises said first control processor or is accessible by said first control processor, with read of said digital objects being provided for by traversal of said directed graph data structure mediated by a translation between internet transport protocol commands received by said directed graph managing control processor and a command language adapted to traverse said directed graph data structure;

altering said directed graph data structure to include a node with an address that represents memory that is not in said first memory of said first digital object repository, but is instead outside of the first digital object repository, thereby enabling queries of said first digital object repository to encompass digital objects that are outside of said first digital object repository.

It will be appreciated that the processor that controls/manages the directed graph could be the processor of the first repository, or it could be a separate directed graph-managing processor that is not the first digital object repository processor. Both configurations are intended to be protected. Often the directed graph-managing processor will be the same processor as that which manages/controls the first digital object repository.

Said method may comprise informing said first digital object repository control processor (or the directed graph-managing processor, if different) about the existence and/or address of an off-first repository digital object.

Said method may comprise a second digital object repository informing said first digital object repository (or the directed graph-managing processor, if different) of the existence and address of at least one of its digital objects, stored on its, second, memory, and causing said directed graph data structure of said first digital object repository (or directed graph-managing processor) to be modified to include said at least one digital object of said second repository.

According to another aspect of the invention, there is provided a method of augmenting the content of a digital object repository comprising conveying to a repository access-managing system URI details of off-repository digital objects for subsequent inclusion in a directed graph data structure of said repository.

According to another aspect of the invention, there is provided a computer entity comprising a memory storing a directed graph having:

resources;

leaf nodes comprising at least one of: (i) bit stream data streams; (ii) literals, and (iii) a URI directing a query to one of (i) or (ii); and object nodes comprising aggregations representing a higher level abstraction of data objects;

and the properties of the object nodes being represented by arcs connecting the object nodes to other object nodes or leaf nodes;

the graph representing/modelling a plurality of resources hosted on a plurality of data repositories within a network; wherein traversal of the graph and access to a resource represented by it may be performed using a command within an on-the-wire protocol;

the computing entity further comprising a processor adapted to cause a query relating to a node of the graph representing a resource hosted at a data repository remote from the computer entity to direct the query to the remote entity.

The memory of the computer entity may further store a data repository containing at least one resource modelled/represented by the graph.

Protection is also sought for computer processor of a digital object repository having software in memory according to the previous aspect of the invention for a method of creating a data structure and associated digital object management system comprising loading software in accordance with the previous aspect of the invention into a control processor of a repository of digital objects and running it upon said control processor.

Once we have realised the present invention we can compare it with the prior art and can see benefits that were previously unattainable.

WEBDAV uses a simple, rudimentary, graph approach to data management and organisation, and allows limited mutation and traversal of its graph model for write and read operations, but it does not support node-specific primitive operations. The node-level operations it supports are presented to the outside world at the repository level and are common to all nodes hosted by the repository instance.

There is no differentiation/ability to differentiate between what nodes of the same instance can do.

Furthermore, graphs constructed using WEBDAV cannot be arbitrarily distributed across networks; they must be within a repository (no graphs spanning more than one repository). WEBDAV does not use simple http protocol; it uses its own proprietary extension of http, which means the majority of Internet browsers cannot interact with it—they need a WEBDAV extension patch.

JSR-170 is applicable only to Java-based languages. If the client cannot co-operate with Java it cannot access a JSR-170 repository. Moreover, it uses an API that does not expose the primitive graph operations at the web level.

In our invention, nodal operations (all nodal operations) may be discovered and subsequently invoked by humans or programmatically using existing, unextended, web protocols. We have a protocol for on-the-wire packets, as compared with a client level or resource server-level API.

RDF does not have the notion of ownership of a node, and so cannot provide attestable representations of content. In our model every node has a host repository which is responsible for hosting (and attending to the authenticity of) property assertions of its hosted nodes. There is no clear way with general applicability to mutate an RDF graph (because there is no ownership of an assertion about a property of a node).

The HANDLE system protocol is not accessible using common Web protocols (e.g. GET and POST) and uses a propriety language. Moreover, it has been designed to be asymmetric in that it has been optimised for resolution and traversal (reads) rather than mutation (writes).

We allow repositories to operate their own, proprietary, data management systems as long as they also support ours; our approach is not exclusive. We provide existing repositories with an additional way of looking at their data, that does not require extensions of http to access the data for read and/or write. We can, of course, provide a native data structure for a repository. When the repository has a non-native data structure we can wrap it with our data structure, and provide an API to the outside world linking our directed graph model to the outside world (no direct access to network for non-native structure), or we can provide a parallel communication path to the data in the repository (still has direct access for non-native structure).

BRIEF DESCRIPTION OF THE DRAWINGS

Some embodiments of the invention will now be described by way of example only, with reference to the accompanying drawing, of which:—

FIG. 2B is a table of node property type—node property values for a node;

FIG. 9 shows a table of existing technologies and associated underlying data models;

DETAILED DESCRIPTION OF SOME EMBODIMENTS OF THE INVENTION

Figure 1:
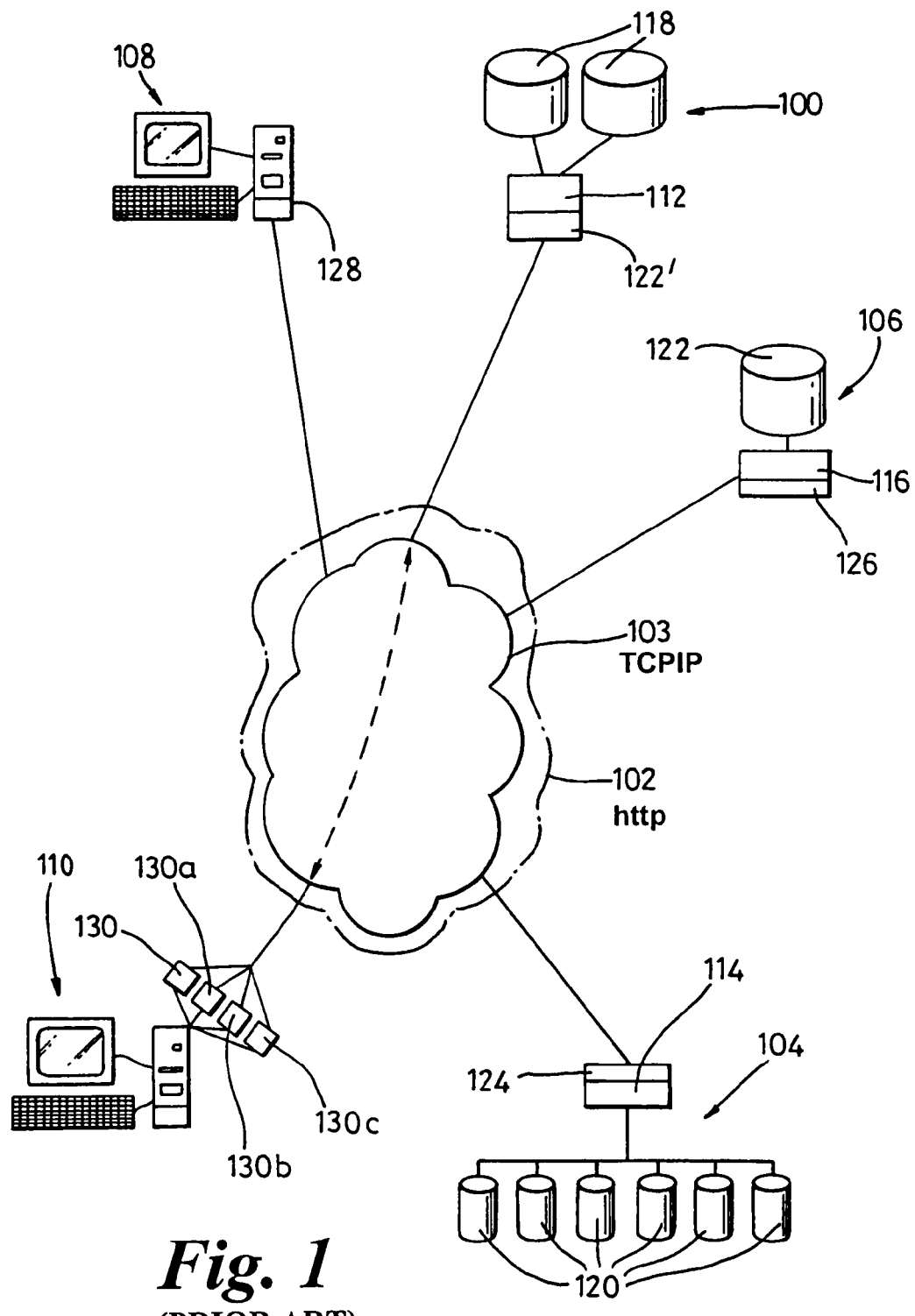
FIG. 1 shows a prior art arrangement of data object repositories.

FIG. 1 shows a prior art configuration of digital objects repositories. A first digital object repository 100 is shown connected to the Internet 102. The Internet, using http, is shown as 102. The world wide web, operating on TCP/IP, is shown as 103. Second and third digital object repository 104 and 106 are also shown connected to the Internet 102. A PC 108 having a digital object stored in its memory, accessible via its processor, is also shown connected to the Internet, as is a user's PC 10. Each of the digital repositories 100, 104, 106 comprises a server 112, 114, 116 and associated local memory 118, 120, 122 accessible by the respective servers. The servers 112, 114, 116 each run different Application Program Interface (API) software 122, 124, 126 respectively to communicate with the web or Internet 102. The PC's 108 and 110 have a common web browser interface 128, 130, e.g. Netscape or Microsoft Internet Explorer to communicate with the internet and web 102 and 103.

The first repository 100 has its operating system platform running the FEDORA data model, has the FEDORA data structure and has a FEDORA API 122, effectively tunnelling a communication channel to the Internet. The second repository 104 operates on Java, has as its data model and data structure that of JSR 170 and its API 124 exposes a JSR 170—compliant interface to the web 103; it is not Internet accessible since it does not support http. The third repository 106 uses WEBDAV as its data model, and data structure, and its API 126 requires WEBDAV—compliant inputs, and outputs data in the WEBDAV API manner, which again effectively provides a tunnel of communication to the Internet.

The Internet accessible capabilities of repository 100 and 106 is not their full, internal, capabilities, but only a lower, Internet-accessible version. Similarly, the web accessed API of the JSR 170 repository 104 does not support the full capabilities of JSR 170 over the web.

The user's PC 110 has four different client-side applications running on it (i) client application 130, a common Internet browser (this can access common Internet directories that allow access by such a browser, such as the PC 108); (ii) client application 130a, which provides access via the Internet to repository 160 and is operable with the API 122 offering FEDORA Internet access to the data in memory 118; (iii) client application 130b, which provides access via the web to repository 104 and is operable with the API 124 to offer JSR 170 web access to the data in memory 120; and (iv) client application 130c which is configured to provide Internet access to data in the memory 126 in repository 106, via the API 126, and the WEBDAV data model/data structure of the repository 106.

In order for the user 110 to access data on a particular repository he first has to address his query to the correct repository (a query addressed to repository 100 will not be answered by repository 106, for example). Also the user has to submit the request in a manner that is compliant with the repository—specific API: a request that complies with the criteria for the API of one repository may well not comply with the necessary criteria to elicit a meaningful response from a different repository using a different data model, and a different API.

It is not as simple as just being able to communicate with the appropriate API 122, 124 or 126; it is a deeper problem than that. The entire data structure, organisation of data, is different in the three different repositories 100, 104, 106. The nature of read/write commands necessary to interact with their data needs to be managed/represented separately. This makes it difficult for the user to query (or write to) a number of different repositories. Interoperability with a plurality of different repositories that use different data organisational schema, and different read/write language is not provided.

In FIG. 1 the user 110 is querying the repository 100 using language, query structure, and protocol suitable for FEDORA. The query is directed to repository 100 because the user enters its address. The server 112 checks the data in the memory 118 and returns a response to the user's query. The repositories 106, 108 (treating PC 108 as a repository) and 104 are not involved and their data is not involved.

This means that for the purpose of the user's query of repository 100, that repository is the whole world. This places quite a burden on maintaining the data in repository 100. It also means that repository 100 may well have in its memory 118 some of the same, or equivalent, data to that stored in repository 106 (for example). This involves copying of content from one memory store to another, with associated internet traffic, and memory usage, and processor power usage.

The present invention flows from a realisation that it is appropriate to model data, both data content (actual data stream/bits of data that is actually wanted by the user) and metadata (data about data) as Directed Graphs, involving nodes and arcs. When data is modelled this way, with nodes having properties (node property type—node property value pairs), we find that it is possible to achieve a data model, and a data model—to—outside world interface, that has a greater level of interoperability with digital object repositories than previous approaches. Our data model can be interposed between existing data models interfaces (e.g. RDF, JSR 170, BUCKET, WEDAV, FEDORA and the like) to achieve interoperability across digital object repositories. Of course, it can also be the "native" data model of a repository.

The realisation that a Directed Graph approach to organising/modelling the data in a repository, or access real physical repositories, also enables access by simple, existing http tools is somewhat startling. It provides a cheap, readily available, and convenient way of providing greater interoperability/ access across a plurality of repositories. Indeed, it enables us to use virtual repositories, which has not previously been available.

It will be helpful to describe a Directed Graph Model, give a specific example of a system in accordance with the present invention, and then go on to give a more detailed discussion of our protocol/system.

The Directed Graph Data Model

Figure 2A:
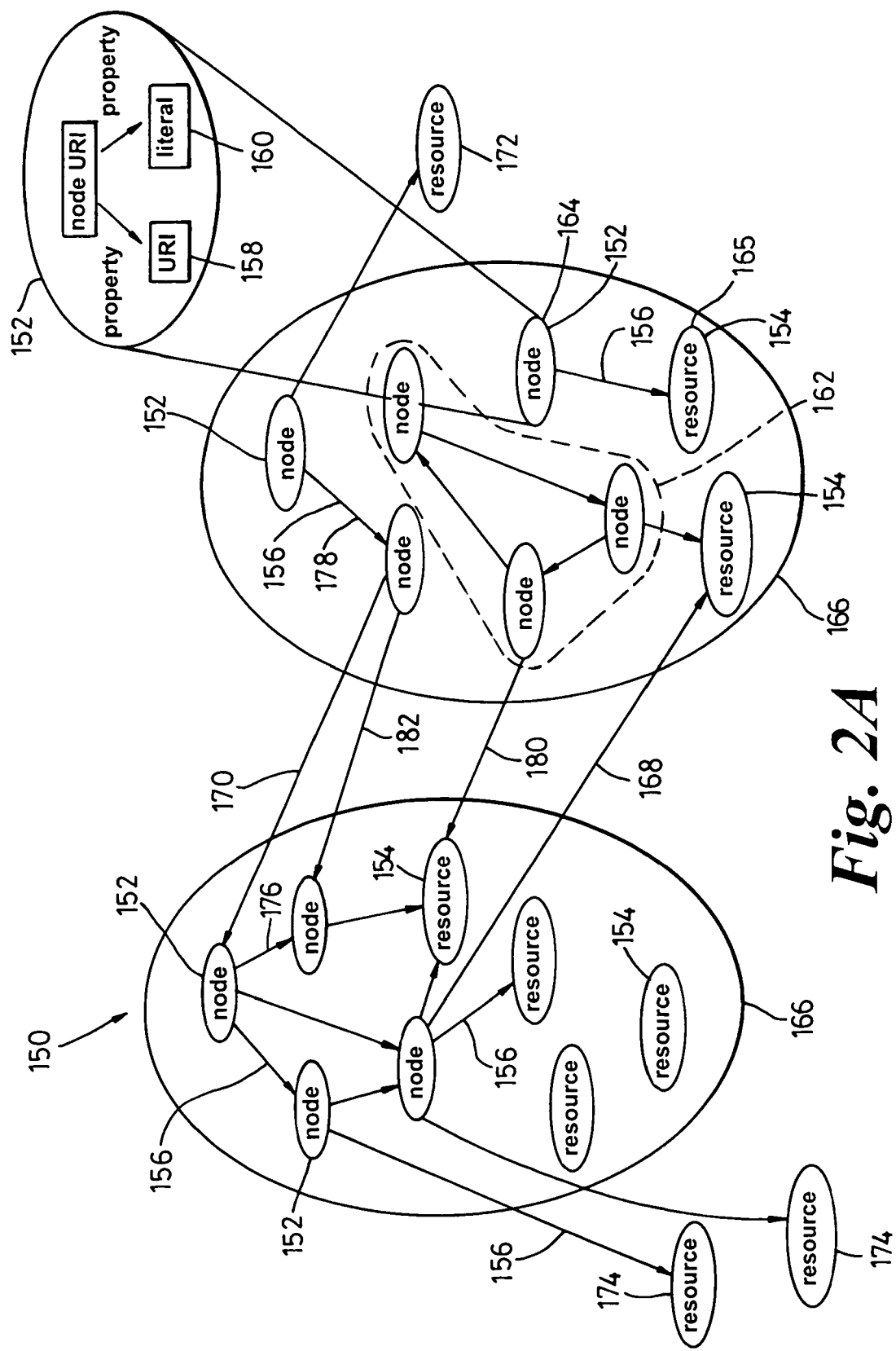
FIG. 2A illustrates a directed graph approach to modelling data and its organisation.

In our directed graph data model, data is modelled as a graph 150 of nodes 152 and resources 154. Reference is made to FIG. 2A. Properties 156 link the nodes to other nodes or resources.

Nodes are named collections of properties. Properties can be URI valued 158, or literal valued 160. Resources represent content (e.g. MIME—typed bit streams). Resources are always leaves (i.e. have no properties).

The graph can contain cycles (see cycle 162), and it does not have to be fully connected (e.g. see node 164, and resource 165).

The graph can span multiple repositories 166 (see properties 168, 170).

Nodes are always hosted by repositories.

Resources may be hosted by repositories, but may not be (some resources could be hosted off a true repository (e.g. they may be an external web page 172, or on an existing ftp site 174)).

Some properties are internal: i.e. they start and end in the same repository (see properties 176, 178).

In FIG. 2A not all nodes and arcs are shown in the Figure as being labelled/named: they are all named, but for convenience and clarity of the drawing, the names are not illustrated on the drawing.

Some properties are external: i.e. they cross repository boundaries (see properties 180, 182).

FIG. 2B shows, in an embodiment of the present invention, a table of properties for nodes 200, 202, 204, 206, 208, 210 that are children of a parent node 212 (shown in FIG. 3), the properties being the property type—property value parings.

Figure 3:
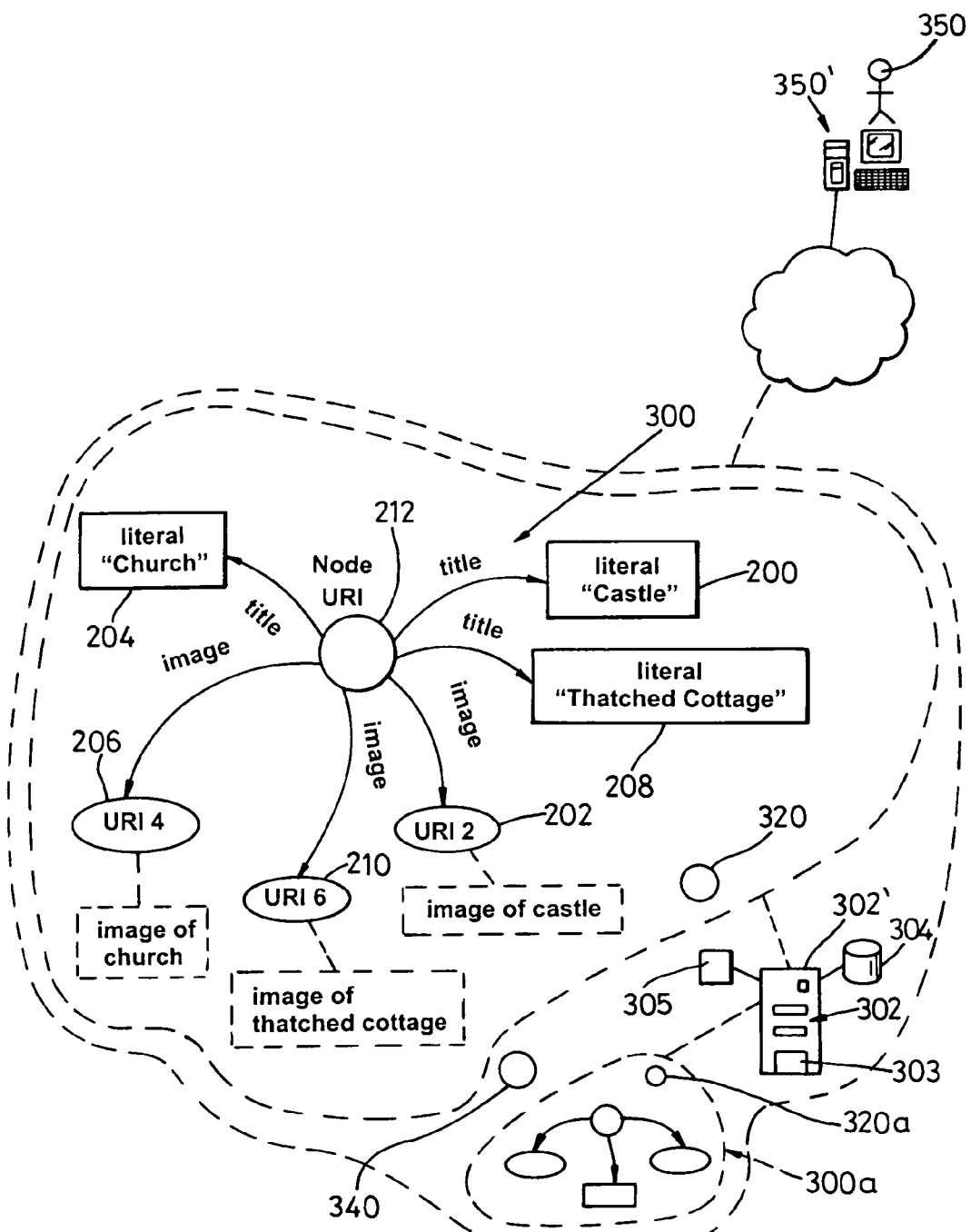
FIG. 3 shows a directed graph representation of the node of FIG. 2, and schematically a digital object repository in accordance with an aspect of the invention.

FIG. 3 shows a directed graph 300 representing the nodes of 200, 202, 204, 206, 208, 210 FIG. 2 and their properties and relationships to node 212.

In this example the data relating to the nodes is held on a common digital object repository; server 302, shown in FIG. 3, but as will be discussed later they need not be.

In the example of FIGS. 2B and 3 the node 212 has a unique URI (uniform resource indicator) giving an address, in web space, for the node 212. The data/digital objects in the repository 302 live in web space, rather than in their own world, cut off from web space or requiring a limited "translator" or "bridge" to web space.

In this example, the subject matter of node 212 is architectural buildings, and it has a property type "title", and a property value of the literal "architecturally interesting buildings". The node 212 has six children nodes, the nodes 200 to 210. The property type could itself, in other examples, be a URI.

Node 212 also has another property type (nodes can have an unlimited number of property types and respectively associated property values), and that is as an object—a node more complex than a leaf node—a node with children. It has an argument of 6 for its property type "object" (e.g. that property of the node is: Node property type—object vs. node value—6).

Digital objects can be parent nodes—referred to as "nodes", or leaf nodes, which can be of two types: a first type where there is a unique URI, referred to as "resources" where the value of the resource is its URI, and a second type where the leaf node has a value that is a literal, referred to as literal nodes or literals, or literal resources. Every node, or resource, has a unique URI. The value associated with a property of a node may be a URI, or a literal (or string or other simple amount of data).

Node 200 is a resource node having a property type 200a "title", and an associated property value 200b of the literal "castle". The title—castle/node property type—node property value pair is a property of the node 200.

The node 202 has a type 202a "image" with a value 202b "URI 2", the URI 202b being an address for a image 202c or a castle (JPEG, but optionally any other image storage approach such as tif; bitmap; gif). Data representing the image 202c is stored in the repository 302.

The node 204 comprises a node property type "title" 204a, and a associated value 204b comprising the literal "church". The node property type—node property value, title—church, is a property of the node 204.

The node 206 has a node property type 204a "image", and a node property value 204b of "URI 4". Stored at URI 4, on the repository 302, is data representing an image of a church (again stored as a JPEG). The node property type—node property value pair image 206a-URI 4 206b comprises a property of the node 206.

Node 208 has a property type 208a of "Title", and a property value, 208b of the literal "thatched cottage", the type-value pair of title—thatched cottage being a property of node 208.

Node 210 has a node property type 210a of "image" and a associated node property value 210b of "URI 6". Stored at URI 6, on the repository 302, is data representing an image of a thatched cottage, again stored as a JPEG.

Also shown in FIG. 3 is another directed graph 300a representing another related set of nodes (e.g. relating to street names in London), with the data for those nodes also stored on repository 302. The directed graphs 300 and 300a have respective graph interface nodes 320 and 320a which are nodes and which have unique URIs. Graph interface nodes are data model—specific interfaces which expose data as a graph of nodes (e.g. the nodes 200 to 212) and resources. The resources present content (i.e. in the example MIME—typed bit streams). In this example the data model used by the repository 302 is native to the model of this invention and no "translation/conversion" is required at the graph interface nodes 320, 320a.

It will be noted that all nodes and arcs are named in FIG. 3.

Also illustrated in FIG. 3 is the node 340 which comprises another sort of node, a repository-level node, having a unique URI: a unique Internet—accessible URI. The repository-level node 340 is a repository node associated with repository 302 and provides an interface for the repository with the internet/web. The repository-level node returns, when queried using Internet protocol queries, repository—level metadata and details of data-model-specific interfaces. The repository level node enables repository-level functions to be performed via communication with the internet.

There may also be a graph node (not shown) which enables graph-level operations to be performed via communication with the internet (e.g. adding or deleting nodes). Nodes may have interfaces which allow internet access to alter their content or value.

A user 350 who wants to find a picture of some architectural buildings connects their PC 350' to the Internet and, using a conventional web browser, in this case Microsoft Internet Explorer, asks for the node 212 by its URI (the user knows its URI, for example www.universitycourse.com/architecture/pictures), and gets a list of architectural pictures returned to it. The on-the-wire packets of data representing the user's query comply with http protocol. The user's query is typically directed via a search engine (such as Google to name but one). Associated with each i.e. repository 302 is a directory 305 enabling Internet search engines to query the data managed by the repository. The Internet search engine interacts with the directory 305 and the image of the castle stored at URI 202 is returned to the user. Also shown in FIG. 3 is processor 303 of the repository 302, processor 303 managing the directory 305.

In another kind of user initiated query, the user's query returns the properties of node 212: i.e. the node properties of the table of FIG. 2.

The user 350 then enters, via their PC 350, a URI address for an image they wish to select from the node property table (e.g. by using a mouse to move a cursor over the URI address in the table shown on their PC display screen and clicking on it). The processor 303 of the repository 302 receives that request, and returns a datastream identified by the URI (e.g. URI 2 identifies a datastream corresponding to a picture of a castle), from memory 304 of the repository 302. The user then sees a picture of a castle on the screen.

The above are two trivial examples of the invention, but they serve to illustrate the fact that the repository 302 has a server 302 with a processor 303 that has data, stored on memory 304 accessible locally to the processor 303, mapped as a directed graph of nodes which can either be object nodes, or reference nodes (which in turn can either point to a URI (web—accessible), or a literal.

What has become apparent to us is that once we treat a data model in this way, with nodes pointing to web accessible URI's, it does not really matter whether the physical memory containing the data accessed via that URI is on the same physical repository as another node, or on a different physical repository: we can distribute nodes of the same directed graph over different physical repositories. Thus we can create virtual repositories. This is discussed in more detail later (see for example FIG. 4).

However, there is another feature to be brought out with reference to FIGS. 2 and 3, and that relates to how the metadata is organised, and is accessed if the user 350 does not know the URI for the node 212.

If the user happens to know the URI for the actual data that is the image of the castle he can simply enter that, to be conveyed as a http GET request on the Internet. This will for example be of the form www.universitycourse.com/architecture/properties/cardiffcastle/2004 This will, via the repository interface 320, return the desired picture/image.

Another scenario is where the user does not know the URI of the directed graph node 212, nor the specific URI of the literal/data stream of the image. They simply send off into the Internet search request for "castle picture". The Internet search engine (not shown) interacts with the directory 305 and when it is established that the repository 302 has under its management the desired data the search request results in the generation of a http GET request for that data/node.

Internet search engines, such as GOOGLE™ index the web and provide the URI to the user or client program. The client program uses this URI in its http request.

Thus a http GET request identifying a specific URI is received by processor 303 and causes the processor to return the content of the URI defined by node 202.

So far we have discussed reading data being turned into a GET operation at the repository (or rather at the repository it is perceived as a http GET operation; it may be sent out as that, or converted into that (from another expression) at some point between initiating the request and the repository processing the request). This involves retrieving pre-existing data.

It is also possible to add data using the schema of the present invention. This is done using the http POST command. Again, writing data to a memory, or mutating a directed graph (since it mutates the directed graph representation of the data structure), is performed using on-the-wire http protocol, readily handled by a large number of existing web-connected machines.

In the example discussed, a search for data resulted in a http:GET request at the repository level. Since this is a basic tool of http many, many, systems can support this operation. It is practically universal. Similarly, we convert write operations, when the on-the-wire packets are operated upon by the processor of a repository, into a http:POST operation. This too is ubiquitous to many, many systems.

Figure 3A:
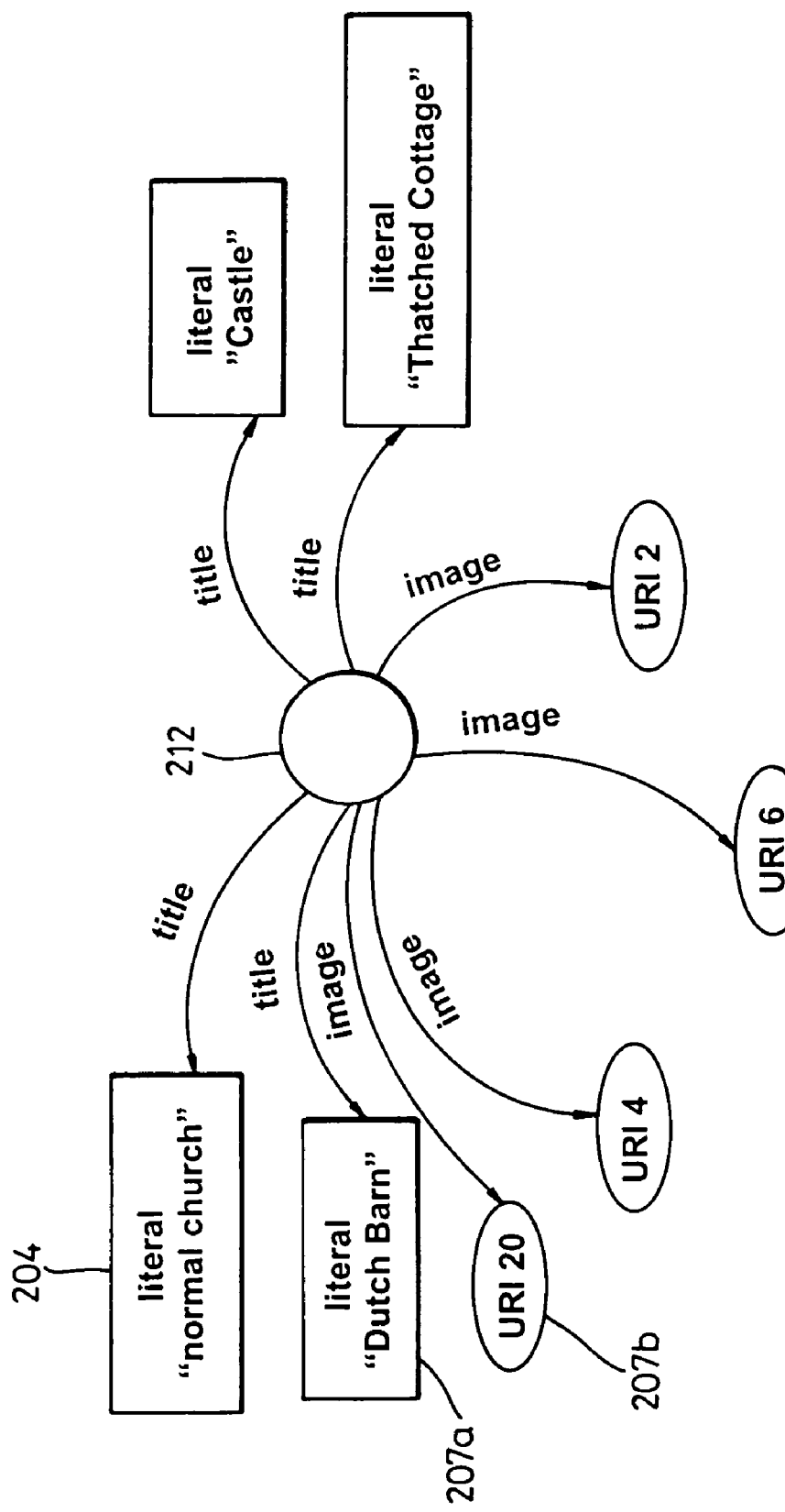
FIG. 3A shows a directed graph mutated from that of FIG. 3.

To illustrate the http:POST operation, and how the present invention supports it, and makes use of it to mutate directed graphs, consider FIG. 3A. FIG. 3A shows a directed graph similar to that of FIG. 3, but now the user has, over the Internet, modified the graph by adding another image and another title, and also by changing a title from "Church" to "Norman Church". Again, all nodes and arcs (properties) are named.

The user, by causing http:POST to execute over the Internet, inputting a "modify/change/insert" command at their PC, causes the literal 204 "Church" to be changed to "Norman Church". Also, by using a "new node" operation causes two new nodes, nodes 207a and 207b, to be created. Node 207a is a reference node containing the property value of the literal "Dutch Barn", and having the property type "title". Node 207b is another reference node, this time having the type "image" and the value "URI20, which is a URI address for an image of a Dutch Barn.

Thus the user can manipulate the data hosted by the repository 302 and alter the directed graph facilitating access to/representing the structure of the data.

The ability to mutate, or alter, data on a repository from a remote site, over the Internet, is not provided by some data model/systems operating and organised in accordance with some data models. For example, WEBDAV allows graph traversal (reading), but not mutation/manipulation (writing). A special client application is needed to mutate WEBDAV nodes, but not all users have that special client. By providing mutation instructions conveyed as a http:POST operation, we open that option up to all users who have what are now conventional http-enabled browsers.

We may create native repositories which model their data as directed graphs in accordance with the present invention.

We may create an interface which is interposed between a native repository and the Internet and which maps, or re-models data stored on, or managed by, a repository in a proprietary manner as a directed graph model, and which uses the simple http:GET, and http:POST commands to communicate over the Internet with that interposed, mapped, re-modelled, data structure. It will be appreciated that the actual data, bit stream, could be stored elsewhere: it is the control of the metadata and access to the resource data that the controller of the directed graph controls.

Figure 4A:
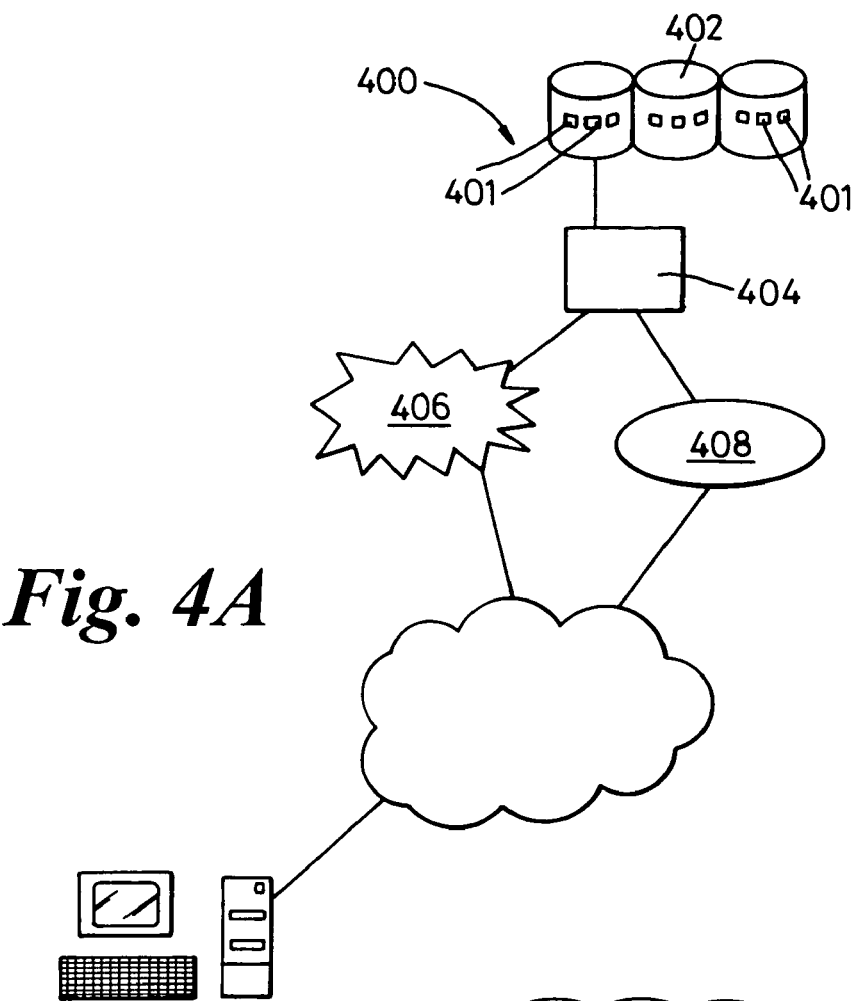
FIG. 4A shows a digital object repository according to an embodiment of the invention.

For example, FIG. 4A shows a repository 400 with data 401 stored in memory 402 in a JSR 170 data model 406 managed by processor 404. The processor 404 also manages a directed graph data model 408 which manages the same data 401 in a different way: the directed graph, node-based, model of the presentation. A user accesses the directory 409 via the Internet. If the user has a suitable client application on their PC they can access the repository via the JSR 170 directory and model 406. If they do not (or even if they do) they can access the data 401/repository 400 via the directed graph directory and data model 408.

Figure 4B:
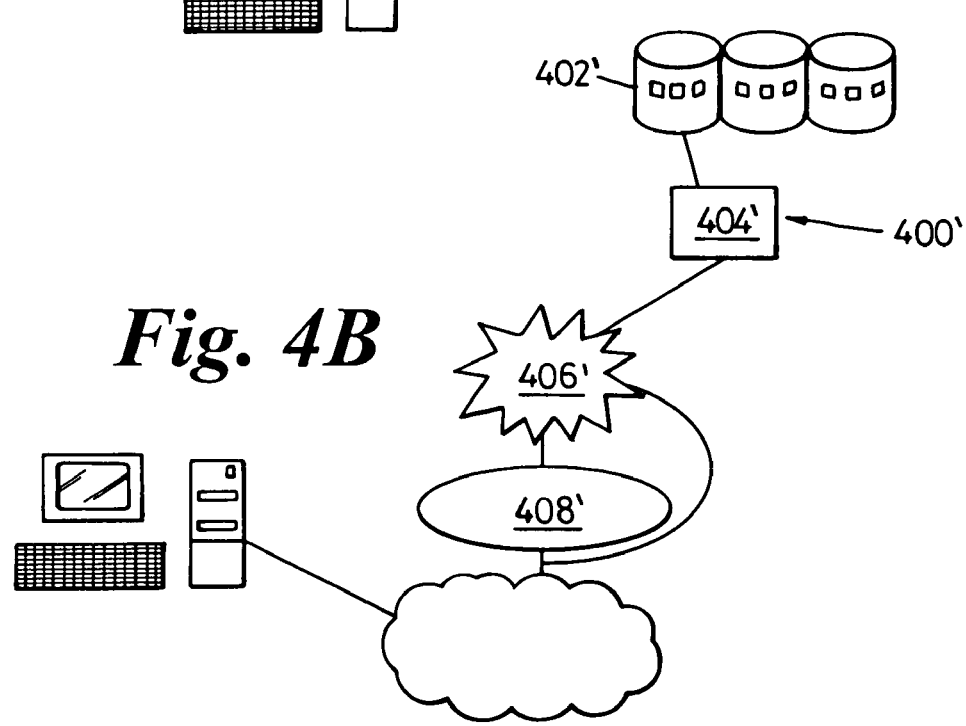
FIG. 4B shows another digital object repository according to another embodiment of the invention.

FIG. 4B shows an alternative system in which the directed graph directory and model 408' is interposed between the Internet and the JSR 170 directory and model 406'. The model 406' may also have a direct path to the Internet. In the example of FIG. 4B interactions between the user and the directory 400' are in the form of http, at least in the vicinity of the logical point where the repository communicates with the Internet. The http link may be converted into Java-type commands for interaction with the JSR 170 data model, and back from JSR 170—consistent packets to http packets for outward communication from the repository 400' to the user, via the Internet.

It will be appreciated that our directed graph data model, and the benefits that flow from it, uses in some embodiments well known, readily available, http—on-the-wire protocol to achieve greater universality and interoperability of repositories.

Figure 5:
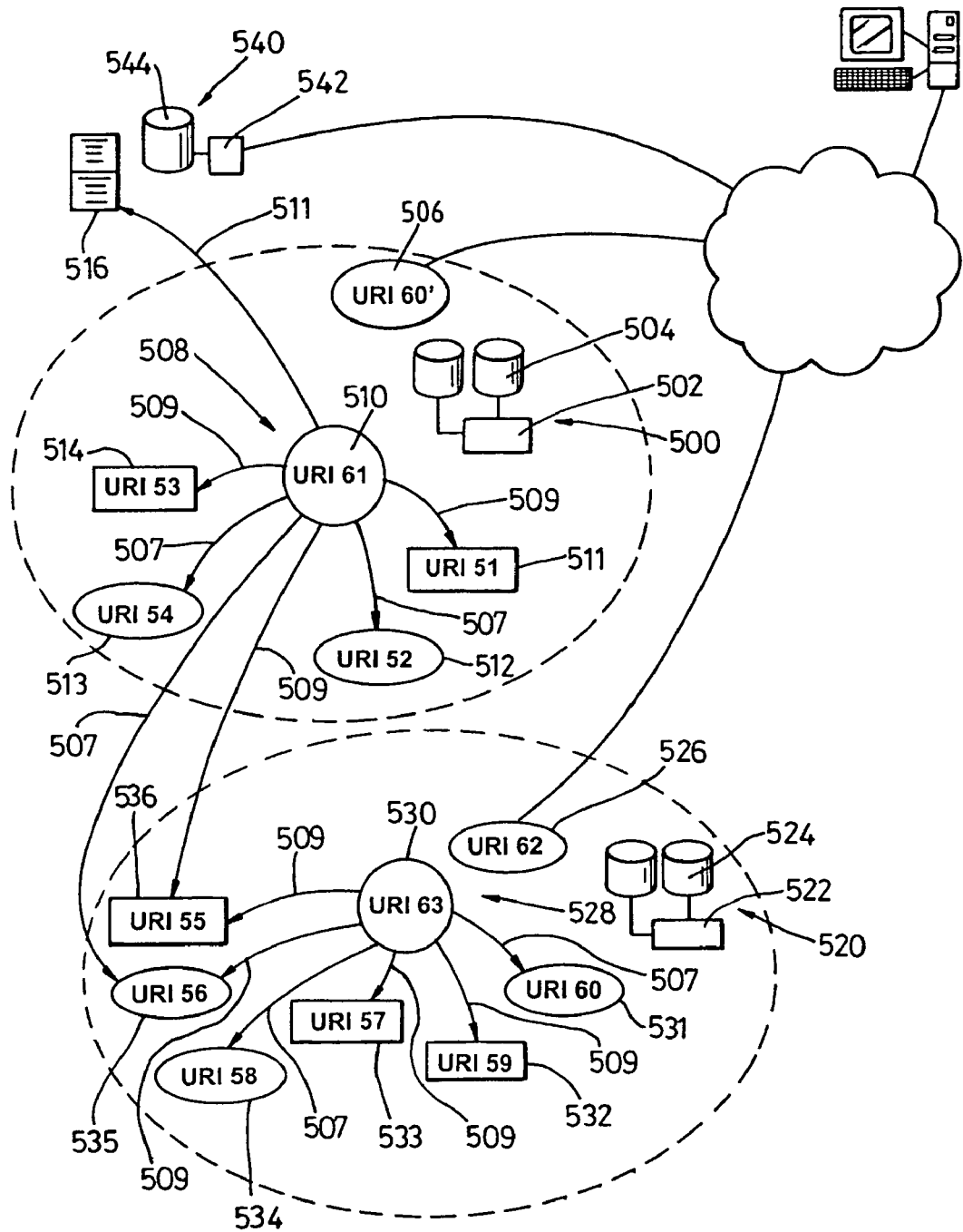
FIG. 5 shows another embodiment of the invention.

FIG. 5 shows a first repository 500 having a server 502, memory 504, and a repository interface 506; and a second repository 520 having a server 522, memory 524 and a repository interface 526. Also shown is a third repository 540 comprising a PC having a processor/server 542 and memory 544.

The repository 500 hosts a directed graph data structure 508 comprising node object 510, and nodes 511, 512, 513, and 514. Repository 520 hosts a directed graph data structure 528 comprising node object 530 and nodes 531, 532, 533, 534, 535, and 536.

All of the nodes 511 to 514, and 531 to 536 are URI's, giving addresses for data (e.g. bit stream, or bitmap data). The URIs 511 to 514 relate to data held in memory 504. The URIs 531 to 536 relate to data held in memory 524. Of course, some, or all, of the resource nodes could be literals.

Resource node 516, child of node 510, is a literal, held on the memory of PC 540.

It will be noted that images, denoted by oval shaped nodes, and word text, denoted by rectangular shaped nodes, all have URIs in FIG. 5. The arcs, representing the properties of the nodes, are named. Arcs 507 are named "image", and indicated that the properties of the oval nodes in FIG. 5 is that of "image", and arcs 509 are named "descriptive text" and indicate that the property of the rectangular resource nodes in FIG. 5 is that of "descriptive text". All arcs are named. Arc 511 is named "literal".

It will also be noted that the directed graph 508 representing the data structure of node 510 points to physical memory disposed outside of the physical memory 504 of the repository 500 that hosts node 510. The directed graph 508 extends to data held at node 535 and node 536, a URIs for a title and image stored in memory 524 of repository 520, and also to literal node 516 held as the memory of PC 540.

Server 522 has control of the nodes 535 and 536 since they are located in it.

A repository can in the extreme be without any bit stream resources, leaf, nodes at all—it can simply be metadata nodes/collections, with pointers to bits stream data, all of which is off-repository.

It will be noted that directed graph 528 is hosted entirely within physical repository 520, whereas directed graph 508 spans more than one repository.

Nodes 506, 510, 530, and 526 are URI's and are named (URI's 60, 61, 63 and 62) in the directed graph structure.

Figure 6:
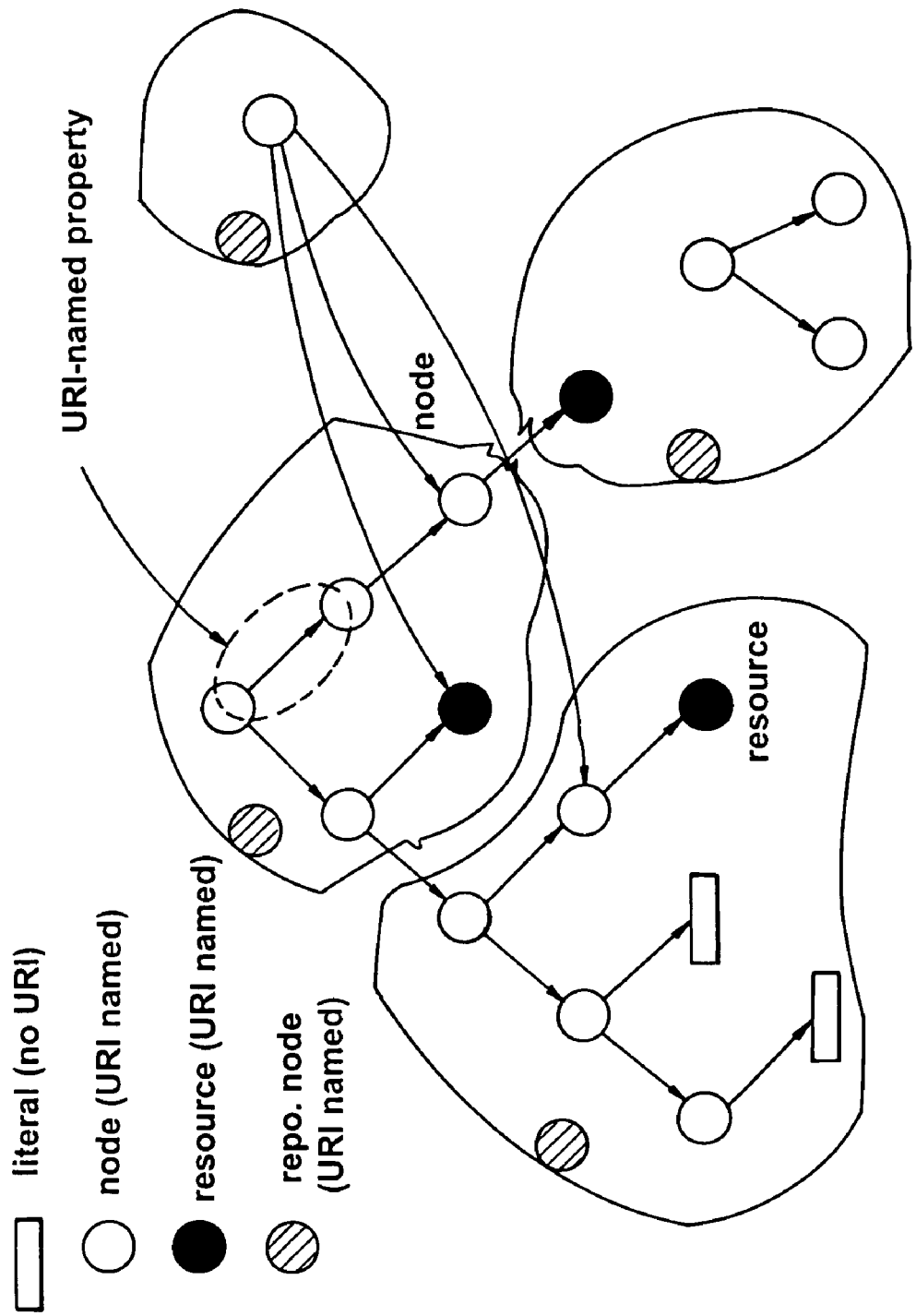
FIG. 6 shows another directed graph extending over more than one repository, similar in some ways to that of FIG. 5.

FIG. 6 shows another example of the property of a node extending into a different repository from the repository that hosts the node itself. Parent nodes and resource nodes can be part of more than one directed graph.

The present invention reside at least in part, for some embodiments, in the use of a protocol for repository communication that is constructed/defined using on-the-wire packets of information. Thus makes the data structure model more widely useful than if it were add-on, bespoke, construct or extension of a specific tailored protocol. Using http tools to provide the functional infrastructure required to be recognised as a protocol—meeting repository is an elegant solution to our needs.

It will be helpful at this time to specify in more detail the protocol employed by aspects of the present invention.

Specification of Protocol

We will now go on to specify one preferred, indeed some features are highly preferred, protocol for interacting with the digital object management system/software of the data structure of a repository.

Looked at in one way, some embodiments of the present invention use an on-the-wire protocol mapped onto whatever repository-level data/content management system they happen to operate. Perhaps they operate a native on-the-wire protocol (in which case there is no need for a mapping binding CMS expressions to on-the-wire protocol expressions), or perhaps they do not (in which case a mapping is desirable).

Section 1—General Introduction

The specification for the protocol defines a common abstraction for repositories, providing client applications with a uniform view of diverse repositories. One goal of the abstraction of many embodiments of the invention is to enable client code to be independent of any particular repository technology. A second goal of the abstraction of many embodiments of the invention is to provide a way in which services that harmonize different metadata schemas can be viewed by clients as specialised kinds of repository.

The term repository is used very broadly here, and includes relational databases, object databases, XML databases, RDF triple stores, CRM systems, CM systems, DAM systems and file systems, SAN/Cluster file systems, a http or FTP server, a WEBDAV server, a Jena/RDF metadata store, an enterprise application. Any of these technologies could form the basis of a compliant repository. Consequently, this specification has to be compatible with a variety of underlying data models (such as graphs, trees, sets, tables, etc).

The term compliant repository is used to refer to a repository that implements the interfaces defined by the specification.

There are two different contexts for a compliant repository:

In the first context the repository is referred to as a stand alone repository.

Everything needed to be a stand alone repository is defined by the specification—it is stand alone.

In the second context the repository is referred to as a content services framework repository (CSF repository), implying it is a component of a larger content services framework (CSF) deployment. This places some additional requirements on the repository, namely that it should register itself with a service manager as a content service, which will enable other content services to discover and interact with it.

The majority of this specification applies to both contexts.

The specification defines a core repository interface, which all compliant repositories are expected to implement. The specification also defines a series of data-model-specific interfaces (e.g. a graph interface). A given repository exposes its data by implementing one or more of these data-model-specific interfaces.

The native version of the specification defines the graph interface, which exposes data as a graph of nodes connected by properties. In general, the data-model-specific interfaces will look very different to each other, in terms of the operations they support and in the way in which significant items of data are identified.

Generally, the interfaces defined in this specification are defined as web services, rather than as software APIs. This allows a wide range of implementations, in different programming languages.

In many preferred embodiments, we use WSDL 1.1 for specifying abstract interfaces and concrete protocol bindings. We have sought to follow the REST architectural principles throughout: the default binding for each of the interfaces is HTTP, and these bindings make appropriate use of HTTP methods (e.g. all safe operations are mapped to HTTP GET). This approach maximises the compatibility of compliant repositories with the web, allowing deep linking to individual items of data.

The approach taken in this specification allows scalable, highly distributed implementations of repositories to be developed. These distributed repositories share the same set of interfaces as simple, single machine repositories. That is, we enable the distribution to be essentially transparent.

We have concluded that for many embodiments of the invention we want a repository abstraction that is platform independent (i.e. operating system and programming language independent). The way to do that, we believe, is to define repository interfaces as on-the-wire protocols, not as API's.

Repositories should be useful both as stand alone repositories, and as part of a CSF deployment (but they should not assume the existence of other CSF services).

Repositories should be part of the web information space, and be built on http, using HTTP GET.

Repositories should be compatible with, but not predicted upon, the semantic web and RDF (i.e. it should be possible to obtain RDF representation from a repository).

We wish to use opaque URIs, http GET for safe operations, and http POST for unsafe (state changing) operations.

The repository interfaces should be compatible with a web servicing model, and should be expressible in WSDL1.1 (in many embodiments, at least).

The repository interfaces should be extensible.

The above is not possible using a known approach: JSR-170, WEBDAV, RDF, etc. all fall short.

Resources represent the actual content and are defined in the same way as web resources: they are uniquely identified with URI. The capabilities of a resource depend upon the schema part of the URI. For example http://resources can be accessed using http GET and modified by using http POST. They can be typed (e.g. using the mime-type system. Content negotiation can allow multiple representations in bit stream. As another example fttp://resources can be accessed/modified using the FTP protocol.

They are untyped, and have a single representation in bit stream.

In section 2 of the specification (informative) we recognise some broad implementation models for compliant repositories, including native repositories, proxy repositories and virtual repositories.

In section 3 of the specification (informative) we expand on the notion that repositories can expose their data in different ways, using data-model-specific interfaces. We take a brief look at current data storage technologies, and the data models that underpin them.

In section 4 of the specification (normative) we describe the repository interface informally.

In section 5 of the specification (normative) we describe the graph interface informally. This section also covers node and listener interfaces.

In section 6 of the specification (normative) an RDF-statement-set interface is discussed.

In section 7 of the specification (informative) we describe some design patterns than may be useful when designing an application data model.

In section 8 of the specification (normative; optional) we define additional requirements on a compliant repository when it is running in a content services framework (CSF) context.

Section 2—Classes of Repository (Informative)

Figure 7:
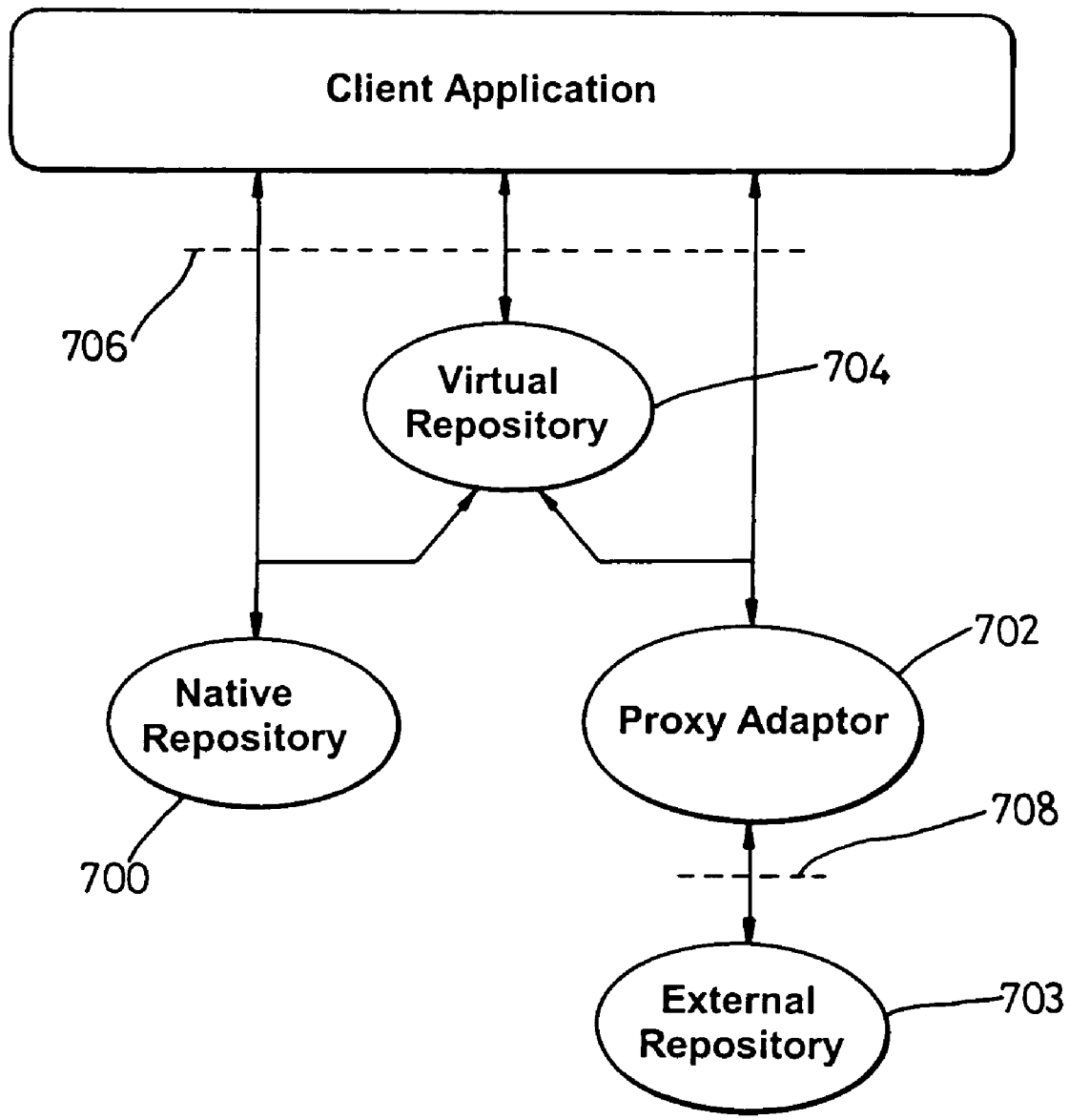
FIGS. 7, 8A and 8B show schematically virtual repositories.
Figures 8A, 8B:
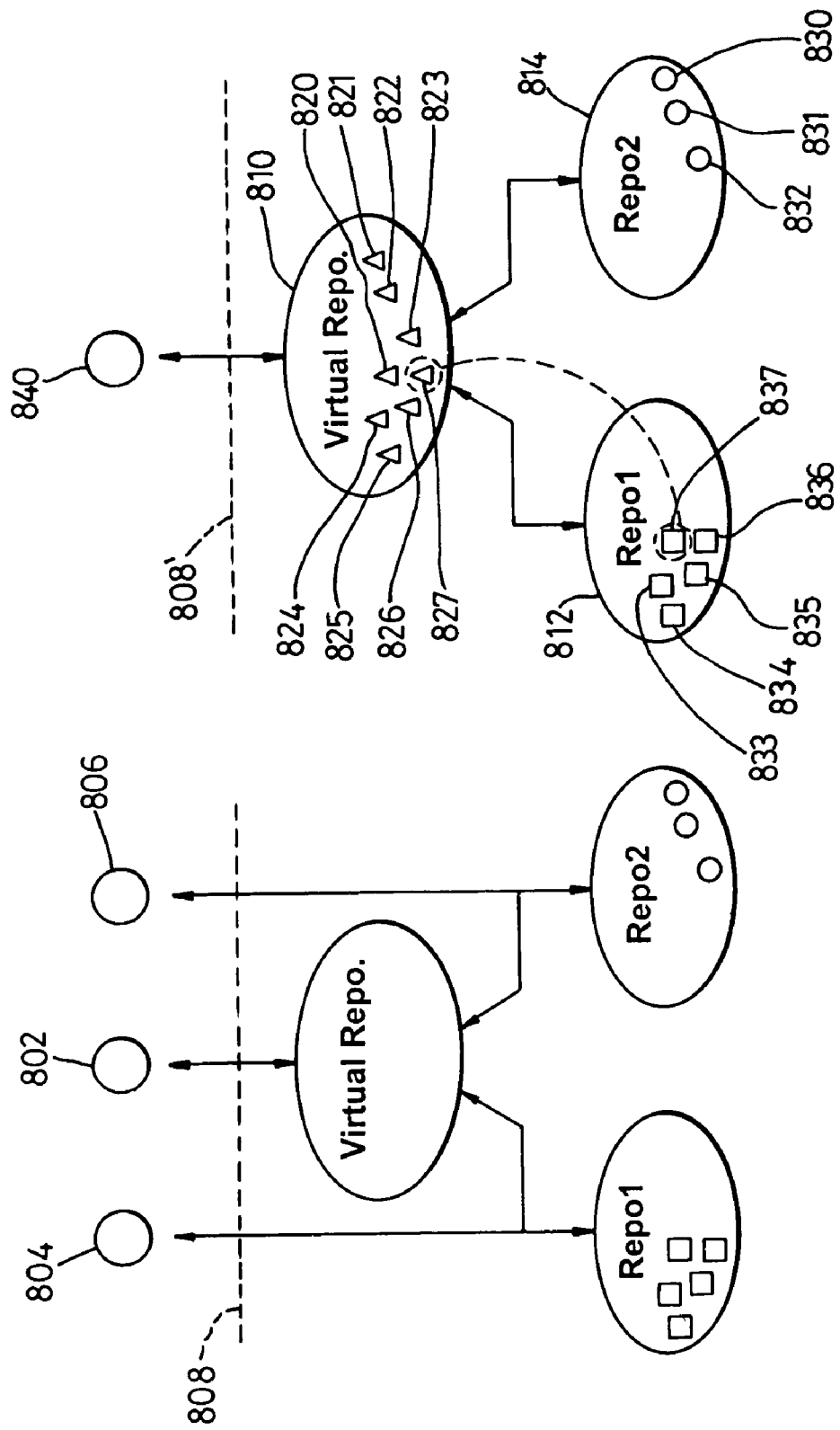

Within this specification, we recognise three broad approaches to implement a repository, as illustrated in FIGS. 7, 8A and 8B, which show three broad classes of repository.

Repositories

The first case to consider is where the repository is completely self-contained. Everything required by this specification is implemented solely by the repository. We will call this kind of repository a native repository. It is illustrated as reference 700 in FIG. 7.

Proxy Repositories

The second case is where an existing repository technology is wrapped to make it compliant with this specification. In this case, illustrated as 702 in FIG. 7, the functionality is split between the proxy (which implements the interfaces defined in this specification), and the external repository referred 703, (which actually stores the data). The proxy communicates with the external repository using a protocol or API which is outside the scope of this specification, such as WebDAV, JSR 170, FEDORA, BUCKETS etc.

Note, although we recognise the native and proxy repositories as distinct implementation patterns, both appear identical when viewed by a user, e.g. an internet-connected user, viewing the repositories through the interfaces defined in this specification.

Virtual Repositories

The third case is where the repository is virtual, and offers additional services (for example, federated search, metadata mapping, etc) operating across one or more existing compliant repositories. This is illustrated as 704 in FIG. 7. By implementing this specification, the virtual repository projects the same interface to its clients as any of the real (i.e. native or proxy) repositories.

FIG. 7 also shows at 706, schematically, the interface(s) defined by the specification of this embodiment of the invention, and at 708 an interface with an external repository (non-native).

In the virtual repository case, there are really two sub-cases to consider, illustrated in FIGS. 8A and 8B. FIGS. 8A and 8B assumes the graph interface (see later), where the repositories host nodes and the different shapes signify different node types.

In the first variant, shown in FIG. 8A, the virtual repository implements only the graph interface, referenced 802 (e.g. graph.search( )). Node interfaces 804 and 806 are not implemented by the virtual repository: they are implemented in the underlying repositories (e.g. the specification interface is again illustrated by the dotted line, this time referral 808). For example, imagine a virtual repository that just implemented federated search. This might return references to nodes in the underlying repositories. The nodes are in no way modified by the virtual repository. Consequently, if the underlying repositories use different node types, this is visible to clients.

In the second variant, a virtual repository 810 completely encapsulates underlying repositories 812, 814, such that all node access is via the virtual repository 810. In effect, the virtual repository provides a proxy node (triangles 820 to 827) for each real node (squares and circles 830 to 837). This second approach allows the virtualization to modify the structure of the real nodes, for example, by performing metadata mapping. Thus, a single object schema (the triangles) can be presented to the clients and differences in the underlying nodes are hidden (metadata integration). A proxy node will always contain a link to its real node, using a special property. Node 840 is a graph interface and node interface.

Other Classes of Repository

Although we have described three implementation models here, this specification could be implemented by any service, for whatever reason is appropriate.

Section 3—Repository Data Models (Informative)

A repository is essentially a container for data—content and/or metadata. Applications interact (create, retrieve, update, delete etc) with the data in the repository through the interfaces exposed by the repository.

In section 1 we introduced the idea that compliant repositories expose different interfaces based on different underlying data models. Within this speciation, we refer to these interfaces as data-model-specific interfaces. This section develops this idea with some more concrete examples.

FIG. 9 lists a number of existing technologies, and their underlying data models.

It is apparent from the table of FIG. 9 that there are far fewer underlying data models than there are technologies. In fact, there are really three: graphs (which include trees), tables and sets. Thus, we anticipate a small number of data-model-specific interfaces covering a wide range of existing data storage technologies. Each of these data-model-specific interfaces will define a model of interaction that is appropriate to that data model.

We will define in this specification only one data-model-specific interface: the graph interface. This interface is primarily focused on representing structured content as a directed graph of nodes linked by properties (the arcs). Nodes represent application level objects, and properties model relationships between objects. As trees are a subset of graphs, this interface is compatible with the hierarchically data models typically used by existing file systems, document management systems and content repositories. The graph interface is defined in section 4.

It is equally possible to define an RDF-statement-set interface, which will be more suitable for RDF metadata repositories. Within this interface, the primitive data element will be a single RDF statement (that is, a triple comprising subject URI, predicate URI and object URI or literal). The interactions through this interface will tend to be query oriented (i.e. return the statements whose subject is X), rather than browse oriented (i.e. return statement $S_{12}$). This is because the RDF data model does not explicitly assign identifiers to statements (which would then become quads). This does not really matter, because the applications that work with RDF typically pass around serialized sets of statements. That is, RDF statements are typically passed by value anyway, rather than passed by reference.

The above descriptions of the graph and RDF-statement-set interfaces serve to illustrate that the content references are central to some data models, and completely absent in others. This difference is rendered immaterial by our decision not to attempt to mandate a single content reference scheme that applies to all interfaces.

When an application interacts with a repository, then depending on what it is trying to accomplish, one interface may be more appropriate than another. For example, an RDF based application that is attempting to index content across several repositories may prefer the RDF-statement-set interface over the graph interface. In practice, the application developer will probably have written the application assuming a specific interface to be available. If that interface is not available at a given repository, then interaction with that repository will not be possible. This presents an interoperability problem. To guarantee interoperability (or at least enhance the probability of interoperability), either each repository must implement all possible interfaces, or each application must be able to function on any available interface. If the number of possible interfaces became large, then this would become a problem. However, we are not expecting this to be the case, and for the small number of interfaces we expect to define, many repositories will support multiple interfaces. That is, we expect that in many embodiments of the invention the burden of dealing with multiple interfaces to be handled by the repositories, rather than the applications. In variants some, or all, of this burden may fall upon the client application(s).

Section 4—the Repository Interface (Normative)

Figure 10:
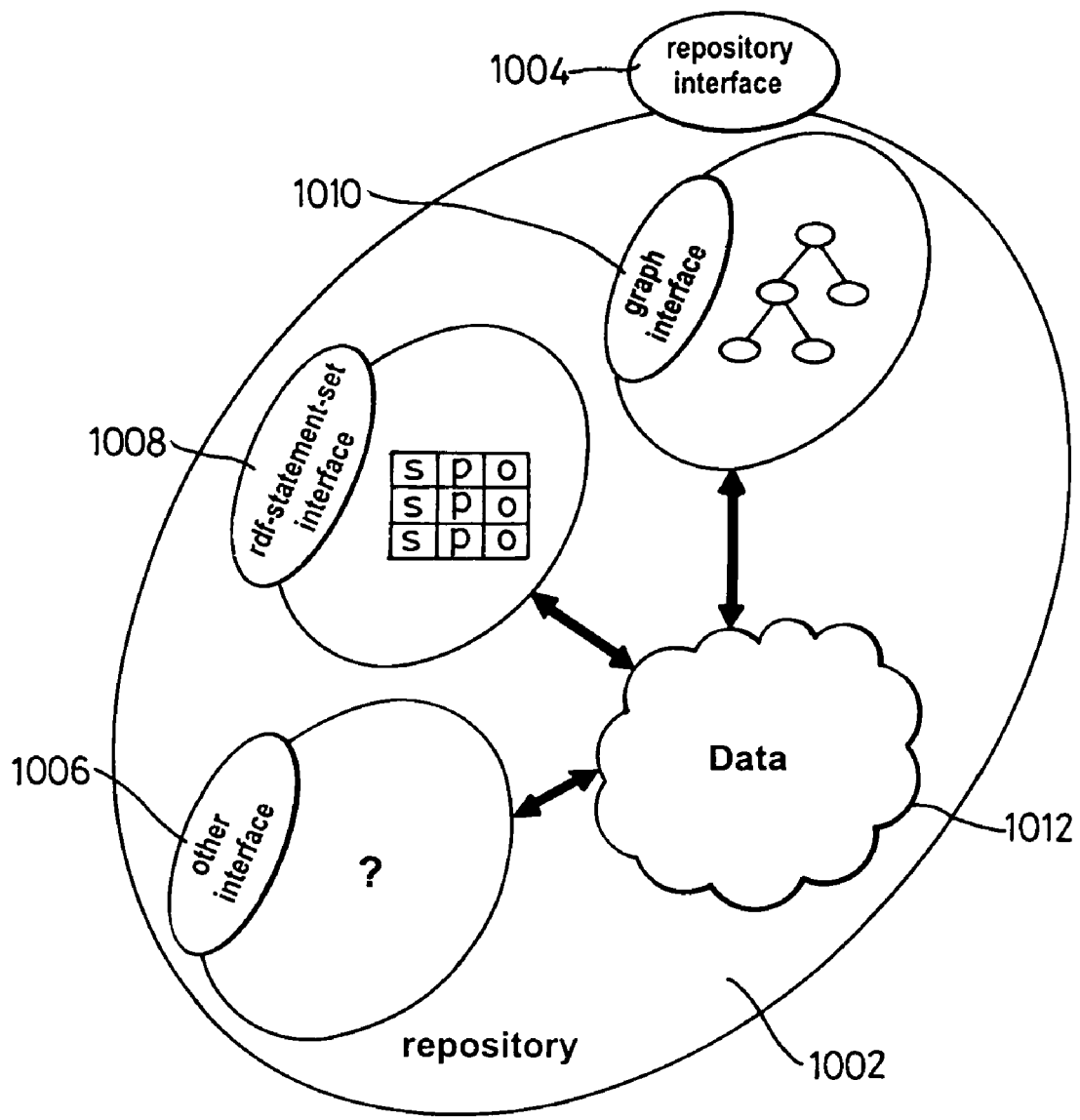
FIG. 10 illustrates a repository and associated repository interface.

FIG. 10 illustrates a repository 1002 and its repository interface 2004. The repository interface 1004 is the single interface that all compliant repositories must implement. It is common to all repositories that operate within our system. This interface defines a single operation Repository.getCapabilities( ), which clients use to discover the capabilities of the repository, including which data-model-specific interfaces are implemented and their bindings. Repository.getCapabilities( ) returns repository level metadata and details of data-model-specific interfaces.

In a CSF context, a compliant repository should register its repository interface (including the default binding defined below, and any additional bindings) with the service manager, thus allowing other content services to discover it and interact with it. However, if a repository cannot locate a service manager, it may choose to fall back to operating in standalone mode.

In a standalone context, there is no requirement to register any interfaces, and interactions with the repository can be bootstrapped using the default binding of the repository interface, defined below.

Definitions

Compliant Repository—An entity that complies with the specification of the protocol of this embodiment of the invention. A compliant repository must implement the repository interface 1004, and may implement one or more data model specific interfaces 1006, 1008, 1010 such as the graph interface 1010. A compliant repository may be implemented on a single machine, or may be distributed across several machines. This distinction is transparent to clients. Note, within this specification, the term compliant repository is often abbreviated to just repository.

Repository interface, referenced 1004,—a generic interface that all compliant repositories must implement. The repository interface is defined in section 1.2. In a CSF context, this interface should be registered with the service manager.

Data-model-specific interface, referenced 1006,—an interface through which a repository makes its data visible. The majority of interaction with a repository is usually via its data model specific interfaces. Each data model specific interface is underpinned by a different data model, and defines operations appropriate to that model. They provide different views of the same underlying data. In a CSF context, all data-model-specific interfaces should also be registered with the service manager. Data-model-specific interfaces expose the same in fundamentally different ways.

Graph interface, referenced 1010,—a data-model-specific interface that exposes data as graphs of nodes and resources, and that repositories may implement. When viewed through this interface, data within a repository is exposed as a directed graph of nodes. The graph interface is defined in section 5. It is the requirement of all compliant repositories to have a graph interface that enables this embodiment of the invention to be so widely interoperable between repositories, and to support distributed, virtual, repositories.

RDF-Statement-Set interface, referenced 1008,—a data-model-specific interface that repositories may implement. When viewed through this interface, data within a repository is exposed as a set of RDF statements. The RDF-statement-set interface is defined in section 6. Of course, the repository data itself, referenced 1012, has its native storage format hidden from outside users since they have to go through one of its interfaces 1004 to 1010. Typical storage technology includes file systems, RDB, XMLDB etc.

4.2 Repository Interface Operations

The repository interface and its default HTTP binding are defined formally using WSDL (in this example, at least).

4.2.1 Repository.GetCapabilities( )

The Repository.GetCapabilities( ) operation returns a description of the capabilities of repository, covering the following areas:

A list of the data-model-specific interfaces supported (identified by well known URI) and a protocol binding for each interface, using WSDL as a syntax.
Repository description: human readable
Repository owner: human readable
Capacity: machine readable (current, maximum)
Performance: machine readable (bandwidth, quality of preservation)

The Repository.GetCapabilities( ) operation returns the repository capabilities using an XML schema:

4.2.2 Default Binding of the Repository Interface

Each repository is identified by a resolvable URI, known as the repository URI. Retrieving this URI is the same as executing Repository.getCapabilities( ), i.e. the repository URI is the default binding for the Repository.getCapabilities( ) operation.

If the repository URI is fetched, the result should be an XML document describing the repository capabilities. An example is shown below.

As mentioned above, in one method getcapabilities( ), returns an XML document:

```
<?xml version="1.0" encoding="UTF-8" standalone="yes"?>
<?xml-stylesheet type="text/xsl" href="/stylesheets/repo.xsl"?>
<RepoCapabilities xmlns="http://csf.hpl.hp.com/definitions/1/0/repo/types/">
  <Description>HP DMSD Phase 1 Repository</Description>
  <Owner>David Banks - dbanks@hp.com</Owner>
  <Software>based on Jetty version 4.2</Software>
  <RepoCapacity>
     <Current>1000000</Current>
     <Maximum>10000000</Maximum>
  </RepoCapacity>
  <RepoPerformance>
     <ConnectionRate>100</ConnectionRate>     <DataRate>1000000
     </DataRate>
  </RepoPerformance>
  <Interfaces>
     <Uri>http://dbanks.hpl.hp.com:8181/graph</Uri>
     <Wsdl>http://dbanks.hpl.hp.com:8181/graph?wsdl</Wsdl>
  </Interfaces>
</RepoCapabilities>
```

Default binding: HTTP GET <repository interface URI>

The portion of the XML document from <description>HP DMSD . . . to </Repo Performance represents repository-level metadata, and the portion of the XML document from <interfaces> to </interfaces) represents data-model-specific interfaces. In this example there is a native interface, and a WSDL interface.

Section 5—the Graph Interface (Normative)

The graph interface exposes repository data as a directed graph. The leaf nodes of the graph ("resources") hold bit-streams (either content or metadata). The non leaf nodes of the graph ("nodes") are used to model higher level application objects, and collections of objects. The arcs between the graph nodes ("properties") model relationships between objects. From a topological perspective, the graph may contain cycles, and need not be fully connected.

Nodes and resources are uniquely identified (in a global sense) with URIs. Thus, the graph can be said to exist in the information space we know as the web, rather than outside of this space. In effect, there is a single global graph, partitioned across multiple repositories, where each repository is responsible for hosting part of the graph. As far as applications are concerned, the boundaries between repositories should be fairly transparent. Just like on the web, when following a link from a parent node to a child node, it should make little difference if that child node is on a different repository. Collections that span repositories fall out naturally in this model.

5.1 Definitions

Some definitions will be given with reference to FIG. 11A, which is a schematic representation of a data model for a graph interface.

Figure 11A:
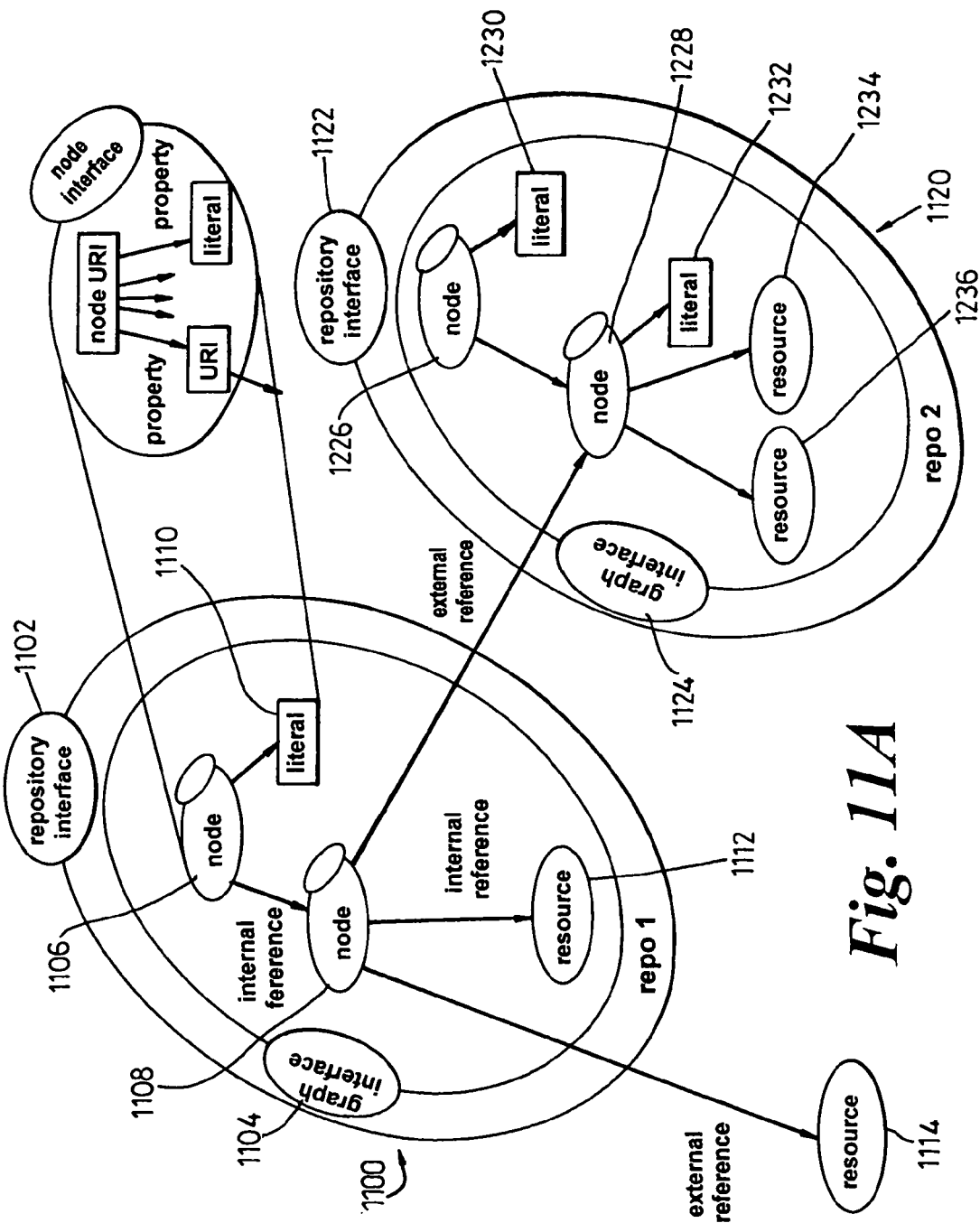
FIG. 11A illustrates schematically a data model for a graph interface.

As shown in FIG. 11A, a first repository 1100 has a repository interface 1102, a graph interface 1104, object nodes 1106 and 1108, and reference nodes 1110 and 1112.

An external reference node 1114, external of the physical repository 1110, is related to node 1108 as a child node. A second repository 1120 has a repository interface 1122, a graph interface 1124, object nodes 1226 and 1228, and resource nodes 1230, 1232, 1234 and 1236.

Some definitions will help:

Node—A node is a non-leaf element in the graph, and is made up of an ordered set of properties. The set of properties associated with a node forms the state of that node. Nodes are uniquely identified with resolvable URIs. Nodes can be typed. The type can itself be a URI. Nodes are always hosted by repositories; in particular, each node is hosted by one and only one repository. Nodes are used to represent application level objects and collections of objects. Nodes do not store content directly. Instead, they use properties to point to one or more resources that store content.

Node type—A node type defines the set of properties a node must have, before it can be said to conform to the type. A node type is identified with a URI, which resolves to the schema that defines the type. Within this specification we define a simple schema language for defining node types, which can be readily mapped to standard scheme languages, such as Relax NG and OWL. A node is associated with a node type using either the repo:assignedType or repo:inferredType property. Node types are defined further in section 5.8.

Node interface—The node interface is an interface through which the state of a node can be accessed and manipulated. Each node exposes its own node interface. A specific (HTTP) protocol binding for the node interface is defined in section 5.15. At this point, no other bindings are anticipated (but we do not exclude them). In a CSF context, it is not required (or expected) that each node interface will be registered with the service manager.

Resource—A resource is a leaf element in the graph that stores content, or metadata, as a bit-stream. Each resource is identified with a single resolvable URI. Although a repository may host resources with different URI scheme, a particular resource is only accessible through one protocol. More specifically, the protocol used to access a resource, and consequently the capabilities of the resource, depend on the URI scheme. For example, http://resources may support content negotiation, where as ftp://resources will not. Resources may be hosted by repositories, or may just be any existing web resource.

Property—A property is part of the state of a node; it does not exist independently of the node. A property has a property type and a property value. Properties represent typed relations between application objects. That is, properties link nodes to other nodes, resources or literals.

Property type—A property type defines a domain and range constraint, restricting the use of a property to a particular context. The domain constraint restricts source of the property (by node type). The range constraint restricts the value of the property (by node type, by resource mime type, or by literal data type). A property type is identified with a URI, which resolves to the schema that defines the type.

Property value—A property value is either a literal property value or a URI property value.

Literal property value—a property value that is a literal, used for properties that point to simple data values, such as integers, strings, etc.

URI property value—a property value that is a URI, used to form links between nodes in the graph.

Literal—A literal is a sequence of characters, explicitly typed using an XML schema data type. Literals do not themselves have URIs and so are not uniquely identifiable.

Internal reference—An internal reference is a URI property value that refers to a node/resource that is hosted by the parent node's repository.

External reference—An external reference a URI property value that refers to a node/resource that is not hosted by the parent node's repository.

Hosting—A repository that implements the graph interface is said to host nodes and/or resources meaning it is responsible for persisting their state, and handling requests for access or update. Hosting is a logical concept. Where a repository is distributed across multiple machines, it is the repository that is said to host the nodes and/or resources, not the individual machines.

Resolvable—The URIs used to identify nodes and resources must be resolvable to an end point through which operations can be invoked. The capabilities of a node are fixed; i.e. all nodes must implement the same node interface (or a minimum capacity). The capabilities of a resource vary, depending on the URI scheme used to identify it.

Repository—In the context of the graph interface, repositories act as hosts for regions of the graph. Each node belongs to exactly one repository; that repository is said to be responsible for the node. Another way of saying this is that repositories represent a set of non overlapping partitions of the global graph. Since resources need not be hosted by repositories, the partitions cannot be said to completely cover the graph.

5.2 Nodes

The purpose of nodes is to model individual application level objects, or collections of application level objects. More specifically, there are two general roles that nodes can assume: object nodes and collection nodes. Note, this distinction should be thought of as part of the application's object model, and not something the repository is explicitly aware of. In particular, we do define two primitive node types.

5.2.1 Object Node Role

Figure 11B:
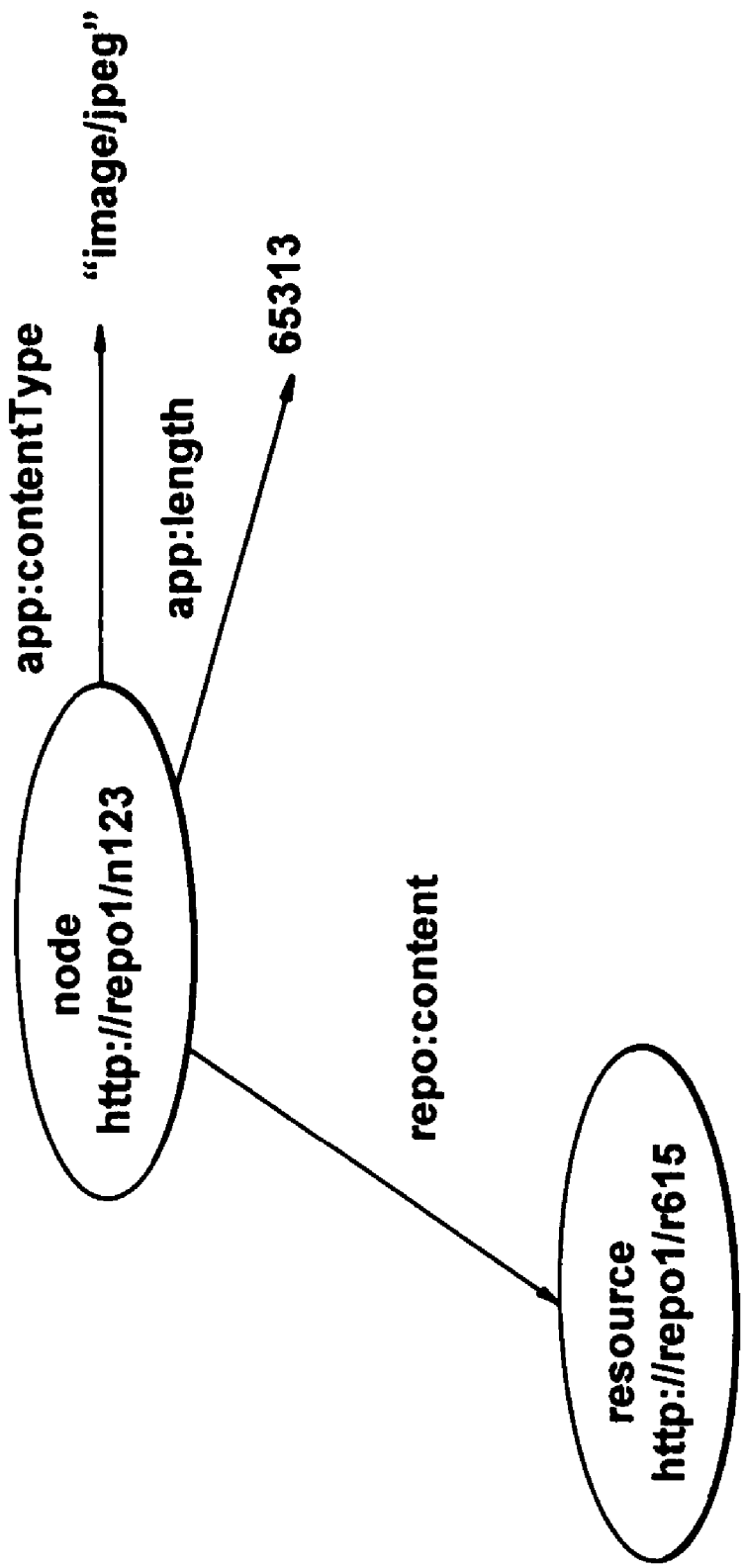
FIGS. 11B and 11C illustrate an object node and a collection node respectively.

A node can represent an individual application data object. This is referred to as an object node, and is illustrated in FIG. 11B.

In this role, the node is paired up with a resource. The node acts as an aggregation point for low level metadata about the resource, and the resource simply contains the bit-stream. Variants of this are presented as design patterns in sections 7.1.1 and 7.1.2.

5.2.2 Collection Node Role

Figure 11C:
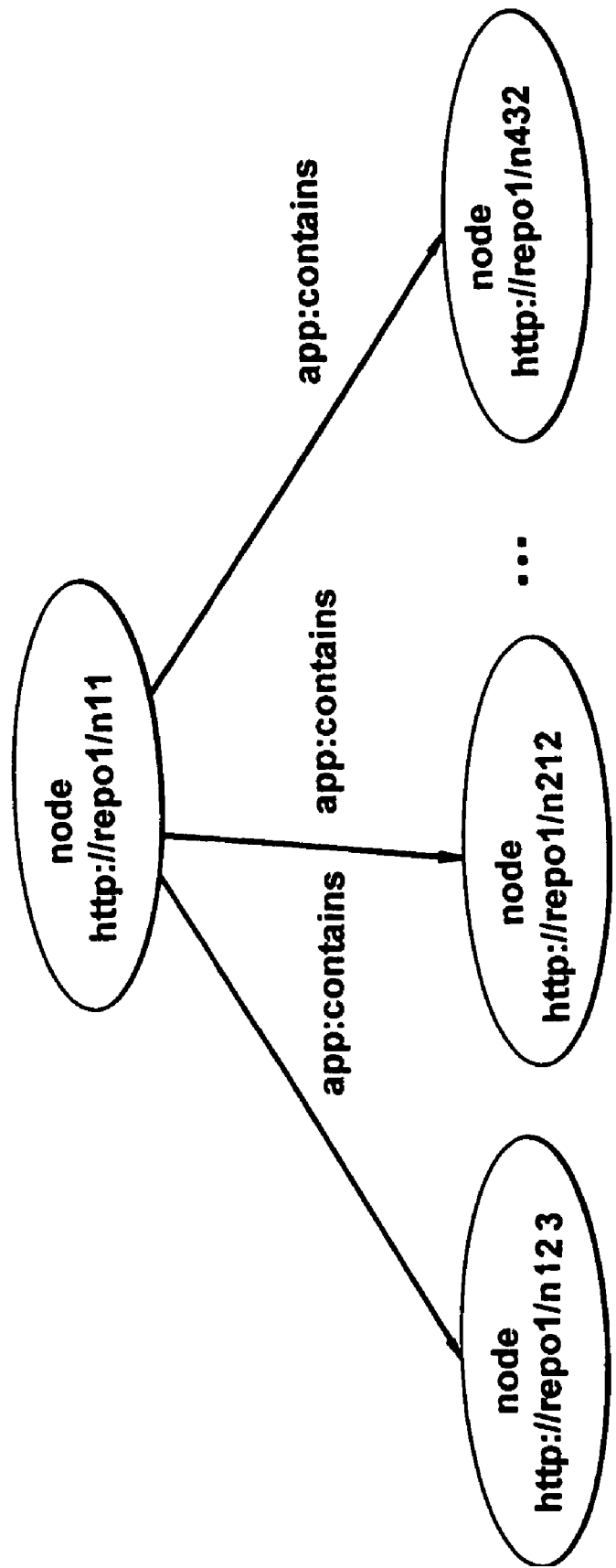

A node can represent a collection of application data objects. This is referred to as a collection node, and is illustrated in FIG. 11C.

In this role, the parent node represents the collection, and members of the collection are represented as child nodes. The property linking the collection to its members is part of the application schema.

5.2.3 Node Identification and Binding

Nodes are identified with unique URIs, allocated when the node is first created. These URIs should be http:// or https://

URIs, because the only defined binding of the node interface is HTTP. The node interface (defined in section 5.15 is the primary means for interacting with the node during its lifetime. Given a node's URI, it is possible to algorithmically generate a concrete binding of the node interface, as the binding rules for the node interface are defined very rigidly.

5.2.4 Node Lifecycle

A new node is created by invoking a Graph.newNode( ) operation on a repository. This causes the repository to create a new node, and to assign a URI to uniquely identify the node.

The set of properties associated with a node represents the state of that node. This state can be accessed and manipulated through a set of operations that together form the node interface. For example, the Node.get( ) operation is expected to return an XML representation of the entire state of the node. Other operations allow a subset of the state to be returned, or the state to be modified.

Nodes are designed to be compatible with web resources. One should be able to retrieve a node using a web browser, and see a representation of the state of the node. When a HTTP GET is performed on a node URI, the default encoding will be application/XML, and a suitable XSL style sheet could be provided to get a friendly rendition of the node. The XML schema used to represent node state is defined later in this specification. [is it?]

A node is destroyed by invoking the Graph.destroyNode (NodeURI) operation on the node. No further operations are permitted on the node. Furthermore, a repository should never reuse the old node URI.

5.2.5 Node Representations

This specification defines a default representation for the state (or partial state) of a node. This representation is an XML document, conforming to the XML schema shown below. A repository may support additional representations, such as an RDF representation. A client can use HTTP content negotiation to select the appropriate representation.

Some points relating to node representation in this embodiment include:

All of the node accessor methods use HTTP GET
This allows repositories to offer mulitple representations using HTTP content negotiation
The default representation is XML:

```
<?xml-stylesheet type="text/xsl" href="/stylesheets/node.xsl" ?>
-<Node xmlns:="http://csf.hpl.hp.com/definitions/1/0/repo/types/"
    about="http://dbanks.hpl.hp.com:8181/node/1004"
    numproperties="6">
  <Property type="http://somedomain/coinschemapath#backImage"uri=
"http://repo1.hpl.    hp.com/node23"/>
  <Property
type="http://somedomain/coinschemapath#diameter">22</Property>
  <Property type=http://somedomain/coinschemapath#frontImage uri=
"http://repo1.hpl.    hp.com/node22"/>
  <Property    type="http://somedomain/coinschemapath#metal">
nickel-brass</Property>
  <Property    type="http://somedomain/coinschemapath#name">
Pound Coin</Property>
  <Property type="http://somedomain/coinschemapath#thickness">3
  </Property>
</Node>
```

The use of style sheets allows nodes to be rendered in a brower friendly fashion.

5.3 Resources

The purpose of resources is to store bit-streams representing actual content or metadata. Resources are always leaf nodes in the graph.

This specification deliberately places few constraints on what constitutes a resource. As long as it has a URI, and is resolvable, then it can be treated a resource. Some resources may be hosted by repositories, as defined in this specification. Other resources may just be web pages hosted by conventional web servers. The intent here is to maximise compatibility with current web technologies, rather than creating an alternative model.

There is no notion of attaching properties directly to resources, since requiring this would make our resource definition incompatible with existing web resources. Instead of assigning properties to resources, a resource will normally have an associated parent node, where properties about the resource are expressed. This is described as a design pattern in section 7.1.1.

There is no attempt to provide a separation between a logical resource, and the protocols used to access it. Whilst it is possible for an implementation to back two resources (e.g. http://repo/r123 and ftp://repo/r123) by the same bit-stream, these would appear in the graph as two separate resources. If an application needs to provide multi-protocol access to a resource, a possible approach is described as a design pattern in section 7.1.2.

5.3.1 Resource Interaction

A knock on effect of defining resources in this way is that, unlike nodes, there is no single uniform interface used to interact with resources.

More specifically, given that a resource is identified with a single unique URI, it is the scheme part of the URI (e.g. http, ftp, rtsp) that dictates the type of interaction that is possible with the resource. If the URI scheme is http, then a client is expected to interact with the resource using the HTTP protocol. If the URI scheme is ftp, then the FTP protocol should be used, and so on.

This specification places no constraints on the URI schemes that can be used to identify a resource.

5.3.2 Resource Representations and Typing

A resource representation can be thought of as the actual bit-stream returned to a client that requested the resource. However, the relationship between a resource and the possible representations of the resource is URI scheme dependant. Within some protocols (like HTTP) there can be multiple representations associated with a resource, and a client can use content negotiation to select an appropriate one. In other protocols, like FTP, there is only a single representation of each resource.

Within this specification, representations of resources can be typed, using the mime-type system. However, because some protocols, like FTP, have no support for communicating mime-types, typing is optional. The interaction between typed/un-typed representations of resources and property validation is explored in section 5.6.

To summarise, as far as this specification is concerned, a resource should be resolvable to at least one bit-stream. That bit-stream may be typed, or un-typed.

5.3.3 HTTP Resources

This section summarizes the capabilities of resources identified with http:// or https://URIs.

The HTTP protocol allows the set of methods supported by a HTTP resource to be determined using the OPTIONS method. This may return just HEAD and GET, if the resource is read only. Alternatively, it may return HEAD, GET, POST, PUT, DELETE if the resource is modifiable. Indeed, the resource may even be a WebDAV resource, in which case the OPTIONS method will return many WebDAV specific operations.

HTTP supports content negotiation, allowing different representations of the resource to be selected.

HTTP also supports explicit mine-typing of responses, so all representations of HTTP resources are typed.

5.3.4 Resource Lifecycle

For resources hosted by repositories, the lifecycle of a resource is as follows.

A new resource is created by invoking the Graph.newResource(URIScheme) operation on a repository. This causes the repository to create a new resource, and to assign a URI to uniquely identify the resource.

The URIScheme parameter allows the client to indicate to the repository the protocol it would like to use to interact with the resource. If the repository does not support the scheme specified, the operation will fail. The URIScheme parameter may be omitted, in which case the repository will select a default.

The set of URI schemes supported by a particular repository may be determined using the Graph.getCapabilities( ) operation.

A newly created resource will initially hold an un-typed bit-stream, of zero length.

A resource is destroyed by invoking the Graph.destroyResource(ResourceURI) operation on the resource. No further interaction is permitted with the resource. Furthermore, a repository should never reuse the resource URI.

Given only a resource URI, it is hard to determine the repository that is responsible for that resource, if indeed there is one. The graph interface provides a Graph.isResponsibleFor( ) operation, which allows ownership to be tested.

5.4 Persistent Naming

Node and Resource URIs should be useable as stable, persistent content references. In particular, they should be robust to:

Changes in repository implementation—A node/resource URI should be independent of any particular repository implementation. Thus, a repository owner should be able to replace their repository implementation with a different one, without needing to update URIs.

Changes in repository internal structure—A node/resource URI should be independent of any physical structure within a particular repository. Thus, in a repository implementation distributed across multiple machines, adding a new machine and migrating some of the nodes/resources to that machine should not change their URIs.

Transfer of nodes/resources between repositories—It should be possible to transfer a node/resource from one repository to another, and not have existing references break. This is slightly weaker than saying the URI must stay the same. We are simply saying that there should be a procedure which the client can follow to determine the updated URI for the node. An example may be HTTP redirect, or looking up the new node location in a global directory.

This specification does not mandate that a repository follow a particular approach when assigning node and resource URIs. However, a repository implementer should bear in mind the above three points.

A factor to consider here is that URIs do not just change, people change them because they were created laxly in the first place. It is common on the web to see URIs that end in .pl, .asf, .cgi etc, hinting at the implementation, and causing problems when the implementation changes. Similarly, a URI that includes /disk1/ may not even survive the next rebuild of the server. It does not have to be this way. A lot of people do not know that servers (such as Apache) give you a lot of control over a flexible relationship between the URI of an object and where a file which represents it actually is in a file system. Think of the URI space as an abstract space, perfectly organized. Then, make a mapping onto whatever reality you actually use to implement it. Then, tell your server. You can even write bits of your server to make it just right. When developing a repository implementation, it may often be important to provide a similar degree of flexibility.

5.5 Content References

Within the CSF context, services need to communicate references to content held on repositories.

For example, a workflow service might want a container to scale a particular image. The workflow service needs to pass two content references to the container: the first identifies the source image; the second identifies where to put the result. In this case, both these references will be resource URIs. In this model, it is the responsibility of the workflow service to create a new (empty) resource for the result, using the Graph.newResource(URIScheme) operation.

In another example, a workflow service might want a container to extract the ID3Tag metadata from an MP3 file, and add this as properties to a node. In this case, the source content reference is the URI of the MP3 resource, and the result content reference is the URI of a node.

These two example illustrate that content references can be resource URIs or node URIs. It is worth pointing out that these cannot be used interchangeably. If an operation pin is expecting a resource (say of type image/jpeg), then it will probably throw an incompatible type exception if it is passed a reference to a node, even if that node. Similarly, if a pin is expecting a node, it will expect to able to invoke the node interface and so will again throw an incompatible type exception if it is passed a resource.

5.6 Property Typing and Property Type Definitions

A property type defines a domain and range constraint, restricting the use of a property to a particular context. The domain constraint restricts source of the property (by node type). The range constraint restricts the value of the property (by node type, by resource mime type, or by literal data type). A property type is identified with a URI, which resolves to the schema that defines the type.

Property types are defined in this example using the following syntax:

```
<PropType about="http://somedomain/coinschemapath#metal">
    <Extends type="http:///csf.hpl.hp.com/repository/
    baseTypes#property"/>
    <Domain type="http://somedomain/coinschemapath#Coin"/>
    <Range type="xsd:string"/>
</PropType>
```

This defines in this example the metal property, which can only be attached to a Coin node, and whose value is a String.

5.6.1 Definition of Property Types

An example node type definition is given below:

```
<?xml version="1.0"?>
<RepoSchema
    xmlns="http://csf.hpl.hp.com/repository/typeSchema"
```

-continued

```
xmlns:xsd="http://www.w3.org/2001/XMLSchema"
xmlns:xsi="http://www.w3.org/2001/XMLSchema-instance"
xsi:schemaLocatian="http://csf.hpl.hp.com/repository/typeSchema">
<PropType about="http://somedomain/coinschemapath#metal">
  <Extends type="http:///csf.hpl.hp.com/repository/
  baseTypes#property"/>
  <Domain type="http://somedomain/coinschemapath#Coin"/>
  <Range type="xsd:string"/>
</PropType>
</RepoSchema>
```

This example defines a new property type, http://somedomain/coinschemapath#metal, with a domain constraint of http://somedomain/coinschemapath#Coin and a range constraint of http://www.w3.org/2001/XMLSchema#string.

Note, in general it is good practice to leave domain constraints as open as possible, since this allows the property to be re-used in contexts other than the original one.

A more complete Type Schema example is:—

```
<?xml version="1.0"?>
<RepoSchema xmlns="http://csf.hpl.hp.com/definitions/1/0/repo/schema/"
  xmlns:xml="http://www.w3.org/XML/1998/namespace"
  xmlns:xsi="http://www.w3.org/2001/XMLSchema-instance"
  xsi:schemaLocation="http://csf.hpl.hp.com/definitions/1/0/repo/schema/
  E:\dmsd\AssetUtility\phase1\definitions\1\0\repo\schema\repo-schema.
  xsd"> <PropertyType about="name">
    <Range type="xsd:string"/>
  </PropertyType>
  <PropertyType about="metal">
    <Range type="xsd:string"/>
  </PropertyType>
  <PropertyType about="thickness">
    <Range type="xsd:integer"/>
  </PropertyType>
  <PropertyType about="diameter">
    <Range type="xsd:integer"/>
  </PropertyType>
  <PropertyType about="frontImage">
    <Range type="http://somedomain/imageschemapath#Image"/>
  </PropertyType>
  <PropertyType about="backImage">
    <Range type="http://somedomain/imageschemapath#Image"/>
  </PropertyType>
  <NodeType about="Coin">
    <Extends          type="http://
    w3.hpl.hp.com/mediabusrepository#Node"/>
    <Property type="name" minOccurs="1" maxOccurs="1"/>
    <Property type="metal" minOccurs="1" maxOccurs="1"/>
    <Property type="thickness" minOccurs="1" maxOccurs="1"/>
    <Property type="diameter" minOccurs="1" maxOccurs="1"/>
      <Property       type="frontImage"       minOccurs="1"
maxOccurs="1"/>
    <Property type="backImage" minOccurs="1" maxOccurs="1"/>
  </NodeType>
</RepoSchema>
```

The <PropertyType> element declares a new property type.

The <Range> element specifies the expected type of the property value.

There is also a <Domain> element which can limit the use of the property to particular node types.

The <NodeType> element declares a new node type, in terms of the properties a valid instance is expected to have.

5.6.2 Property Domain and Range Constraints

A property type definition can include a domain and range constraint, restricting the use of a property to a particular context. An instance of the property is considered valid if the domain and range constraints are met. A domain constraint can restrict use of a property to nodes of particular types.

A domain constraint refers to a node type.

A range constraint can restrict the value of the property:
to URIs of Nodes of a particular type (i.e. by node type)
to URIs of Resources of a particular type (i.e. by mime type)
to Literals of a particular type (.e. by XML schema data types).

Property type inheritance is supported; range and domain constraints are passed from parent to child, and conflicts prohibited.

A range constraint is met if one of the following statements is true:

If the range constraint indicates an XML Scheme data type, the property value should be a literal value which matches the syntax of the data type (i.e. a validating XML parser would accept it).

If the range constraint indicates a specific node type, the property value should be the URI of a node with a matching node type (or a subtype thereof)

If the range constraint indicates a resource, then the property value should be the URI of a resource. Further, if the range constraint also includes a mine-type, then the resource should be a http:// or https:/resource, with a matching mime type.

A domain constraint is met if the following statement is true:

If the domain constraint indicates a specific node type, the parent node should have a matching node type (or a subtype thereof)

5.6.3 Property Inheritance

A property type definition may inherit from (i.e. extend) one or more other property types. In doing so, the child is said to be a sub-property of the parent. Conflicts may arise if the range and domain of the sub-property are defined differently to the parent property.

The following rules define what is permissible in this example of our specification.

If the range/domain of the sub-property is unspecified, it inherits the range/domain of the parent property.

If the range/domain of the sub-property is specified, it must either match the range/domain of the parent property exactly, or it must be a narrower definition.

For ranges/domains that are node types, a narrower definition means a sub-type of the parent node type For ranges that are literals types, a narrow definition means a XML data type that is a restriction of parent data type.

For ranges that are resource types, a narrower definition mean a compatible, but more restrictive mime type (e.g. image/jpeg is narrower than image/* which is narrower than */*)

In the case of range constraints, the range constraint of the sub-property should be compatible with the range constraint of the parent (i.e. if the parent is defined as a literal, the sub-property should not be defined as a node or a resource).

In the case of multiple inheritance, some additional rules are needed:

Multiple inheritance is only possible if the parent properties are mutually compatible.

If the range/domain of the sub-property is specified, it must either match the range/domain of each the parent property exactly, or it must be a narrower definition than each of the parent.

5.7 Pre-Defined Property Types

There are several properties defined by this specification, and that have special significance. All of these properties are defined within the repo: namespace, which is, for example, http://csf.hpl.hp.com/repository#.

5.7.1 repo:type

The repo:type property is the super-type of repo:assignedType and repo:inferredType.

5.7.2 repo:assignedType

The repo:assignedType is used to carry assigned type information about the node.

5.7.3 repo:inferredType

The repo:inferredType is used to carry inferred type information about the node.

5.7.4 repo:repository

There is no defined relationship between the URI of a repository, and the URI of the nodes the repository is responsible for. Specifically, there is no requirement that these be located on the same machine. Each node should contain a property (repo:repository) that links it back to the repository that hosts it.

5.7.5 repo:content

The repo:content property can be used to link a resource

5.7.6 repo:realNode

The repo:realNode property links a proxy node to the real node it represents.

5.8 Node Typing and Node Type Definitions

Some points relating to node typing are:

Nodes can be typed.

A nodes type is accessed and manipulated through the repo:type property.

A node confirms to a particular type if it has the set of properties required of the type.

A node can conform to multiple types.

Node type inheritance is supported; the properties of the parent(s) are aggregated with the child, and cardinality conflicts prohibited.

An application specific object model can be overlaid onto a general purpose repository through a set of node type definitions. In this section we develop the node type system. That is, we describe the functionality and behaviour of the node type system, together with a concrete XML vocabulary language for defining node types.

An important consideration is the selection of an appropriate schema language for the definition of node types. We did consider using existing schema languages, such as XML Schema, Relax NG, RDF Schema and OWL-Lite/OWL-Full. The coin example given later was used as a concrete example to develop this thinking. In the end, only Relax NG and OWL were expressive enough, but both ended up being very verbose, and really far too general purpose. Thus, we have adopted a more pragmatic approach, and developed a simple XML vocabulary for defining node types. It is a mistake to think of this as a new schema language in its own right. Instead, think of this as a simple base syntax, which is easily parsed by repository implementations, and which can be transformed into any of the above schema languages, for processing by standard tools. Section 11 discusses having XSL-T transforms for Relax NG and OWL.

We would seek to be able to encapsulate such technologies as digit databases and schematic web as compliant repositories. Thus, a specific goal of the node typing model defined here is that it should readily map to such technologies.

5.8.1 Definition of Node Types

A node type definition represents a set of property constraints that must all be met for a node to be considered a valid instance of that type. A property constraint identifies a single property and the required number of instances (cardinality) of that property. Properties are identified by their property type URI, as described in section 5.6.

A node type definition may inherit from (i.e. extend) one or more other node types. In inheriting from a parent, the child node type is subject to the property constraints of the parent, plus any additional property constraints defined for the child. That is, the set of property constraints for the child node type is the aggregation of those for each of its parent node types, together with any defined for the child node type.

Conflicts may occur when aggregating property constraints, if the same property URI is appears in more than one definition, but with different cardinality constraints. This, inheritance is only allowed if such conflicts do not arise. This kind of checking is expected to occur when a new node type definition is added to a repository.

We define a single XML syntax for defining node types. In some ways this syntax can be thought of as defining an abstract type. This syntax can be easily transformed into different concrete schema languages, allowing validation of node instances using existing technologies.

Node types can be defined using the following syntax:

```
<NodeType about="http://somedomain/coinschemapath#Coin">
    <Extends type="http:///csf.hpl.hp.com/repository/baseTypes#Node"/>
    <Property type=http://somedomain/coinschemapath#name
minOccurs="1" maxOccurs="1"/>
    <Property type=http://somedomain/coinschemapath#metal
minOccurs="1"maxOccurs="1"/>
    <Property type=http://somedomain/coinschemapath#thickness
minOccurs="1"maxOccurs="1"/>
    <Property type="http://somedomain/
coinschemapath#diameter1"minOccurs="1"maxOccurs="1"/>
    <Property type="http://somedomain/
coinschemapath#frontImage"minOccurs="1"maxOccurs="1"/>
    <Property type="http://somedomain/
coinschemapath#backImage"minOccurs="1"maxOccurs="1"/>
</NodeType>
```

A node type defines the properties a node is expected to have, and the required cardinality of those properties.

An example node type definition is given below:

```
<?xml version="1.0"?>
<RepoSchema
    xmlns="http://csf.hpl.hp.com/repository/typeSchema"
    xmlns:xsi="http://www.w3.org/2001/XMLSchema-instance"
    xsi:schemaLocation="http://csf.hpl.hp.com/repository/typeSchema ">
    <NodeType about="http://somedomain/coinschemapath#Coin">
    <Extends type="http:///csf.hpl.hp.com/repository/baseTypes#Node"/>
    <Property type=http://somedomain/coinschemapath#name
minOccurs="1" maxOccurs="1"/>
    <Property type=http://somedomain/coinschemapath#metal
minOccurs="1" maxOccurs="1"/>
    <Property type=http://somedomain/coinschemapath#thickness
minOccurs="1" maxOccurs="1"/>
    <Property type=http://somedomain/coinschemapath#diameter1
minOccurs="1" maxOccurs="1"/>
    <Property type=http://somedomain/coinschemapath#frontImage
minOccurs="1" maxOccurs="1"/>
    <Property type=http://somedomain/coinschemapath#backImage
minOccurs="1" maxOccurs="1"/>
    </NodeType>
</RepoSchema>
```

There is no significance to the ordering of the properties; they may occur in any order in the instance. Furthermore, the instance is implicitly extensible, and thus may contain any additional properties without this affecting its conformance with a type definition.

In the coin example given later there is shown the equivalent expression of this in XML Schema, Relax NG and OWL.

The XML schema for the repository type definition syntax is included in section 13.

5.10 Loading Type Definitions into a Repository

The Graph.loadSchema(SchemaURI, Schema) operation is used to add type definitions to a repository.

Within the repository, the node and property type definitions are merged into a single store. However, the origin (SchemaURI) of each node and property definition is maintained, to facilitate removal of the definitions.

The Graph.removeSchema(SchemaURI) operation is used to remove type definitions from a repository. All node and property types defined in the schema are removed.

The XML schema for the repository type definition syntax is included in Section 13.

A repository implementation may cache a local copy of the mapped schemas, or it may not: property type definitions that are referenced elswhere may be cached in a repository and may be loaded into the repository at the time of construction of the repository.

5.11 Assigning and Inferring Node Types

Much of the type theory developed within Computer Science has its roots in programming languages. Languages that perform type checking at compile time are known as statically typed, whereas languages that perform type checking at run time are known as dynamically typed. A language is usually either one or the other. Within this specification we allow node types to be either assigned, or inferred. Assigned types are analogous to static typing, and inferred types are analogous to dynamic typing. However, we have used different terminology because we can also conceive of repositories that support mixed typing, where assigned and inferred node types can coexist.

Assigned types allow an application to declare that a node is intended to conform to a particular type. A node is assigned a type by attaching a repo:assignedType property to the node. The property value indicates the node type by referencing a node type URI. A node may be assigned multiple types.

Allowing node types to be assigned enables the repository to validate that modifications to that node are consistent with its type definition(s). This seems like a good thing for data consistency, and should result in applications being exposed to less broken data. Of course, applications should also validate (but perhaps all do not). In the CSF context we are more concerned with workflow-level validation than application-level. In other words, a workflow pre-processor should validate argument types on function invocations, not the functions themselves.

Inferred types allow an application to determine the types a node is currently consistent with, irrespective of whether it has assigned those types to that node. An inferred type is indicated by the presence of an repo:inferredType property on a node. The repo:inferredType property is a read-only property created automatically by a repository that has support for type inference.

Allowing node types to be inferred is good for extensibility, reduces coupling between components, and improves normalization (think of declaring a sub class relationship once in a schema, rather than with multiple assigned type properties on every instance).

Note that the repo:inferredType and repo:assignedType properties are defined as sub-properties of repo:type, which is itself defined as a sub-property of rdf:type, for consistency with the RDF data model. Thus, it is possible for an application to choose whether or not to differentiate between assigned and inferred types.

The mechanism for type inferencing is implementation specific. However, it is envisaged that the scope of type inferencing would be the set of node types explicitly loaded into the repository. Thus, the range of possible types an implementation has to deal with is bounded.

To recap:

A nodes type is accessed and manipulated through the repo:type property.

Types can be either assigned or inferred.

With an assigned type, an application explicitly adds one or more repo:type properties to a node.

With an inferred type, a repository adds one or more repo-type properties to a node when it matches a known type definition.

A repository can support either or both models.

5.12 Validation

Validation is an optional capability of the system. It is the process of checking a node is consistent with its assigned node types.

There are two forms of validation: explicit and implicit. Explicit validation uses the node.validate (nodeType) method to check if a node is consistent with a given type. Implicit validation is where the repository checks each that modification will leave the nodes in a state consistent with their assigned types.

A repository can support either or both methods.

Generally speaking, a node is considered consistent with a particular node type if the following conditions hold:

Each of the property constraints that make up the node type is met, by virtue of the node having the correct number of instances of the property, and Each of those property instances is valid. A property instance is considered valid if its domain and range constraints are met.

Where the range of a property is constrained to be a node of a particular type, there are two approaches a repository can take to validation. A repository that supports shallow validation checks only that the destination node is typed appropriately. A repository that supports deep validation additionally checks that the destination node is itself valid (i.e. consistent with its type). That is, validation is applied recursively.

Figure 12:
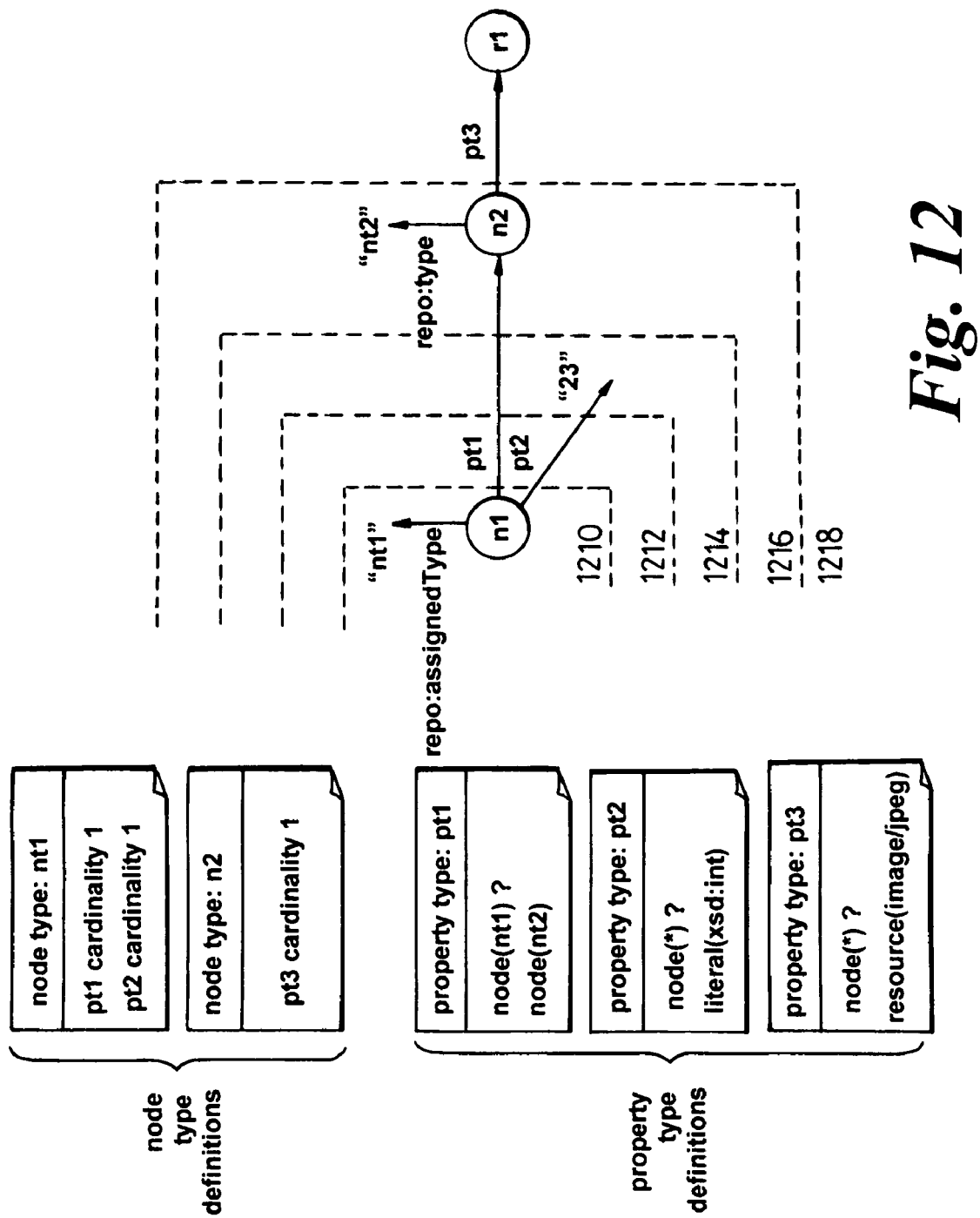
FIG. 12 illustrates levels of validation depth of assigned node types.

In fact, shallow and deep validation (as defined above) fit into a more comprehensive model of validation, as illustrated in FIG. 12.

FIG. 12 shows two node type definitions (named nt1 and nt2) and three property type definitions (named pt1, pt2 and pt3). FIG. 12 also shows two nodes (named n1 and n2) and a resource (named r1).

The options for the validation of node n1 are shown referenced as follows:

1210: (no validation) No validation

1212: (shallow) Check only that node n1 contains the required properties (pt1, and pt2), but do not validate the range constraints of these properties.

1214: (shallow) Same as (1212), but additionally check that properties with literal values (pt2) are syntactically correct.

1216: (shallow) Same as (1214), but additionally check that properties with node values (pt1) point to nodes with compatible types (i.e. the exact node type, or an extension of it). This would check that n2 had repo:type of nt2, but not check that it actually conformed to this type.

1218: (deep) Same as (1216), but additionally validate that n2 conforms to nt2 (i.e. recursively reapply the validation).

A node may be multiply-typed, and therefore shall not be considered inconsistent with a node type definition if it has properties that are not contained within that type definition.

In principle, it is possible to assign an arbitrary node type to a node, irrespective of whether the node matches the property constraints of the node type. In practise, whether this operation is permitted depends on the approach the repository has to validation.

This specification recognises that validation is potentially an expensive operation, and that there will always be a performance-correctness trade-off. To accommodate this, this specification provides for two different approaches to validation: implicit and explicit, and a particular repository may implement none, one or both of these.

A repository that supports implicit validation guarantees that nodes remain consistent with their assigned types, by prohibiting node updates that would cause inconsistencies. Implicit validation is somewhat transparent to the application, unless the application attempts an update that result in an inconsistency. Examples of such updates include removal of a property required by one of the assigned types; addition of a new assigned type without first adding the required properties; addition of a new assigned type that conflicts with an existing assigned type. It is conceivable that a particular implementation allows selective implicit validation. That is, it supports implicit validation for a defined subset of the nodes. The means for defining such a subset are (currently) implementation dependant.

A repository that supports explicit validation provides applications a way of testing the validity of nodes on demand. It does this by implementing the Node.validateo operation. If Node.validateo is executed without any parameters, then a node is validated against all its assigned types. Alternatively, Node.validateo can be called with a node type URI as a parameter, and the node is checked for consistency against this Note that in a repository that supports both assigned and inferred types, the validity of a node can also be checked by testing whether for each repo:assignedType property, there is a corresponding repo:inferredType property.

A client can determine a repository's approach to graph validation using the Graph.getCabailities( ) operation.

5.13—There is No 5.13

5.14 Graph Interface Operations

The graph interface and its default HTTP bindings are defined, in this example, formally using WSDL.

5.14.1 Graph Interface Capabilities

Graph.getCapabilities( )
>{XML description of interface specific capabilities}

This will allow the following capabilities to be described:

The set of URI schemes supported for new resources, and the default

Approach to typing (none, assigned properties, inferred properties, both)

Approach to validation (none, implicit, explicit, both) (shallow, deep)

Approach to versioning (none, nodes only, nodes and resources)

Approach to transactions (none, single repository, multi-repository)

Approach to query (i.e. what, if any, query languages are supported)

Approach to observation

The Graph.getCapabilities( ) operation returns the capabilities of the graph interface using an XML schema.

There will also be the ability to add capabilities to a node.

An example of Graph.getCapabilities( ) is shown below:

5.14.2 Node and Property Type Definitions

```
Graph.getPropertyTypes( )
    -> {PropTypeURI, ...}
Graph.getNodeTypes( )
    -> {NodeTypeURI, ...}
Graph.getPropertyType(PropTypeURI)
    -> {Schema for Property }
Graph.getNodeType(NodeTypeURI)
    -> {Schema for Node }
Graph.loadSchema(Schema URI, Schema)
    -> {T, F}
Graph.removeSchema(Schema URI)
    -> {T, F}
```

The type definition should be expressed using the syntax defined by the XML schema in Section 13.

Another example of a getCapabilities operation is given below:

Request:
GET http://dbanks.hpl.hp.com:8181/graph
Response:

```
<?xml-stylesheet type="text/xsl" href="/stylesheets/graph.xsl" ?>
<GraphCapabilities xmlns:="http://csf.hpl.hp.com/definitions/1/0/repo/types/">
<Query>yes</Query>
    <Typing>no</Typing>
    <Validation>no</Validation>
    <Versioning>no</Versioning>
    <Transactions>no</Transactions>
    <Locking>no</Locking>
</GraphCapabilities>
```

The part of the XML document from <Query> yes</Query> to <Locking>no</Locking> describes optional capabilities of the graph interface.

5.14.3 Node/Resource Creation/Destruction

```
Graph.newResource( )
    -> ResourceURI
Graph.newResource(URIScheme)
    -> ResourceURI
Graph.newNode( )
    -> NodeURI
Graph.newListener(int Timeout)
    -> ListenerURI
Graph.destroyResource(ResourceURI)
    -> {T, F}
Graph.destroyNode(NodeURI)
    ->{T, F}
Graph.destroyListener(ListenerURI)
    -> {T, F}
Graph.isResponsibleFor(NodeURI | ResourceURI | ListenerURI)
    -> {T, F}
```

The instruction new Node( ) causes a new (empty) node to be created and it's URI returned. It has the default binding: HTTP Post <graph interface URI>/NewNode. For example:—

```
Request:
POST http://dbanks.hpl.hp.com:8181/graph/newNode
Response:
<?xml version="1.0" standalone="yes"?>
<URI xmlns="http://csf.hpl.hp.com/definitions/1/0/repo/types/">
http://dbanks.hpl.hp.com:8181/node/1003
</URI>
```

The line http://dbanks.hpl.hp.com.8181/node/1003 returns the URI of the newly-created node.

5.14.4 Query

Graph.query(QueryExpression)
>{NodeURI, ... }

There may be the ability to query the expression of properties.

The query (expression) causes all nodes to be searched for properties that match the expression.

It has the default binding: HTTP GET <graph interface URI>/query. For example:

```
Request:
GET http://dbanks.hpl.hp.com/8181/graph/query?expression=program
Response:
<?xml version="1.0" standalone="yes"?>
<URIList xmlns="http://csf.hpl.hp.com/definitions/1/0/repo/types/">
</URIList>
```

There is returned in the lines within the box a list of the nodes that matched the query.

5.14.5 Transactions

There may be in some examples the ability to handle transactions, for example, to begin a transaction, abort a transaction, and/or commit to a transaction.

Transactions are an optional capability. The graph interface defines three methods for transactions:

Graph.begin( ), returns a transactionid
Graph.commit(transactionid)
Graph.abort(transactionid).

A transactionid may be passed as an optional parameter to other graph/node mutation methods, to indicate the operation be performed as part of a transaction.

5.14.6 Default Binding of the Graph Interface

The graph interface is identified by a resolvable URI, known as the graph interface URI. Retrieving this URI is the same as executing Graph.getCapabilities( ), i.e. the graph interface URI is the default binding for the Graph.getCapabilities( ) operation.

If the graph interface URI is fetched, the result should be an XML document describing the graph capabilities.

5.15 Node Interface Operations

The node interface has a default HTTP binding, defined formally using WSDL.

The node interface (for each node) provides for access methods (all bound to http GET) and Mutation methods (all bound to http POST). The access methods include, in this example:

get( )
NumProperties( )
propertyNames( )
viewByProperty(proptype)
validate(nodetype)
viewByType(nodeType)
return a Node representation
hasLock( )
has Property(proptype)
   return a Boolean.

The Mutation methods include:
updates
copy(URI)
addProperty(propType, literal)
addProperty(propType, URI)
removeProperty(propType, literal)
removeProperty(propType, URI)
removeProperty(propType)
removeAll( )
lock( )
unlock(lockuri)

5.15.1 Reading Node State

```
Node.getNode( )
   -> {XML representation of full node state}
Node.getNodeView(NodeTypeURI)
   -> {XML representation of partial node state}
Node.getProperty(PropTypeURI)
   -> {XML representation of partial node state}
Node.getNumProperties( )
   -> {XML representation of partial node state}
Node.getPropertyNames( )
   -> {XML representation of partial node state}
Node.hasProperty(PropTypeURI)
   -> {T, F}
Node.validate(NodeTypeURI)
   -> {T, F}
```

5.15.2 Modifying Node State

The ability to modify the state of a node is provided. For example, by:—

```
Node.addProperty(PropTypeURI, URI)
   —> {T, F}
Node.addProperty(PropTypeURI, literal)
   —> {T, F}
Node.removeProperty(PropTypeURI, URI)
   —> {T, F}
Node.removeProperty(PropTypeURI, literal)
   —> {T, F}
Node.removeProperty(PropTypeURI)
   —> {T, F}
Node.removeAll( )
   —> {T, F}
```

5.15.3 Node Locking

The ability to lock a node, so that its properties and/or state cannot be changed, at least for a period, may be provided. For example:—

```
Node.lock(int Timeout)
   —> {lockURI, F}
Node.unlock(lockURI)
   —> {T, F}
Node.hasLock( )
   —> {T, F}
```

5.15.4 Node Versioning

Version control may be provided by some embodiments. For example:

```
Node.versionControl( )
    —> {T, F}
Node.checkout( )
    —> {T, F}
Node.checkin( )
    —> {T, F}
Node.restoreVersion(NodeURI)
    —> {T, F}
```

Versioning may be transparent (possibly Out-of-band), or non-transparent (possibly In-band).

5.15.4 Default Binding of the Node Interface

Each node is identified by a resolvable URI, known as the node URI. Retrieving this URI is the same as executing Node.get( ), i.e. the node URI is the default binding for the Node.get( ) operation.

If the node URI is fetched, the result should be an XML document describing the node state, using syntax discussed in Section 5.25.

5.16 Listener Interface Operations

The listener interface allows clients to control what asynchronous notification they receive from a repository. This functionality/capability may be offered by some embodiments. Clients/applications may be able to register to receive notification of state changes within the repository.

```
Listener.get( )
    -> {XML representation of listener state)
Listener.refresh(int Timeout)
    -> {T, F}
Listener.setDomain(DomainScopeExpression)
    ->{T, F}
Listener.setCondition(Condition)
    -> {T, F}
Listener.setCallback(CallbackURI)
    -> {T, F}
Listener.destroy( )
    -> {T, F}
```

It will be appreciated that the Graph Interface can perform introspection—getcapabilities( ). It can apply Object life cycle methods, such as newNode( ), newResource (urischeme), destroyNode( ), destroyResourceo, and isResponsibleFor(uri). It can also perform search methods (e.g. query(expression). The graph Interface also has the capability to implement Type-related methods such as: loadSchema (uri), removeSchema(uri), getPropertyTypes( ), getPropertyType(type), getNodeTypes( ), getNodeTypes(type). It may also have the capability of applying notification-related methods, such as newListener(timeout), or destroyListener(timeout). It may also support translation-related methods, such as begin( ), commit(transactionid), and abort(transactionid).

Section 6—There is No Section 6

Section 7 Design Patterns

7.1.1 In Our Scheme it is Desired that Each Object Node Gives a Uniform Set of Resource Capabilities.

Figure 13A:
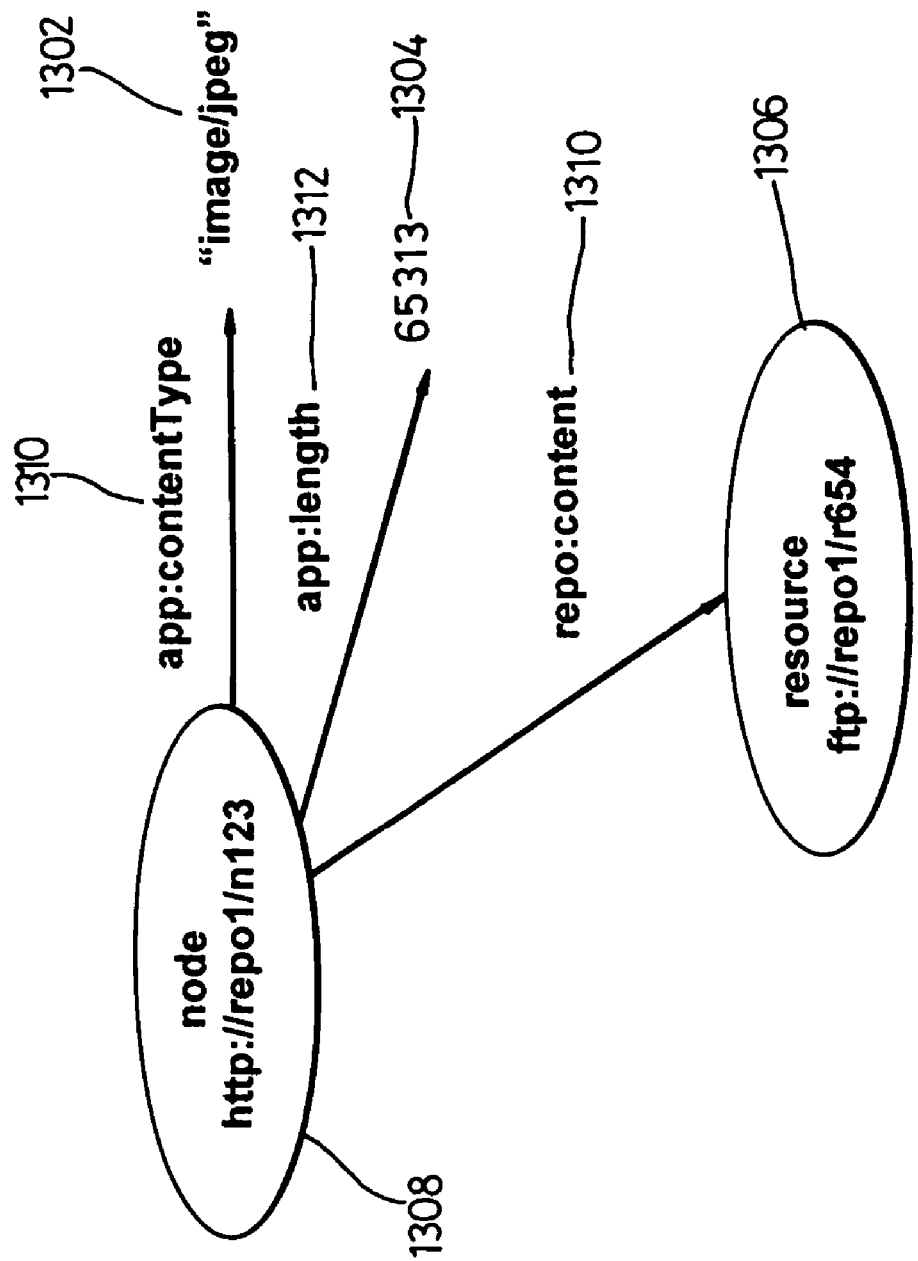
FIG. 13A shows the underlying design of data structure of a schema implementing the aspect of the invention in relation to an object node.

In the pattern of FIG. 13A, each resource 1302, 1304, 1306 is paired up with a node 1308, which acts as a collection point for low-level metadata about that resource. Such metadata might include the resource's mime type 1310 and content length 1312. This information is then readily available, regardless of the URI scheme of the resource. This masks the differing capabilities of different resource access protocols. For example, ftp does support the notion of content type. If the resource is modified, it is the responsibility of the application to ensure the properties attached to the node remain consistent with the resource. Asynchronous notification of changes (using a Listener interface) may be useful here.

7.1.2 Multi-Protocol Access to a Logical Resource Via Object Node

Figure 13B:
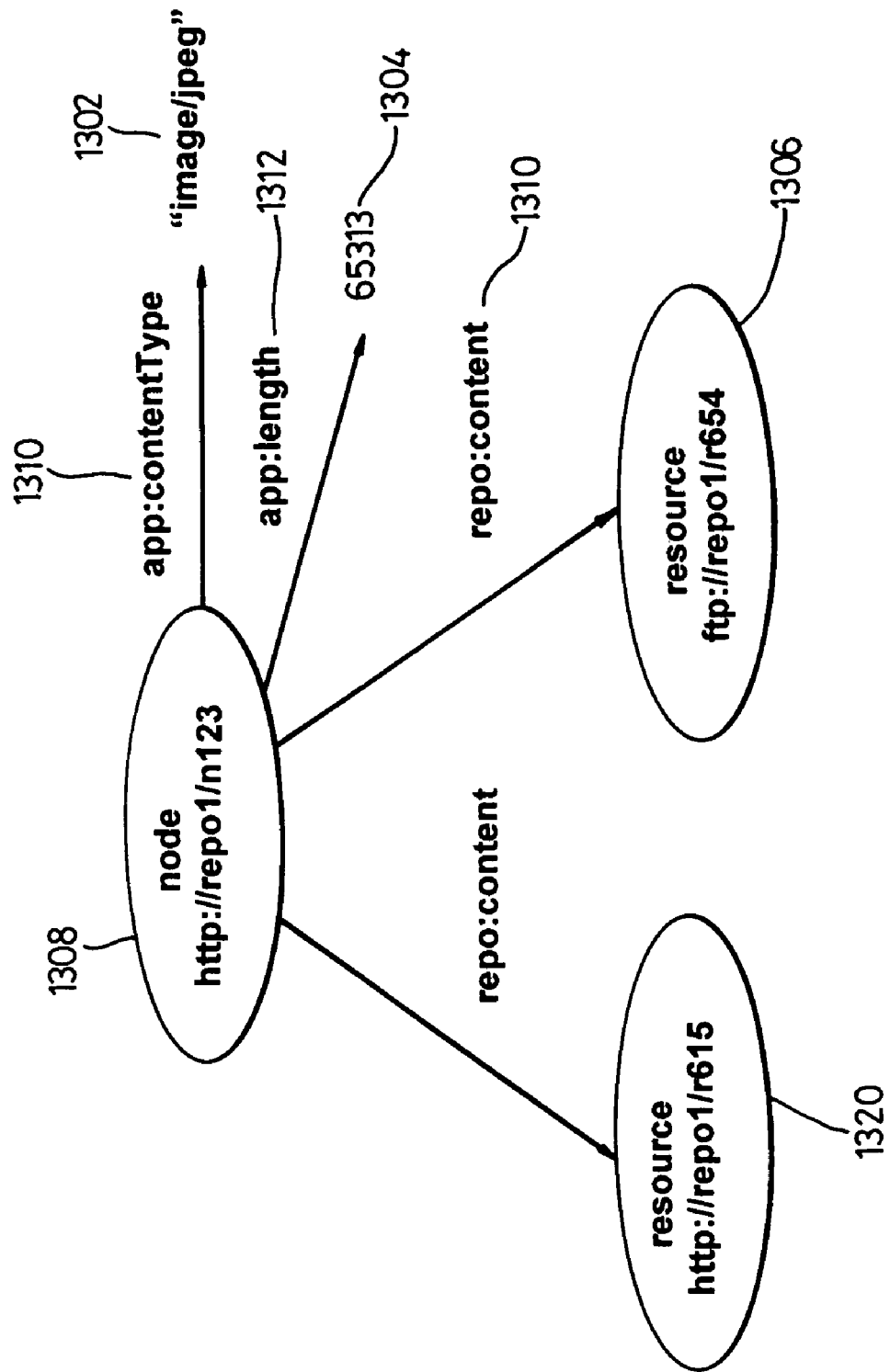
FIG. 13B shows the object node of FIG. 13A, but provided with multi-protocol access to a resource of the node.

FIG. 13B shows an arrangement which provide for multi-protocol access to a logical resource. This pattern extends the previous pattern with additional child resources 1320. These resources should represent the same bit-stream, but accessible through different protocols. There is not intended to be a defined relationship between the URIs of the resources (i.e. it's not just a case of changing http:// to ftp://). Again, it is the responsibility of the application to maintain synchronization between the different resources.

Section 8—Additional Requirements for a CSF Context (Normative)

When running in a CSF context, the additional requirements are placed on a compliant repository. These may include:—

The repository should follow all conventions defined as part of the core service framework (CSF) specification.

A repository should register its repository interface and each data-model-specific interface with the service manager. If additional (non-default) bindings to these interfaces are supported, these should be registered as well.

If there is a call-back mechanism for a listener, it should be operable in the CSF context.

Section 9—Coin Example of Node and Property Typing

As an example of node and property typing there follows an example relating to coins.

Imagine a system for maintaining images and associated data of currency, for historic reference. The application object model for this system might include node type definitions such as Collection, Note, Coin, Image. Instances of notes and coins would then be modelled as nodes of type Note or Coin type. Specific collections could be created (e.g. UK currency, Victorians) using Collection nodes that reference Note or Coin nodes.

The Coin node type might the following properties:

| Node type: http://somedomain/coinschemapath#Coin | |
|---|---|
| Property URI | Cardinality |
| http://somedomain/coinschemapath#name | 1 or more |
| http://somedomain/coinschemapath#metal | 1 |
| http://somedomain/coinschemapath#diameter | 1 |
| http://somedomain/coinschemapath#thickness | 1 |
| http://somedomain/coinschemapath#frontImage | 1 |
| http://somedomain/coinschemapath#backImage | 1 |

The node type definition specifies only the property URI and a cardinality constraint. The definition of the property type, which includes domain and range constraints, is separate. The property types definitions used by Coin might look like:

| Domain | Range |
|---|---|
| Property type: http://somedomain/coinschemapath#name | |
| http://somedomain/coinschemapath#Coin http://somedomain/coinschemapath#Note | http://www.w3.org/2001/ XMLSchema#string |
| domain | range |
| Property type: http://somedomain/coinschemapath#metal | |
| http://somedomain/coinschemapath#Coin | http://www.w3.org/2001/ XMLSchema#string |
| Property type: http://somedomain/coinschemapath#diameter | |
| http://somedomain/coinschemapath#Coin | http://www.w3.org/2001/ XMLSchema#int |
| Property type: http://somedomain/coinschemapath#thickness | |
| http://somedomain/coinschemapath#Coin | http://www.w3.org/2001/ XMLSchema#int |
| Property type: http://somedomain/coinschemapath#frontImage | |
| http://somedomain/coinschemapath#Coin http://somedomain/coinschemapath#Note | http://someimageschema/ Image |
| Property type: http://somedomain/coinschemapath#name | |
| http://somedomain/coinschemapath#Coin http://somedomain/coinschemapath#Note | http://someimageschema/ Image |

10.1 The Coin Node Represented in XML, as Follows:—

```
<?xml version="1.0"?>
<Coin
    xmlns="http://somedomain/coinschemapath"
    xmlns:xsi="http://www.w3.org/2001/XMLSchema-instance"
    xsi:schemaLocation="http://somedomain/coinschemapath"
    about="http://repo1.hpl.hp.com/node11">
    <name>Pound Coin</name>
    <metal>nickel-brass</metal>
    <diameter>22</diameter>
    <thickness>3</thickness>
    <frontImage>http://repo1.hpl.hp.com/node22</frontImage>
    <backImage>http://repo1.hpl.hp.com/node22</backImage>
</Coin>
And the XML schema for a coin would look like:
<?xml version="1.0"?>
<xsd:schema
    targetNamespace="http://somedomain/coinschemapath"
    xmlns:xsd="http://www.w3.org/2001/XMLSchema"
    xmlns="http://somedomain/coinschemapath"
    elementFormDefault="qualified">
    <xsd:element name="Coin">
        <xsd:complexType>
            <xsd:all>
                <xsd:element name="name" type="xsd:string"/>
                <xsd:element name="metal" type="xsd:string"/>
                <xsd:element name="diameter" type="xsd:int"/>
                <xsd:element name="thickness" type="xsd:int"/>
                <xsd:element name="frontImage" type="xsd:anyURI"/>
                <xsd:element name="backImage" type="xsd:anyURI"/>
            </xsd:all>
            <xsd:attribute name="about" type="xsd:anyURI" use="required"/>
        </xsd:complexType>
    </xsd:element>
</xsd:schema>
```

However, there are some problems associated with the XML Schema approach. For example, the instance is not extensible; adding more properties would violate the schema. Also, the typing of the frontImage and backImage sub elements is not explicit enough. It is likely that this could be addressed by defining a new datatype. Furthermore, we have defined our own about property to carry the URI of the instance The inextensibility issue may be addressed by Relax NG.

A relax NG schema for the XML coin object would look like:

```
<?xml version="1.0"?>
<element
    xmlns="http://relaxng.org/ns/structure/1.0"
    ns="http://somedomain/coinschemapath"
    datatypeLibrary="http://www.w3.org/2001/XMLSchema-datatypes"
    name="Coin">
    <attribute name="about">
        <data type="anyURI"/>
    </attribute>
    <interleave>
        <element name="metal">
            <data type="string"/>
        </element>
        <element name="name">
            <data type="string"/>
        </element>
        <element name="diameter">
            <data type="integer"/>
        </element>
        <element name="thickness">
            <data type="integer"/>
        </element>
        <element name="frontImage">
            <data type="anyURI"/>
        </element>
        <element name="backImage">
            <data type="anyURI"/>
        </element>
        <zeroOrMore>
            <element>
                <anyName>
                    <except>
                        <nsName ns="http://somedomain/coinschemapath"/>
                    </except>
                </anyName>
                <grammar>
                    <start>
                        <ref name="anything"/>
                    </start>
                    <define name="anything">
                        <zeroOrMore>
                            <choice>
                                <element>
                                    <anyName/>
                                    <ref name="anything"/>
                                </element>
                                <attribute>
                                    <anyName/>
                                </attribute>
                                <text/>
                            </choice>
                        </zeroOrMore>
                    </define>
                </grammar>
            </element>
        </zeroOrMore>
    </interleave>
</element>
```

The section of the above from <zeroOrMore> to z=</zeroOrMore> allows the instance to be extended with properties from other schema, without causing the schema to be invalid. This pattern could be followed for each type declaration.

It is also possible to represent the Coin Node in RDF
An instance of a coin expressed in RDF looks like:

```
<?xml version='1.0'?>
<!DOCTYPE rdf:RDF [
    <!ENTITY rdf 'http://www.w3.org/1999/02/22-rdf-syntax-ns#'>
    <!ENTITY xsd 'http://www.w3.org/2001/XMLSchema#'>
    <!ENTITY repo 'http://csf.hpl.hp.com/repository#'>
    <!ENTITY coin 'http://somedomain/coinschemapath#'>
]>
<rdf:RDF
    xmlns:rdf="&rdf;"
    xmlns:repo="&repo;"
    xmlns:coin="&coin;">
    <rdf:Description rdf:about='http://repo1.hpl.hp.com/node11'>
        <rdf:type>&repo;ObjectNode</rdf:type>
        <rdf:type>&coin;Coin'</rdf:type>
        <coin:name>Pound Coin</coin:name>
        <coin:metal>nickel-brass</coin:metal>
        <coin:diameter rdf:datatype="&xsd;int">22</coin:diameter>
        <coin:thickness rdf:datatype="&xsd;int">3</coin:thickness>
        <coin:frontImage rdf:resource='http://repo1.hpl.hp.com/node21'/>
        <coin:backImage rdf:resource='http://repo1.hpl.hp.com/node22'/>
    </rdf:Description>
</rdf:RDF>
```

The RDF schema for coins might look like:

```
<?xml version='1.0'?>
<!DOCTYPE rdf:RDF [
    <!ENTITY rdf 'http://www.w3.org/1999/02/22-rdf-syntax-ns#'>
    <!ENTITY rdfs 'http://www.w3.org/2000/01/rdf-schema#'>
    <!ENTITY owl 'http://www.w3.org/2002/07/owl#'>
    <!ENTITY xsd 'http://www.w3.org/2001/XMLSchema#'>
    <!ENTITY repo 'http://csf.hpl.hp.com/repository#'>
    <!ENTITY coin 'http://somedomain/coinschemapath#'>
    <!ENTITY image 'http://somdomain/imageschemapath#'>
]>
<rdf:RDF
    xmlns:rdf="&rdf;"
    xmlns:rdfs="&rdfs;"
    xmlns:xsd="&xsd;">
    <rdfs:Class rdf:about="&coin;Coin">
        <rdfs:subClassOf rdf:resource="&repo;Node"/>
    </rdfs:Class>
    <rdfs:Property rdf:about="&coin;name">
        <rdfs:subPropertyOf rdf:resource="&rdf;label"/>
        <rdfs:domain rdf:resource="&coin;Coin"/>
        <rdfs:range rdf:resource="&xsd;string"/>
    </rdfs:Property>
    <rdfs:Property rdf:about="&coin;metal">
        <rdfs:domain rdf:resource="&coin;Coin"/>
        <rdfs:range rdf:resource="&xsd;string"/>
    </rdfs:Property>
    <rdfs:Property rdf:about="&coin;diameter">
        <rdfs:domain rdf:resource="&coin;Coin"/>
        <rdfs:range rdf:resource="&xsd;int"/>
    </rdfs:Property>
    <rdfs:Property rdf:about="&coin;thickness">
        <rdfs:domain rdf:resource="&coin;Coin"/>
        <rdfs:range rdf:resource="&xsd;int"/>
    </rdfs:Property>
    <!-- maybe this coukd be defined as a sub property of Image -->
    <rdfs:Property rdf:about="&coin;frontImage">
        <rdfs:domain rdf:resource="&coin;Coin"/>
        <rdfs:range rdf:resource="ℑImage"/>
    </rdfs:Property>
    <!-- maybe this coukd be defined as a sub propert of Image -->
    <rdfs:Property rdf:about="&coin;backImage">
        <rdfs:domain rdf:resource="&coin;Coin"/>
        <rdfs:range rdf:resource="ℑImage"/>
    </rdfs:Property>
</rdf:RDF>
```

There are some issues with the RDF Schema approach. For example, in the instance, should the type='repo:Node' be explicit or inferred? Either is envisaged. Also, there is no way in RDFS to require the Coin class to have specific properties. OWL addresses this by allowing additional constraints to be placed on the class definition, using property restrictions.

An OWL schema for coins might look like:

```
<?xml version='1.0'?>
<!DOCTYPE rdf:RDF [
    <!ENTITY rdf 'http://www.w3.org/1999/02/22-rdf-syntax-ns#'>
    <!ENTITY rdfs 'http://www.w3.org/2000/01/rdf-schema#'>
    <!ENTITY owl 'http://www.w3.org/2002/07/owl#'>
    <!ENTITY xsd 'http://www.w3.org/2001/XMLSchema#'>
    <!ENTITY repo 'http://cst.hpl.hp.com/repository#'>
    <!ENTITY coin 'http://somedomain/coinschemapath#'>
    <!ENTITY image 'http://somdomain/imageschemapath#'>
]>
<rdf:RDF
    xmlns:rdf="&rdf;"
    xmlns:rdfs="&rdfs;"
    xmlns:owl="&owl">
    <owl:Class rdf:about="&coin;Coin">
        <rdfs:subClassOf rdf:resource="&repo;Node"/>
        <rdfs:subClassOf>
            <owl:Restriction>
                <owl:onProperty rdf:resource="&coin;metal"/>
                <owl:cardinality
rdf:datatype="&xsd;nonNegativeInteger">1</owl:cardinality>
            </owl:Restriction>
        </rdfs:subClassOf>
        <rdfs:subClassOf>
            <owl:Restriction>
                <owl:onProperty rdf:resource="&coin;name"/>
                <owl:cardinality
rdf:datatype="&xsd;nonNegativeInteger">1</owl:cardinality>
            </owl:Restriction>
        </rdfs:subClassOf>
        <rdfs:subClassOf>
            <owl:Restriction>
                <owl:onProperty rdf:resource="&coin;diameter"/>
                <owl:cardinality
rdf:datatype="&xsd;nonNegativeInteger">1</owl:cardinality>
            </owl:Restriction>
        </rdfs:subClassOf>
        <rdfs:subClassOf>
            <owl:Restriction>
                <owl:onProperty rdf:resource="&coin;thickness"/>
                <owl:cardinality
rdf:datatype="&xsd;nonNegativeInteger">1</owl:cardinality>
            </owl:Restriction>
        </rdfs:subClassOf>
        <rdfs:subClassOf>
            <owl:Restriction>
                <owl:onProperty rdf:resource="&coin;frontImage"/>
                <owl:cardinality
rdf:datatype="&xsd;nonNegativeInteger">1</owl:cardinality>
            </owl:Restriction>
        </rdfs:subClassOf>
        <rdfs:subClassOf>
            <owl:Restriction>
                <owl:onProperty rdf:resource="&coin;backImage"/>
                <owl:cardinality
rdf:datatype="&xsd;nonNegativeInteger">1</owl:cardinality>
            </owl:Restriction>
        </rdfs:subClassOf>
    </owl:Class>
    <rdfs:Property rdf:about="&coin;name">
        <rdfs:subPropertyOf rdf:resource="&rdf;label"/>
        <rdfs:domain rdf:resource="&coin;Coin"/>
        <rdfs:range rdf:resource="&rdfs;XMLLiteral"/>
    </rdfs:Property>
    <rdfs:Property rdf:about="&coin;metal">
        <rdfs:domain rdf:resource="&coin;Coin"/>
        <rdfs:range rdf:resource="&rdfs;XMLLiteral"/>
    </rdfs:Property>
    <rdfs:Property rdf:about="&coin;diameter">
        <rdfs:domain rdf:resource="&coin;Coin"/>
        <rdfs:range rdf:resource="&rdfs;XMLLiteral"/>
    </rdfs:Property>
```

-continued
```
<rdfs:Property rdf:about="&coin;thickness">
    <rdfs:domain rdf:resource="&coin;Coin"/>
    <rdfs:range rdf:resource="&rdfs;XMLLiteral"/>
</rdfs:Property>
<!-- maybe this coukd be defined as a sub property of Image -->
<rdfs:Property rdf:about="&coin;frontImage">
    <rdfs:domain rdf:resource="&coin;Coin"/>
    <rdfs:range rdf:resource="ℑImage"/>
</rdfs:Property>
<!-- maybe this coukd be defined as a sub propert of Image -->
<rdfs:Property rdf:about="&coin;backImage">
    <rdfs:domain rdf:resource="&coin;Coin"/>
    <rdfs:range rdf:resource="ℑImage"/>
</rdfs:Property>
</rdf:RDF>
```

Section 11—XSL-T Transforms for Scheme Translation 11.1 RepoSchema to XML Schema We do not believe that it is possible to have transforms of our RepoSchema to XML-Schema, or to RDF-Schema, because they are not expressive enough.

We believe that it is possible to have transforms from our RepoSchema to Relax NG Schema and OWL Schema.

Section 12—there is No Section 12

Section 13—Node and Property Type Definition Syntax

There follows an illustration node and property type system example.

```
<?xml version="1.0"?>
<xsd:schema
    targetNamespace="http://csf.hpl.hp.com/repository/typeSchema"
    xmlns="http://csf.hpl.hp.com/repository/typeSchema"
    xmlns:xsd="http://www.w3.org/2001/XMLSchema"
    elementFormDefault="qualified">
<xsd:element name="REPOSchema">
    <xsd:complexType>
        <xsd:sequence>
            <xsd:element ref="PropType" minOccurs="0"
                maxOccurs="unbounded"/>
            <xsd:element ref="NodeType" minOccurs="0"
                maxOccurs="unbounded"/>
        </xsd:sequence>
    </xsd:complexType>
</xsd:element>
<xsd:element name="PropType">
    <xsd:complexType>
        <xsd:sequence>
            <xsd:element ref="Extends" minOccurs="0"/>
            <xsd:element ref="Domain" minOccurs="0"/>
            <xsd:element ref="Range" minOccurs="0"/>
        </xsd:sequence>
        <xsd:attribute name="about" type="xsd:anyURI" use="required"/>
    </xsd:complexType>
</xsd:element>
<xsd:element name="NodeType">
    <xsd:complexType>
        <xsd:sequence>
            <xsd:element ref="Extends" minOccurs="0"
                maxOccurs="unbounded"/>
            <xsd:element ref="Property" minOccurs="0"
                maxOccurs="unbounded"/>
        </xsd:sequence>
        <xsd:attribute name="about" type="xsd:anyURI" use="required"/>
    </xsd:complexType>
</xsd:element>
<xsd:element name="Extends">
    <xsd:complexType>
        <xsd:attribute name="type" type="xsd:anyURI" use="required"/>
    </xsd:complexType>
</xsd:element>
```

-continued
```
<xsd:element name="Domain">
    <xsd:complexType>
        <xsd:attribute name="type" type="xsd:anyURI" use="required"/>
```

Overview

In many ways, the data model that underlies our directed graph interface appears similar to the RDF data model. This similarity is deliberate, because we envisage a class of repository that is implemented on top of an RDF triple store. However, there are key differences.

The first key difference is that the RDF data model assumes very little about where the graph is hosted. Any web site can publish RDF documents, containing assertions (RDF statements) about any resources. This allows assertions about a particular URI to be distributed all over the web, rather than requiring them to be centralized in one place. However, finding those assertions is outside the scope of the RDF data model; so far, the RDF equivalent of Google has yet to emerge. In our graph interface we have deliberately made a different design choice. The goals of our asset utility are different to those of the semantic web. The asset utility is about managing content, and if related content is kept together, it is easier to manage. A repository (as defined by this specification) can only contain assertions about nodes it hosts. More specially, all assertions with a particular subject URI are packaged together as a single node in a particular repository—i.e. there is a single authority responsible for the node, and a single place where the state of that node can be accessed and managed.

A second key difference is that RDF really is just about metadata. You cannot go to an RDF store and ask for a representation of a resource. All you can ask for is assertions about that resource. In effect, there is a separation of content from metadata, with each being hosted by different types of servers. Our repository abstraction relates to defining a uniform model that can store both content and metadata. In some ways, the underlying model is closer to WebDAV than it is to RDF.

Figure 14:
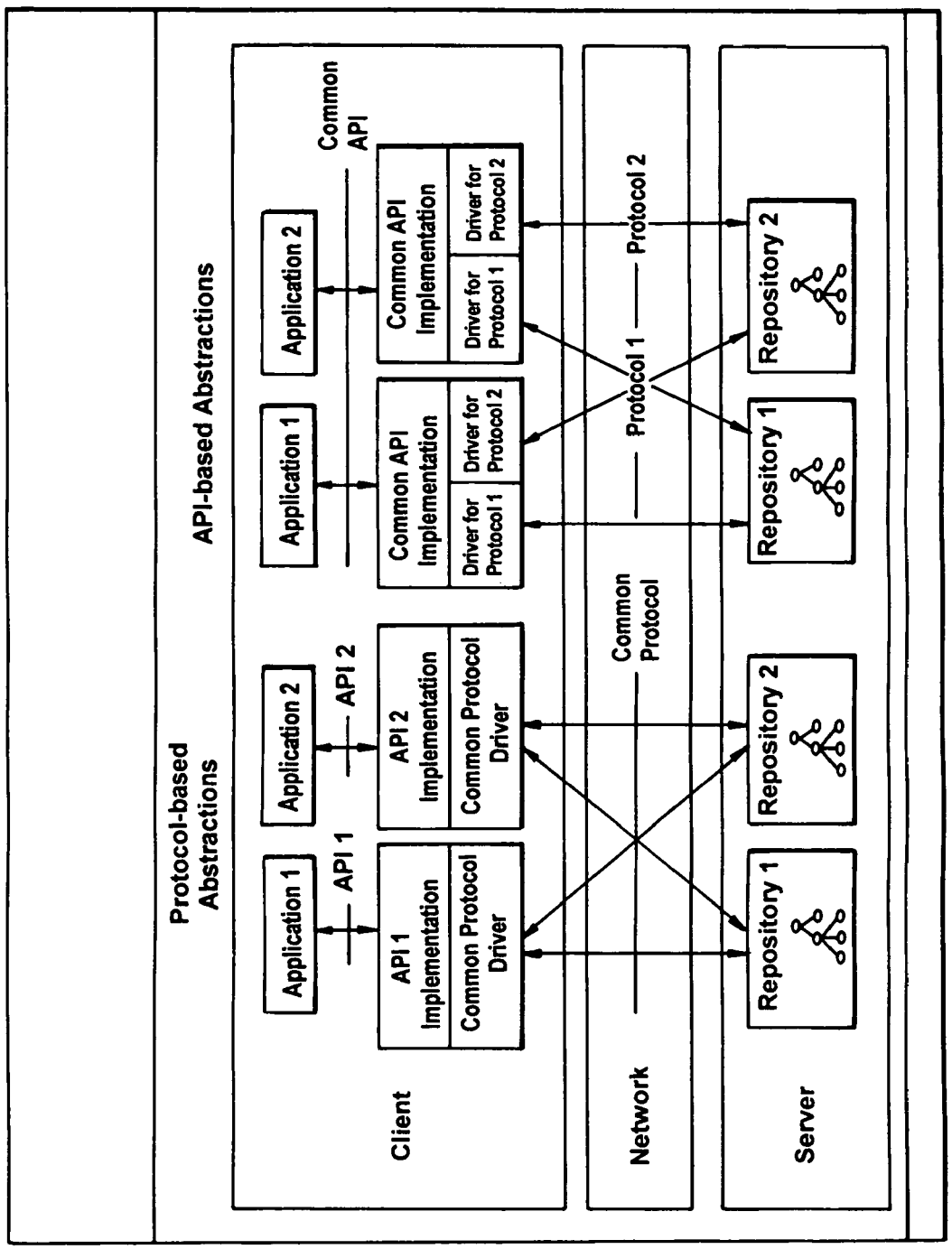
FIG. 14 illustrates a protocol based approach to interoperability of repositories, compared with an API based approach.

FIG. 14 shows schematically the benefit of approaching interoperability of repositories for a user using an on-the-wire protocol-based approach, compared with a client/resource server API approach. For two applications/repositories the comparison looks reasonably even, but if one imagines five different technologies, the protocol-based approached increases linearly, whereas the API approach increases in complexity geometrically.

Figure 15:
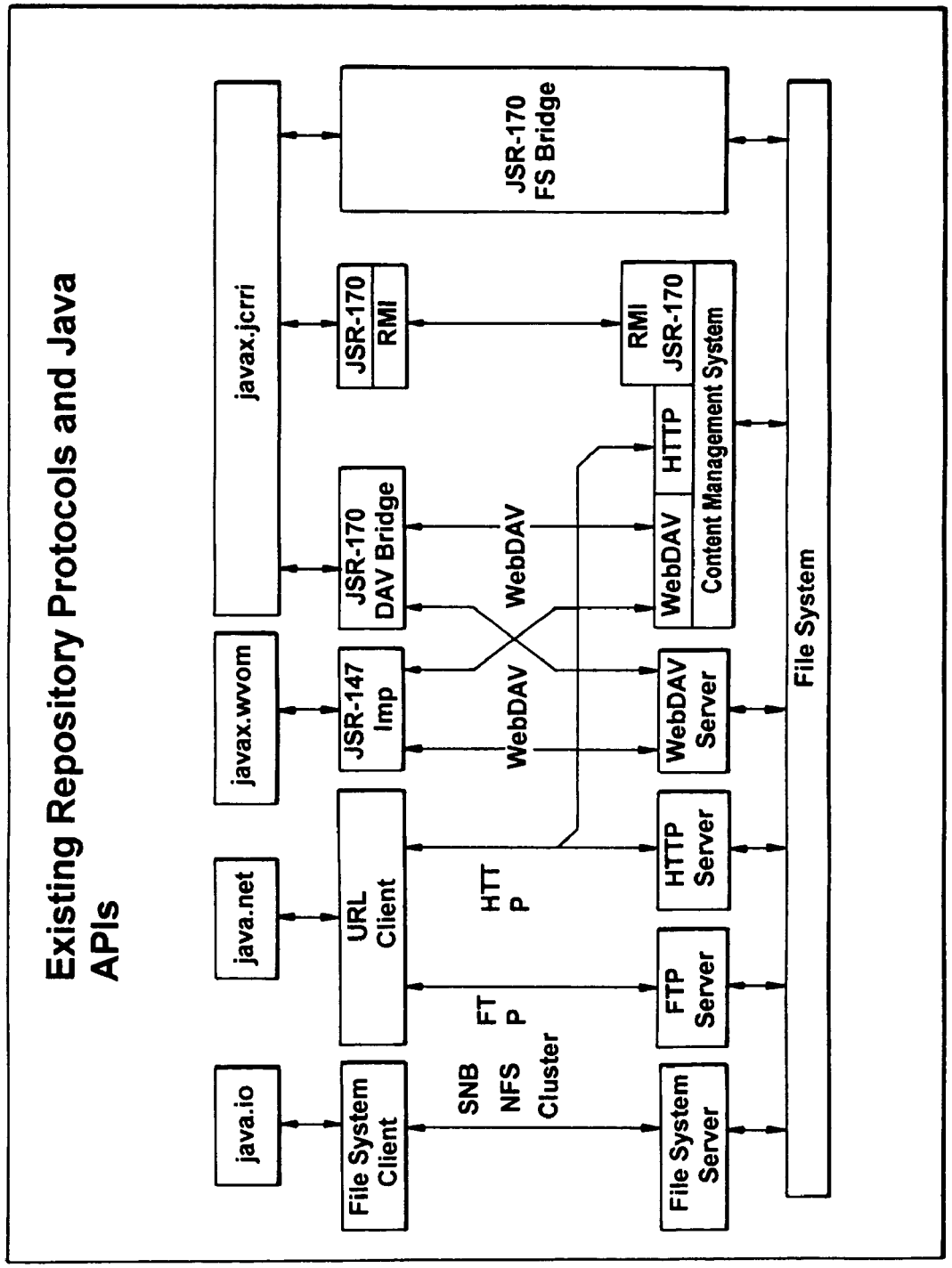
FIG. 15 shows existing prior art repository protocols and Java APIs.

FIG. 15 shows schematically the complexity of just some Java-compliant repository platforms that exist. The present invention will not only allow interoperability with the four Java-type systems of FIG. 15, but also other non-Java systems.

Our invention, at least in many commercial examples has the following concepts:—

All digital object repositories may be represented as graphs of resources.

Leaf nodes (Nrefs) are bit streams representing metadata or content "literals"

Higher-level nodes (Nobjs)_are aggregations that represent higher-level abstractions of objects, such as documents or collections. In the static case, the arcs (edges) in a graph symbolically represent as services of parent/child relationships. We refer to those as properties. All aspects of a repository graph (i.e. every node and arc) are named; all nodes are uniquely named. For simplicity, we refer to this by stating that "every node has a URI" although other network-resolvable naming systems such as [HANDLE] may be employed.

Our graph model provides a generalised repository semantic that is distinct from "underlying" storage models and specific higher-level, "valued-added" repository applications.

We say that the responsibility of a repository is to host create, read, update and delete ("CRUD") services for nodes within graphs, and thereby graphs themselves.

A graph can replace any hierarchy; the specialisations of a particular repository application (e.g. [FEDORA], [DSPACE], [BUCKETS], etc) represent layer(s) of domain-specific semantics (typically expressed in the form of some XML-based schema for defining node and property types) applied to graph-encoded resource relationships. Thus, any repository host may at least store and administer the underlying graph representation of any other repository application.

In our graph-based repository model, repositories are easily virtualised (built in a network-distributed fashion across multiple, heterogenous physical instantiations) since nodes are individually named, referenced and accessed.

We have a node-centric graph model using nodes of two base-level types: object and representation nodes.

Generic Type Definitions pertaining to the graph:—

Nobj: Object node; has one or more Nobj nodes as parent; one or more Nobj or Nrep nodes as children.

Nrep: Representation node; has one Nobj node as a parent. Properties may be used to semantically type a node, which may then be used as a basis for constraining nodal operations, such as how the graph is extended from that node (how "children"/"members" are added).

With the notion of type comes the notion of type consistency.

Given a "parent" node of a particular "type", the responsibility of that node's host repository may be to ensure that operations on that node (such as for introspection, dissemination or the creation of children) are consistent with its designated type.

In general, semantic types assigned to nodes may vary widely, and nodes may be of multiple types. On one end of the spectrum, the node accomplishes simply aggregation and there are no restrictions (or stipulations) on the children based upon the node's type. On the other end, the application-defined type of a node may imply that a hierarchy of a particular structure (e.g. representing a complex image representation) is instantiated below that node, and valid representation requires consistency with a particular data model.

The idea of "type consistency" applied regardless of whether we have a low- or high-level view of the repository. For example, consider an arbitrary multimedia repository, containing lots of rich and complex data structures, each of which has been constructed and reposited by some advanced application. A client application that is unaware of the semantics of the application might traverse and manipulate those data structures, possibly doing damage by invoking type-inconsistent mutations such as deleting properties required by another application. thus, the idea of "type consistency" means that a type-enforcing repository would prevent type-inconsistent graph manipulations, especially the removal of properties that are not within the type definition.

Our approach to type consistency does not prevent a node from being multiply-typed; we encourage open, rather than closed, schemas, where the addition of a property to a node does not invalidate a type. Applications that do not require "foreign" properties simply ignore them. As a matter of practice, applications should not delete properties that are not "theirs" (at least in many embodiments of the invention).

Being able to enforce "type consistency" as a service to the application level is important. Our graph-based repository model encourages the arbitrary composition of complex data-transforming operations across repositories, as long as the resources named as arguments to those operations are consistent with the type definitions of those operations.

We have defined a set of abstract nodal operations that are sufficient to support graph mutation and traversal within our graph-based repository model. Implementation of these operations in a node-specific way by any means satisfies our model. HTTP-based implementations could be accomplished by extending common web server software such as [APACHE] and Microsoft [IIS], following the conventions described below; a robust, non-HTTP implementation could be achieved based upon the CNRI [HANDLE] System by associating properties (type/value pairs) with unique Handle names.

There follows a table of operations that may be performed on nodes, at least in one preferred embodiment:—

| Primitive Operation | Description |
| --- | --- |
| getNode | Returns default representation of node |
| getNodeView(NodeTypeURI) | Returns typed representation of node |
| getPropertyView(PropTypeURI) | Returns all values associated with given property |
| getNumProperties( ) | Returns count of properties on specific node |
| getPropertyNames( ) | Returns PropTypeURIs (i.e. names) of all properties associated with a node |
| hasProperty(PropTypeURI) | Checks if node as property of specified name |
| validate(NodeTypeURI) | Checks the specified schema against the target node |
| addProperty(propTypeURI, URI) | Adds specified property to Node with URI as value |
| addProperty(PropTypeURI, literal) | Adds specified property to Node with literal as value |
| removeProperty(PropTypeURI, URI) | Removes specified property from Node that has URI as value |
| removeProperty(PropTypeURI, literal) | Removes specified property from Node that has literal as value |
| removeProperty(PropTypeURI) | Removes all properties from Node with specified name |
| removeProperties( ) | Detact all properties from Node |
| delete | Destroys Node. Does not destroy child nodes |
| unlock(lockURI) | Unlocks the designated Node. Unique lockURI must be provided |
| lock | Locks the designated Node. Returns a unique lockURI |
| hasLock | Checks if node is locked |
| versionControl(VersionNodeURI) | Creates a unique version control URI, VersionNodeURI |
| checkout(versionNodeURI) | Makes a working copy of a Node at VersionNodeURI |
| checkin(VersionNodeURI) | Commits the working copy of Node and freezes version |
| restoreVersion(VersionNodeURI) | Replaces designated Node with VersionNodeURI |
| getOperations | Returns a list of operations associated with Node |

A preferred implementation of our protocol consists of mapping these operations onto the ubiquitous HTTP 1.1 protocol. We do so in a way that is consistent with Fielding's [REST] principles. This uses http GET and POST as tools to enable many different client browsers to be operable with many different repositories, once the repositories have been cloaked with the appropriate mapping of http commands and their own proprietary commands.

HTTP/1.1-Based Graph Operation Invocation Model

An HTTP request (GET or POST) is made to the target node by way of an [RFC2616]-compliant request string containing the following information:—
    the nodal operation to perform (once)
    the arguments of the nodal operation (many)
    [RFC2616] specifies the following structure:—
    Request-Line=Method <space> Request-URI <space> HTTP-Version <crlf>

Within that syntax, the Request+URI must have the following structure:
    "http:" "//" host [":" port] [abs_path {"?" query]]

Therefore we will encode a parameterised node operation such as viewByProperty(PropTypeURI) as:
    http://
        NodeURI?op=ViewByProperty?prop=PropTypeURI where http://NodeURI is understood to have both a host repository part and a node designator part, expressed using a repository-dependent syntax. An example might be:
    http://NodeURI=http://RepoPart/NodeIDPart

GET

The GET operation creates a snapshot representation of the target node. The purpose of the GET operation is to provide the graph introspection required to support partial-understanding applications. A GET to a URI with no specified operation degrades to a simple GET of the representation of the specified URI.

| Partial HTTP Request Line | Description |
|---|---|
| GET NodeURI | Returns default representation of Node |
| GET NodeURI?op=viewBy-Type?type=NodeTypeURI | Returns typed representation of Node |
| GET NodeURI?op=viewBy-Property?prop=PropTypeURI | Returns all values associated with given property |
| GET NodeURI?op=numProperties | Returns count of properties on specified Node |
| GET NodeURI?op=propertyNames | Returns PropTypeURIs (i.e. names) of all properties |
| GET NodeURI?op=has-Property?prop=PropTypeURI | Checks if Node has property of specified name |
| GET NodeURI?op=numProperties | Returns count of properties on specified Node |
| GET NodeURI?op=hasLock | Checks if Node is locked |
| GET NodeURI?op=validate?type=NodeTypeURI | Checks the specified schema against the target Node |
| GET Node URI?op=getOperations | Returns a list of operations associated with Node. |

POST

The POST operation invokes a behaviour of the target node. The POST operation carries the list of arguments for the invocation. The return from the invocation is the operation return.

The purpose of the POST operation is to support graph mutation. POST can only be applied to a node with a behaviour; default graph-mutating behaviours for this protocol are specified below.

Appropriately-typed representations return properties (by way of GET) that enumerate behaviours that may be invoked on nodes.

Security

The specified protocol may be securely applied using Transport Layer Security [TLS], [SSL] or other means of achieving secure HTTP communications at the transport layer. Message-based encryption mechanisms such as [GLADNEY] or [XMLENCRYPT] may also be employed. Finally, repository service requests at the node- and nodal operation-specific level may have policy-based authorisation ("access control") applied, following standardised frameworks such as [SAM] and using policy expression such as [PONDER], [XACML], [XRML] or [ODRL].

Features discussed in connection with an aspect of the invention, or in the claims that follow, are applicable to all aspects of the invention/claims (in any combination).

Features discussed in connection with an aspect of the invention, or in the claims that follow, are applicable to all aspects of the invention/claims (in any combination).

The invention claimed is:

1. A method of providing internet access to a data object repository comprising:
    managing data objects hosted by said repository using a generalised repository directed graph data model having object nodes and resources, said repository storing both content and metadata of the object nodes, said resources comprising at least one of:
    (i) a literal;
    (ii) actual resource data; and/or
    (iii) a URI directing a request for resources to an address;
    wherein said object nodes comprise higher level abstractions of data objects;
    wherein all object nodes and resources are named, as well as all arcs between object nodes and other object nodes or resources, said arcs modelling properties of said nodes;
    wherein each said directed graph has a graph interface which represents data as a directed graph of nodes and resources; and
    wherein said graph interface is capable of enabling access to data represented by said directed graph by traversal of said directed graph using http:GET.

2. A method according to claim 1 wherein said graph interface also supports http:POST for mutation of said graph.

3. A method according to claim 1 wherein said directed graph spans data hosted in a plurality of repositories, there being at least one of an object node and a resource of said directed graph stored in a first data object repository and at least one of an object node and a resource of said directed graph stored in a second, different, data object repository.

4. A method according to claim 1 wherein said directed graph model organisation of said data objects is the native data organisation model of said repository, or at least of one of said repositories.

5. A method according to claim 1 wherein in a network where said repository, or at least one of said repositories has a native data organisation model that is not a directed graph model capable of being traversed by http:GET in accordance with claim 1, said method comprising wrapping said native data organisation model in an API which does expose a directed graph data structure in accordance with claim 1, thereby providing web browser access to data hosted by said repository or said at least one repository.

6. A method according to claim 1 wherein in a network where said repository, or at least one of said repositories has a native data organisation model that is not a directed graph model capable of being traversed by http:GET in accordance with claim 1, said method comprising providing said repository with an additional data model, in addition to said native data organisational model, said additional data model comprising a directed graph data model in accordance with claim 1, thereby providing an alternative, additional, method of querying data in said repository, or in said at least one repository.

7. A method according to claim 1 comprising defining the interaction of said graph interface with GET or POST requests using on-the-wire protocols, rather than using a language-specific API.

8. A method according to claim 7 comprising using an [RFC2616]—compliant request string to make the request of said target node, the request including the nodal operation to perform, and the arguments of the nodal operation.

9. A method according to claim 1 further comprising:
managing said directed graph model using a first computer entity, and storing said data objects represented by said directed graph in at least one of:
(i) memory of said first computer entity;
(ii) memory of second computer entity, distinct from said first computer entity;
(iii) a distributed memory, at least one node representing a digital object held in memory of one computer entity, and at least a second node representing a digital object held in memory of a second computer entity; and
(iv) a distributed memory according to (iii) above, and wherein said one computer entity comprises said first computer entity.

10. A method of providing network access to digital objects stored on a plurality of digital object repositories storing both content and metadata of the digital objects, said method comprising, in addition to whatever native data structure each repository may have for its hosted digital objects, providing each repository with a common parallel data structure comprising a directed graph of nodes and resources, and ensuring that said parallel directed graph data structures support simple http GET requests to provide traversal of said directed graph data structures for read operations, thereby providing a user with access to said plurality of repositories via a web browser.

11. A method according to claim 10 wherein said common parallel data structure directed graph comprises resource nodes and object nodes, said resource nodes comprising bit stream data representing a resource, or a UIRI; and
said object nodes comprising higher level abstractions of data objects;
said nodes being typed, and all said nodes being named, and all arcs between nodes being named, said arcs representing properties of node type—node value pairs; and
wherein said repository which hosts data objects nodes and resource nodes of a said directed graph has a repository interface, said repository interface responding to a http: GetCapabilities( ) request, or other equivalent request, by returning details of the capabilities of said repository, including details of which data-model-specific interfaces are implemented by said repository and their bindings.

12. A method according to claim 11 wherein content of a node is viewed using a http GET query expression.

13. A method according to claim 11 wherein content of a node is altered using a http POST expression.

14. A method according to claim 11 comprising distributing nodes of said directed graph model over a plurality of repositories.

15. A method of providing network access to digital objects stored on a plurality of digital object repositories comprising, in addition to whatever native data structure each repository may have for its hosted digital objects, providing each repository with a common parallel data structure comprising a directed graph of nodes and resources, and ensuring that said parallel directed graph data structures support simple http GET requests to provide traversal of said directed graph data structures for read operations, thereby providing a user with access to said plurality of repositories via a web browser, and wherein said common parallel data structure directed graph comprises resource nodes and object nodes, said resource nodes comprising bit stream data representing a resource, or a URI; and said object nodes comprising higher level abstractions of data objects; said nodes being typed, and all said nodes being named, and all arcs being named, said arcs representing properties of node type—node value pairs; and wherein said repository which hosts data objects nodes and resource nodes of a said directed graph has a repository interface, said repository interface responding to a http: Get Capabilities( ) request, or other equivalent request, by returning details of the capabilities of said repository, including details of which data-model-specific interfaces are implemented by said repository and their bindings, which method is performed upon a data object repository having a pre-existing data structure and content management system that is not organised in accordance with claim 1, said method further comprising creating an additional alternative data structure and associated content management structure that is in accordance with claim 1, thereby providing an alternative, additional, way of querying or interacting with said data objects.

16. A method according to claim 15 comprising performing a method of providing network access to digital objects stored on a plurality of digital object repositories comprising, in addition to whatever native data structure each repository may have for its hosted digital objects, providing each repository with a common parallel data structure comprising a directed graph of nodes and resources, and ensuring that said parallel directed graph data structures support simple http GET requests to provide traversal of said directed graph data structures for read operations, thereby providing a user with access to said plurality of repositories via a web browser, and wherein said common parallel data structure directed graph comprises resource nodes and object nodes, said resource nodes comprising bit stream data representing a resource, or a URI; and said object nodes comprising higher level abstractions of data objects; said nodes being typed, and all said nodes being named, and all arcs being named, said arcs representing properties of node type —node value pairs; and wherein said repository which hosts data objects nodes and resource nodes of a said directed graph has a repository interface, said repository interface responding to a http: Get Capabilities( ) request, or other equivalent request, by returning details of the capabilities of said repository, including details of which data-model-specific interfaces are implemented by said repository and their bindings, further comprising distributing nodes of said directed graph model over a plurality of repositories upon a plurality of data object repositories so as to enable said plurality of repositories to be read/write accessible using a common protocol, thereby providing interoperability for a user.

17. A method of producing an interoperable network of digital object repositories comprising:
decomposing existing data models, or data, of existing digital object repositories into directed graphs for the digital object repositories, wherein the digital object repositories store both content and metadata of the data models or data; and providing interfaces to said directed graphs that are mapped onto http GET and POST methods in order to provide for traversal and mutation of said directed graphs.

18. Client machine software adapted, when run on a control processor of a client machine, to bind (i) at least one of a read and write query expression intended for receipt by, or response by, a repository having a data structure managed by a digital object management system which represents a data structure as a direct graph of named nodes and arcs, to (ii) an internet transport protocol so as to enable said protocol to mediate interactions with said directed graph data structure to enable traversal of said directed graph data structure, wherein the repository stores both content and metadata of the named nodes.

* * * * *

UNITED STATES PATENT AND TRADEMARK OFFICE
CERTIFICATE OF CORRECTION

PATENT NO. : 7,702,725 B2  Page 1 of 1
APPLICATION NO. : 10/884092
DATED : April 20, 2010
INVENTOR(S) : John S. Erickson et al.

It is certified that error appears in the above-identified patent and that said Letters Patent is hereby corrected as shown below:

In column 55, line 47, in Claim 11, delete "UIRI;" and insert -- URI; --, therefor.

In column 56, lines 21-22, in Claim 15, delete "Get Capabilities( )" and insert -- GetCapabilities( ) --, therefor.

In column 56, lines 53-54, in Claim 16, delete "Get Capabilities( )" and insert -- GetCapabilities( ) --, therefor.

Signed and Sealed this

Seventeenth Day of August, 2010

David J. Kappos
*Director of the United States Patent and Trademark Office*